United States Patent [19]

Katsura et al.

[11] Patent Number: 5,046,023
[45] Date of Patent: Sep. 3, 1991

[54] GRAPHIC PROCESSING SYSTEM HAVING BUS CONNECTION CONTROL CAPABLE OF HIGH-SPEED PARALLEL DRAWING PROCESSING IN A FRAME BUFFER AND A SYSTEM MEMORY

[75] Inventors: Koyo Katsura, Hitachiota; Shigeru Matsuo, Hitachi; Jun Sato, Musashino; Takashi Sone, Tokyo; Yoshikazu Yokota, Kodaira; Masahiko Kikuchi, Hitachi, all of Japan

[73] Assignees: Hitachi, Ltd., Tokyo; Hitachi Engineering Co., Ltd., Ibaraki, both of Japan

[21] Appl. No.: 105,292

[22] Filed: Oct. 6, 1987

[51] Int. Cl.[5] .............................. G06F 15/62
[52] U.S. Cl. .................................... 364/518
[58] Field of Search ............... 364/518, 521, 522

[56] References Cited

U.S. PATENT DOCUMENTS

| | | | |
|---|---|---|---|
| 4,475,161 | 10/1984 | Stock | 364/521 |
| 4,528,636 | 7/1985 | Robinson, III | 364/521 |
| 4,533,910 | 8/1985 | Sukonick et al. | 364/521 X |
| 4,542,376 | 9/1985 | Bass et al. | 364/518 X |
| 4,564,915 | 1/1986 | Evans et al. | 364/521 |
| 4,677,573 | 6/1987 | Brown et al. | 364/521 |
| 4,773,026 | 9/1988 | Takahara et al. | 364/518 |

Primary Examiner—Gary V. Harkcom
Assistant Examiner—Mark K. Zimmerman
Attorney, Agent, or Firm—Antonelli, Terry, Stout & Kraus

[57] ABSTRACT

A graphic processing system including a main memory for storing a program and information corresponding to pixels, a main processor for effecting an execution processing of a program transferred from the main memory or from an external device so as to control the system, display/output devices such as a CRT device and a printer for outputting graphic information attained by controlling pixels arranged in a plurality of dimensions, a frame buffer for storing information corresponding to pixels outputted to the display/output devices, and a graphic processor for receiving a command and parameter information transferred from the main memory and/or the main processor, for generating character and graphic data in accordance with a predetermined processing procedure and for performing a transfer control including an execution of a drawing processing to transfer generated data through first and second address buses and first and second data buses to the main memory and/or the frame buffer, respectively. The system also includes bus connection switch circuit to be controlled by the graphic processor to effect a connection control between the first and second address buses and between the first and second data buses so as to enable execution of a drawing processing in the main memory connected to a bus on the main processor side and a data transfer between the main memory and the frame buffer.

29 Claims, 69 Drawing Sheets

FIG. 12

| REG.NO | REGISTER NAME | ABBREV. | DATA | | | | | | | | |
|---|---|---|---|---|---|---|---|---|---|---|---|
| — | ADDRESS | AR | ADDRESS | | | | | | | | |
| — | ADDRESS/WRITE FIFO COUNTER | AWFCR | INC | | | | | | | | |
| — | STATUS | SR | WFC | | | | | | | | |
| — | | | UDT | — | — | CDC | DER | — | MPV | STP | CER | ARD | CED | — | RFF | RFR | WFR | WFE |
| — | STATUS REGISTER CLEAR | SRCR | INC | | | | | | | | |
| — | | | UDCL | * | * | CDCL | DECL | * | MPCL | STCL | CRCL | ARCL | * | — | * | * | * | * |
| — | FIFO ENTRY | FE | F E | | | | | | | | |
| 002 | COMMAND CONTROL | CCR | ABT | PSE | DDM | CDM | DRC | G B M | | | |
| 004 | | | AREA | — | CNT | MMA | | | | | |
| 006 | INTERRUPT ENABLE | IER | UDE | — | CDE | DEE | — | MPE | STE | CRE | ARE | CEE | — | REE | RPE | WRE | WEE |
| 008 ~ 152 | TIMING CONTROL | | DCT FRS WTM — MDS | | | | | | | | |
| 180 ~ 1cc | DISPLAY CONTROL | | | | | | | | | | |

FIG. 13

| READ/WRITE | REGISTER NAME | ABBREVIATION | DATA | |
|---|---|---|---|---|
| R/W | COLOR REGISTER 0 | CL0 | CL0H | CL0L |
| R/W | COLOR REGISTER 1 | CL1 | CL1H | CL1L |
| R/W | COLOR COMPARE | CCMP | CCMPH | CCMPL |
| R/W | EDGE COLOR | EDG | EDGH | EDGL |
| R/W | READ MASK | RMASK | RMASKH | RMASKL |
| R/W | WRITE MASK | WMASK | WMASKH | WMASKL |
| R/W | PATTERN CONTROL | RTNC | PPY | PPX |
| | | | PSY | PSX |
| | | | PEY | PEX |
| | | | PZCY | PZCX |
| | | | PZY | PZX |
| R/W | AREA DEFINITION | ADR | YMIN | XMIN |
| | | | YMAX | XMAX |
| R/W | DRAWING MODE | DMR | DM1 | DM0 |
| | | | CMW1 | CMW0 |
| R/W | PATTERN ATTRIBUTE | PDR | | PMW |
| R/W | PATTERN MEMORY ADDRESS | PTNA | PTNAH | PTNAL |
| R/W | PEL MEMORY ADDRESS | PLA | | PLA |
| R/W | PEL CONTROL | PLC | PLY2 PLY1 | PLX2 PLX1 |
| R/W | LINE STYLE CONTROL | LSC | | LSP |
| | | | | LSS |
| | | | | LSE |
| | | | LSZC | LSZ |
| R/W | FONT AREA DEFINITION | FADR | FBAH | FBAL |
| | | | FBN | FAMW |
| | | | DY | DX |
| | | | ZY | ZX |
| | | | | XX |
| R/W | INTERNAL RAM ADDRESS | IRAR | IRARH | IRARL |
| R/W | STACK START ADDRESS | SSAR | SSARH | SSARL |
| R/W | STACK AREA DEFINITION | SADR | SADR | SADR |
| R/W | STACK POINTER | SP | SPH | SPL |
| R | DRAWING POINTER 0 | DP0 | DP0H | DP0L |
| R | CURRENT POINTER 0 | CP0 | CP0Y | CP0X |
| R | DRAWING POINTER 1 | DP1 | DP1H | DP1L |
| R | CURRENT POINTER 1 | CP1 | CP1Y | DP1X |
| R | DRAWING START POINT | DSP | DSPY | DSPX |
| R | DRAWING END POINT | DEP | DEPY | DEPX |

FIG. 14

| AREA | | | |
|---|---|---|---|
| 0 | 0 | 0 | EFFECT DRAWING WITHOUT CONTROLLING THE DRAWING AREA |
| 0 | 0 | 1 | WHEN THE DRAWING AREA IS EXCEEDED, THE GDP EXECUTES THE FOLLOWING PROCESSING AND TERMINATES THE COMMAND<br><br>1 SET THE AREA DETECT FLAG (ARD) AND TERMINATE THE PROCESSING<br><br>2 ONLY WHEN THE DRAWING POINT IS MOVED FROM THE DRAWING AREA INTO THE OUTSIDE THEREOF, THE LOGICAL ADDRESSES (CPX, CPY) IMMEDIATELY BEFORE THE POINT ENTERS THE OUTSIDE AREA ARE SET TO THE READ FIFO IN THIS ORDER ( IN THE PEL DRAWING, LOGICAL ADDRESSES CORRESPONDING TO THE PEL ORIGIN ARE STACKED ) |
| 0 | 1 | 0 | IN THE OUTSIDE OF THE DRAWING AREA, THE OPERATION IS CONTINUED WITHOUT EFFECTING THE DRAWING. IN THIS AREA, THE MA OUTPUT IS SET TO ALL HIGH.(FOR THE PEL DRAWING, REFER TO THE DESCRIPTION THEREOF.) THE AREA DETECT FLAG, STOP FLAG, AND PAUSE BIT ARE NOT SET NOR THE LOGICAL ADDRESS OF THE BOUNDARY IS STACKED. AFTER THE TERMINATION OF COMMAND, THE NEXT COMMAND IS CONTINUOUSLY EXECUTED. |
| 0 | 1 | 1 | IN THE OUTSIDE AREA OF THE DRAWING AREA, THE OPERATION IS CONTINUED WITHOUT EFFECTING THE DRAWING. WHEN THE DRAWING POINT ENTERS FROM THE INSIDE OF THE DRAWING AREA INTO THE OUTSIDE THEREOF AND VICE VERSA, THE GDP EXECUTES THE FOLLOWING PROCESSING.<br><br>(1) FROM THE INSIDE TO THE OUTSIDE<br>   1 SET THE AREA DETECT FLAG (ARD)<br>   2 SET TO THE READ FIFO THE LOGICAL ADDRESS (CPX, CPY) IMMEDIATELY BEFORE THE POINT ENTERS THE OUTSIDE AREA<br><br>(2) FROM THE OUTSIDE TO THE INSIDE<br>   SET THE LOGICAL ADDRESS (CPX, CPY) WHEN THE POINT ENTERS THE INSIDE TO THE READ FIFO<br><br>(3) TERMINATE THE PROCESSING WHEN THE COMMAND IS ENDED |
| 1 | X | X | Pick MODE |

FIG. 15

| | DCT | |
|---|---|---|
| 0 | 0 | WITHOUT WORD-UNIT REVERSAL OF BIT SEQUENCE. DATA FIRST INPUTTED IS SET TO THE LOW-ORDER WORD. (16-BIT OPERATION) 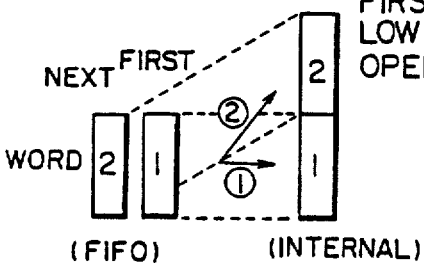 |
| 0 | 1 | WITH WORD-UNIT REVERSAL OF BIT SEQUENCE. DATA FIRST INPUTTED IS SET TO THE LOW-ORDER WORD (16-BIT OPERATION) 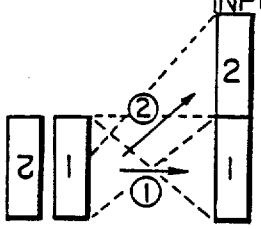 |
| 1 | 0 | WITHOUT WORD-UNIT REVERSAL OF BIT SEQUENCE. DATA FIRST INPUTTED IS SET TO THE HIGH-ORDER WORD (32-BIT OPERATION) 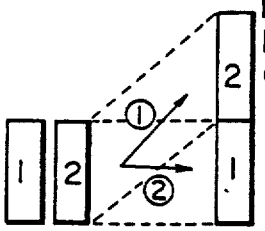 |
| 1 | 1 | WITH BYTE-UNIT REVERSAL OF BIT SEQUENCE. DATA FIRST INPUTTED IS SET TO THE LOW-ORDER WORD (16-BIT OPERATION, 32-BIT OPERATION) 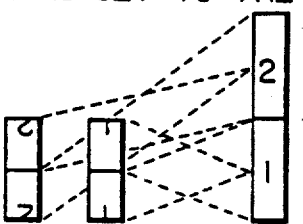 |

FIG. 16
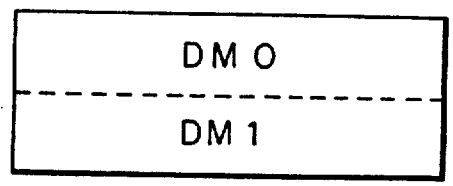
DRAWING MODE REGISTER (DMR)
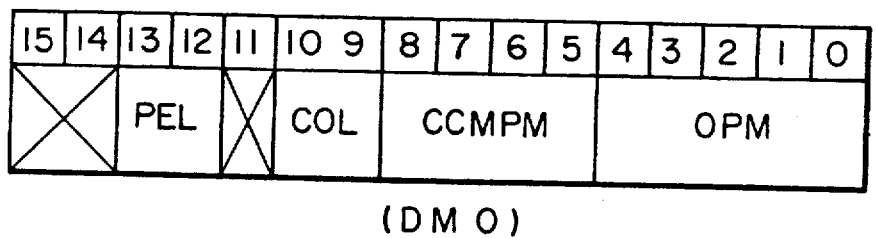
(DM 0)
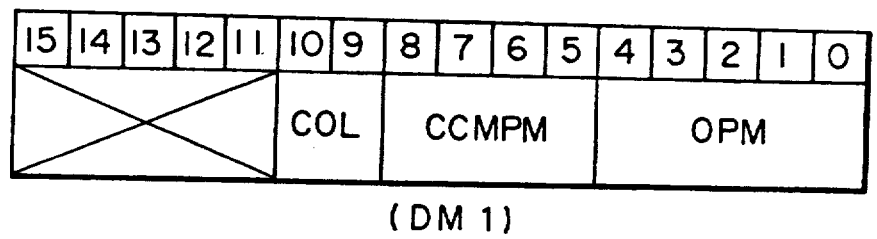
(DM 1)

FIG. 17

| OPM | LOGIC OPERATION | AVAILABILITY OF WRITE DEDICATED CYCLE |
|---|---|---|
| 00000 | D' = 0 | O |
| 00001 | D' = S AND D | X |
| 00010 | D' = S' AND (NOT D) | X |
| 00011 | D' = S' | O |
| 00100 | D' = (NOT S') AND D | X |
| 00101 | D' = 0 | X |
| 00110 | D' = S' XOR D | X |
| 00111 | D' = S' OR D | X |
| 01000 | D' = NOT (S' OR D) | X |
| 01001 | D' = NOT (S' XOR D) | X |
| 01010 | D' = NOT D | X |
| 01011 | D' = S' OR (NOT D) | X |
| 01100 | D' = NOT S' | O |
| 01101 | D' = (NOT S') OR D | X |
| 01110 | D' = NOT (S' AND D) | X |
| 01111 | D' = 1 | O |

(LOGIC OPERATION)

| OPM | ARITHMETIC OPERATION | AVAILABILITY OF WRITE DEDICATED CYCLE |
|---|---|---|
| 10000 | D' = D + S' | X |
| 10001 | D' = D − S' | X |
| 10010 | D' = D + S' (SATURATE) | X |
| 10011 | D' = D − S' (SATURATE) | X |
| 10100 | RESERVED | |
| 10101 | | |
| 10110 | | |
| 10111 | | |
| 11000 | | |
| 11001 | | |
| 11010 | | |
| 11011 | | |
| 11100 | | |
| 11101 | | |
| 11110 | | |
| 11111 | | |

(ARITHMETIC OPERATION)

FIG. 18

| COL | LOGIC | COLOR MODE |
|---|---|---|
| | | SOURCE DATA IS MAPPED DATA AND DESTINATION DATA IS COLOR |
| 00 | S' = S·CLI+S̄·CLO | EXPAND DATA INTO COLOR OF COLOR REGISTERS 0-1 ACCORDING TO SOURCE DATA 0-1 |
| 01 | S' = S·CLI+S̄·VOP | EXPAND DATA INTO COLOR OF COLOR REGISTER 1 FOR SOURCE DATA = 1; THE COLOR DATA OPERATION IS NOT EXECUTED FOR SOURCE DATA = 0 |
| 10 | S' = S·NOP+S̄·CLO | EXPAND DATA INTO COLOR OF COLOR REGISTER 0 FOR SOURCE DATA = 0; THE COLOR DATA OPERATION IS NOT EXECUTED FOR SOURCE DATA = 1 |
| 11 | S' = NOP | THE COLOR DATA OPERATION IS NOT EXECUTED REGARDLESS OF THE SOURCE DATA |

FIG. 19

| CCMPM | DESTINATION DATA = COLOR | | DESTINATION DATA = MAPPED DATA SOURCE DATA = COLOR | | D=MAPPED DATA S=MAPPED DATA |
|---|---|---|---|---|---|
| | LOGIC | CONDITIONAL OPERATION MODE | LOGIC | MAPPING MODE | |
| 0000 | 1 | COLOR DATA OPERATION IS EXECUTED REGARDLESS OF RELATIONSHIPS OF D, CCMP AND S' | 1 | 1 REGARDLESS OF RELATIONSHIP OF S AND CCMP. | CCMP IS INVALID. |
| 0001 | D=CCMP | COLOR DATA OPERATION IS EXECUTED FOR D=CCMP IN TERMS OF CODES | S=CCMP | 1 IF S=CCMP; OTHERWISE, 0. | |
| 0010 | D<CCMP | COLOR DATA OPERATION IS EXECUTED FOR D<CCMP IN TERMS OF CODES | S<CCMP | 1 IF S<CCMP IN TERMS OF CODES; OTHERWISE, 0. | |
| 0011 | D≦CCMP | COLOR DATA OPERATION IS EXECUTED IF D≦CCMP IN TERMS OF CODES | S≦CCMP | 1 IF S≦CCMP IN TERMS OF CODES; OTHERWISE 0 | |
| 0100 | 0 | COLOR DATA OPERATION IS NOT EXECUTED REGARDLESS OF RELATIONSHIPS OF D, CCMP, AND S' | 0 | 0 REGARDLESS OF RELATIONSHIP BETWEEN S AND CCMP. | |
| 0101 | D≠CCMP | COLOR DATA OPERATION IS EXECUTED IF D≠CCMP | S≠CCMP | 1 IF S≠CCMP; OTHERWISE, 0. | |
| 0110 | D≧CCMP | COLOR DATA OPERATION IS EXECUTED IF D≧CCMP IN TERMS OF CODES | S≧CCMP | 1 IF S≧CCMP; OTHERWISE, 0. | |
| 0111 | D>CCMP | COLOR DATA OPERATION IS EXECUTED IF D>CCMP | S>CCMP | 1 IF S>CCMP IN TERMS OF CODES; OTHERWISE 0. | |
| 1000 | 1 | COLOR DATA OPERATION IS EXECUTED REGARDLESS OF RELATIONSIPS OF D,S AND CCMP | | | |
| 1001 | D=S' | COLOR DATA OPERATION IS EXECUTED IF D=S' | S=CCMP | | |
| 1010 | D<S' | COLOR DATA OPERATION IS EXECUTED IF D<S' IN TERMS OF CODES | S<CCMP | | |
| 1011 | D≦S' | COLOR DATA OPERATION IS EXECUTED IF D≦S' IN TERMS OF CODES | S≧CCMP | | |
| 1100 | 0 | COLOR DATA OPERATION IS NOT EXECUTED REGARDLESS OF RELATIONSHIPS OF D,S, AND CCMP. | 0 | | |
| 1101 | D≠S' | COLOR DATA OPERATION IS EXECUTED IF D≠S' | S≠CCMP | | |
| 1110 | D≧S' | COLOR DATA OPERATION IS EXECUTED IF D≧S' IN TERMS OF CODES | S≧CCMP | | |
| 1111 | D>S' | COLOR DATA OPERATION IS EXECUTED IF D>S' IN TERMS OF CODES | S>CCMP | | |

D = TRANSFER DESTINATION DATA, S' OR S = TRANSFER SOURCE DATA, AND CCMP = DATA OF CCMP REGISTER.

FIG. 20A

| PEL | |
|---|---|
| 00 | PEL DRAWING IS NOT EXECUTED |
| 01 | PEL DRAWING IS EXECUTED IN A COLOR OF A COLOR REGISTER CORRESPONDING TO THE MAPPED DATA SPECIFIED BY LINE STYLE INFORMATION. DEPENDING ON THE COLOR MODE SPECIFICATION, A DOTTED LINE MAY UNDERGO THE PEL DRAWING ; HOWEVER, THE PEL DRAWING CAUSES DUPLICATED WRITING DEPENDING ON THE SHAPE |
| 10 | RESERVED (THE PEL DRAWING IS NOT EXECUTED) |
| 11 | PEL DRAWING IS EXECUTED IN A COLOR OF A COLOR REGISTER CORRESPONDING TO THE MAPPED DATA SPECIFIED BY PATTERN INFORMATION. OR EXECUTED BY USE OF COLOR PATTERN INFORMATION. HOWEVER, THE PEL DRAWING CAUSES DUPLICATED WRITING DEPENDING ON THE SHAPE |

FIG. 20B

PEL = 01

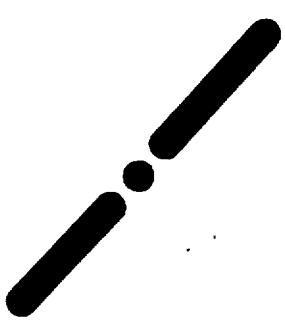

FIG. 20C

PEL = 11

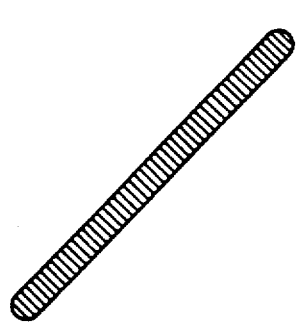

FIG. 23
LINE STYLE
INFORMATION | 1 1 1 1 0 0 0 1 0 0 0 1 1 1 ------
REFERENCE START POINT
PEL INFORMATION
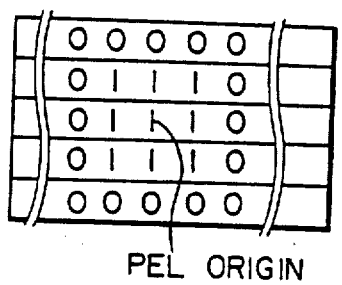
PEL ORIGIN
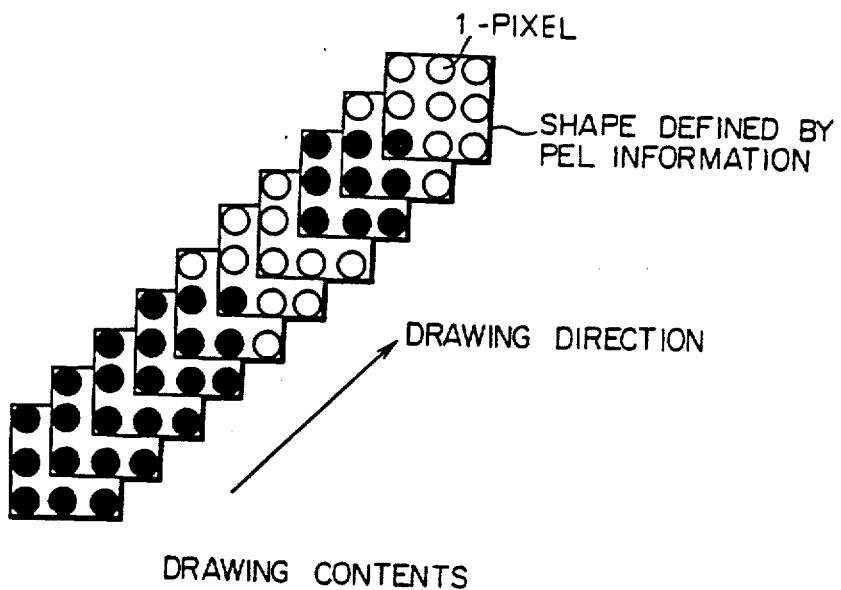
1-PIXEL
SHAPE DEFINED BY PEL INFORMATION
DRAWING DIRECTION
DRAWING CONTENTS

FIG. 25 COMMANDS

| COMMAND | FORMAT | FUNCTION |
|---|---|---|
| LINE | LINE (D) Xs,Ys, Xe, Ye | DRAW A STRAIGHT LINE BETWEEN THE SPECIFIED START AND END POINTS |
| RLINE | RLINE(D) dX, dY | DRAW A STRAIGHT LINE FROM THE START POINT INDICATED BY THE CURRENT POINTER TO THE END POINT SPECIFIED BY PARAMETERS |
| PLINE | PLINE (Z,D) Xs,Ys, Xe,Ye, Zs, Ze | DRAW A SPECIFIED PORTION OF A STRAIGHT LINE BETWEEN THE FIRST AND END POINTS |
| RCT | RCT (D) X1,Y1, X2, Y2 | DRAW A RECTANGLE ACCORDING TO THE SPECIFIED DIAGONAL LINE |
| PLL | PLL(D) n, X1,Y1, ---- Xn, Yn | DRAW n-1 LINES BY LINKING POINTS SPECIFIED BY THE PARAMETERS |
| DPLL | DPLL (D) n, X1,Y1, ---- Xn,Yn | DRAW A GROUP OF n/2 LINES BY LINKING POINTS SPECIFIED BY PARAMETERS |
| PLMK | PLMK(D) n, X1,Y1, ---- Xn,Yn, | DRAW MARKS AT n POINTS SPECIFIED BY PARAMETERS |
| PLG | PLG (D) n, X1,Y1, ---- Xn, Yn | DRAW A POLYGON HAVING n SIDES |
| CRCL | CRCL( D) Xc,Yc, r | DRAW A CIRCLE ACCORDING TO THE CENTER POINT AND RADIUS SPECIFIED |
| ELPS | ELPS (D) Xc,Yc, A, B | DRAW AN ELLIPSE ACCORDING TO THE SPECIFIED CENTER, X-AXIS RADIUS, AND Y-AXIS RADIUS |
| ARC3P | ARC3P(D) X1,Y1,X2,Y2, X3, Y3 | DRAW AN ARC ACCORDING TO THE SPECIFIED THREE POINTS |
| ARC3PC | ARC3PC (CT,D) X1,Y1, X2,Y2,X3,Y3 | DRAW A SECTOR OR A CIRCULAR BOW ACCORDING TO THE SPECIFIED THREE POINTS |
| ARC | ARC(D) Xc,Yc,r, DXs, DYs, DXe, DYe | DRAW AN ARC ACCORDING TO THE SPECIFIED CENTER, RADIUS, AND ANGLE |
| ARCC | ARCC (CT,D) Xc,Yc, r, DXs, DYs,DXe, DYe | DRAW A SECTOR OR A CIRCULAR BOW ACCORDING TO THE SPECIFIED CENTER, RADIUS, AND ANGLE |
| EARC | EARC(D) Xc,Yc, A, B, DXs, DYs, DXe,DYe | DRAW AN ELLIPTIC ARC ACCORDING TO THE SPECIFIED CENTER, X-AXIS RADIUS, Y-AXIS RADIUS, AND ANGLE |
| EARCC | EAPCC (CT, D),Xc,Yc, A,B, DXs, DYs, DXe, DYe | DRAW AN ELLIPTIC SECTOR OR AN ELLIPTIC BOW ACCORDING TO THE SPECIFIED CENTER, X-AXIS RADIUS,Y-AXIS RADIUS,AND ANGLE |
| DOT | DOT (D) X,Y | DRAW A SPECIFIED POINT |
| RDOT | RDOT(D) | DRAW THE CURRENT POINTER |
| FRCT | FRCT (D) X1,Y1,X2,Y2 | PAINT OUT A RECTANGLE ACCORDING TO THE SPECIFIED DIAGONAL LINE |

FIG. 26 COMMANDS

| COMMEND | FORMAT | FUNCTION |
|---|---|---|
| FPLG | FPLG (D) N, P, n₁, X(1,1), Y(1,1) ------ X(1,n₁), Y(1,n₁) <br><br> nₚ, X(P,1), Y(P,1) ----- X(P,np), Y(P,np) | PAINT OUT A FIGURE HAVING N SIDES IN TOTAL AND COMPRISING P POLYGONS FOR WHICH THE NUMBER OF SIDES AND VERTEX COORDINATES ARE SPECIFIED |
| FTRI | FTRI (D) X1,Y1,X2,Y2,X3,Y3 | PAINT OUT A TRIANGLE |
| FTRAP | FTRAP(D) X1,Y1, X2, Y2, X3, Y3, X4, Y4, Ys, Ye | PAINT OUT A FIGURE SURROUNDED BY TWO HORIZONTAL LINES AND TWO STRAIGHT LINES |
| FHLINE | FHLINE (D) Y1,n, X1, X2, ----Xn | PAINT OUT n/2 LINES ON THE SAME HORIZONTAL LINE |
| FCRCL | FCRCL (D) Xc,Yc, r | PAINT OUT A CIRCLE |
| FELPS | FELPS (D) Xc,Yc, A, B | PAINT OUT AN ELLIPSE |
| FFAN | FFAN(CT,D) Xc,Yc,r,DXs, DYs, DXe, DYe | PAINT OUT A SECTOR OR A CIRCULAR BOW ACCORDING TO THE SPECIFIED ANGLE |
| FARC-LN | FARC-LN (D) Xc,Yc, r, Zone X1,Y1, X2, Y2, Ys, Ye | PAINT OUT A FIGURE SURROUNDED BY A QUARTER CIRCLE FOR WHICH A QUADRANT IS SPECIFIED, A STRAIGHT LINE, AND TWO HORIZONTAL LINES |
| FPCRCL | FPCRCL(D) Xc,Yc,r,Ys,Ye | PAINT OUT A PORTION OF A SPECIFIED CIRCLE SURROUNDED BY TWO HORIZONTAL LINES |
| FEFAN | FEFAN(CTD) Xc,Yc,A,B, DXs, DYs, DXe, DYe | PAINT OUT AN ELLIPTIC SECTOR OR AN ELLIPTIC CIRCULAR BOW ACCORDING TO THE SPECIFIED ANGLE |
| FEARC-LN | FEARC-LN(D) Xc,Yc, A, B, Zone, X1, Y1, X2,Y2,Ys, Ye | PAINT OUT A FIGURE SURROUNDED BY A QUARTER ELLIPSE FOR WHICH A QUADRANT IS SPECIFIED, A STRAIGHT LINE, AND TWO HORIZONTAL LINES |
| FPELPS | FPELPS(D) Xc,Yc, A, B, Ys, Ye | PAINT OUT A PORTION OF AN ELLIPSE SURROUNDED BY TWO HORIZONTAL LINES |
| PAINT | PAINT (E,D) Xs, Ys | PAINT OUT AN ARBITRARY AREA |
| PTN | PTN (SD,D) SZ;X,Y | DRAW AREA USING PATTERN RAM |
| TEXT | TEXT (D) X,Y,n,CN1, CNn | DRAW TEXT USING CHARACTER FONT |
| TEXTPS | TEXTPS(R/L,D) X,Y,n, CC1, CCn | DRAW TEXT USING CHARACTER FONT ACCORDING TO THE SPECIFIED INTERVAL FOR EACH CHARACTER |

FIG. 27 COMMANDS

| COMMAND | FORMAT | FUNCTION |
|---|---|---|
| CHR | CHR (SD,D) X, Y, CN | EXPAND A CHARACTER FONT |
| COPY | COPY (S,DSD, So, D) Xs, Ys DX, DY, Xd, Yd | TRANSFER DATA OF A RECTANGULAR AREA BETWEEN ARBITRARY COORDINATE SYSTEMS |
| MCOPY | MCOPY (S,DSD, So,D) Xs,Ys, DX, DY, Xd, Yd | TRANSFER DATA OF A RECTANGULAR AREA BETWEEN ARBITRARY COORDINATE SYSTEMS OPERATING WITH DATA IN THE PATTERN R A M |
| ZOOM | ZOOM (I, So, D) Xs, Ys, LSX,LSY, Xd, Yd,(DX,LDY) | MAGNIFIED/REDUCED COPY BETWEEN ARBITRARY COORDINATE SYSTEMS |
| ROT | ROT (I, So,D) Xs, Ys,LSX, LSY,Xd,Yd,LDX1, LDY1 LDX2, LDY2. | ROTATION COPY BETWEEN ARBITRARY COORDINATE SYSTEMS |
| COMPMH | COMPMH (D) X,Y, DX, DY. | COMPRESSION IN THE M H ENCODING METHOD |
| COMPMR | COMPMR (D), X, Y, DX, DY. | COMPRESSION IN THE M R ENCODING METHOD |
| COMPMMR | COMPMMR D, X,Y,DX,DY | COMPRESSION IN THE $M^2R$ ENCODING METHOD |
| EXPMH | EXPMH(D) X,Y, DX,DY, D1,----Dn | EXPANSION IN THE M H ENCODING METHOD |
| EXPMP | EXPMR(D) X,Y, DX, DY, D1,----Dn | EXPANSION IN THE M R ENCODING METHOD |
| PUT | PUT (D) X, Y, DX, DY D1,----Dn | TRANSFER DATA FROM THE MAIN MEMORY TO THE FRAME BUFFER |
| GET | GET (D) X, Y, DX,DY. | TRANSFER DATA FROM THE FRAME BUFFER TO THE MAIN MEMORY |
| MOVE | MOVE(P,D) X, Y | MOVE THE CURRENT POINTER |
| RMOVE | RMOVE (P,D) dX, dY | MOVE THE CURRENT POINTER |
| ORG | ORG (D) DPH, DPL | SET THE ORIGIN |
| LDPR | LDPR (RN) n, AH, AL | TRANSFER DATA FROM THE FRAME BUFFER TO THE PARAMETER REGISTER |
| STPR | STPR (RN) n, AH, AL | TRANSFER DATA FROM THE PARAMETER REGISTER TO THE FRAME BUFFER |
| WPRB | WPRB (RN) n, D1,---Dn | WRITE A PLURALITY OF PARAMETER REGISTERS |
| RPRB | RPRB (RN) n | READ A PLURALITY OF PARAMETER REGISTERS |
| WPR | WPR (RN) D | WRITE A PARAMETER REGISTER |

FIG. 28  COMMANDS

| COMMAND | FORMAT | FUNCTION |
|---|---|---|
| RPR | RPR (RN) | READ A PARAMETER REGISTER |
| WPTN | WPTN  PRA, n, D1, ---- Dn | WRITE THE CONTENT OF A PATTERN AREA |
| RPTN | RPTN  PRA, n | READ THE CONTENT OF A PATTERN AREA |
| WITBL | WITBL  D1, ---- Dn | WRITE AN INTERPOLATION TABLE |
| RITBL | RITBL | READ AN INTERPOLATION TABLE |
| WCTBL | WCTBL  D1, ---- Dn | WRITE A COMPRESSION TABLE |
| RCTBL | RCTBL | READ A COMPRESSION TABLE |
| WETBL | WETBL  D1, ---- Dn | WRITE AN EXPANSION TABLE |
| RETBL | RETBL | READ AN EXPANSION TABLE |
| WLSTYL | WLSTYL(LRA) n, D4, ---- Dn | WRITE THE CONTENT OF A LINE STYLE AREA |
| RLSTYL | RLSTYL(LRA) n | READ THE CONTENT OF A LINE STYLE AREA |
| WPEL | WPEL  n, D1, --- Dn | WRITE THE CONTENT OF A PEL AREA |
| RPEL | RPEL  n | READ THE CONTENT OF A PEL AREA |
| RD | RD. AH, AL, n | READ THE FRAME BUFFER OR THE INTERNAL RAM |
| WT | WT  AH, AL, n, D1, ---- Dn | WRITE THE FRAME BUFFER OR THE INTERNAL RAM |
| DISPON | DISPON | DISPLAY CONTROL |
| DISPOFF | DISPOFF | DISPLAY CONTROL |
| STOP | STOP | STOP DRAWING |
| NOP | NOP | NO OPERATION |
| DSEL | DSEL (DN) | SPECIFY A DEVICE PROCESSING A COMMAND |
| ADOUT | ADOUT  AH, AL, DH, DL | OUTPUT PARAMETERS AH-DL TO THE MA AND MD TERMINALS |
| CDEND | CDEND | INDICATE TERMINATION OF THE COMMAND DMA |
| TEST | TEST | TEST MODE OPERATION |

FIG. 29
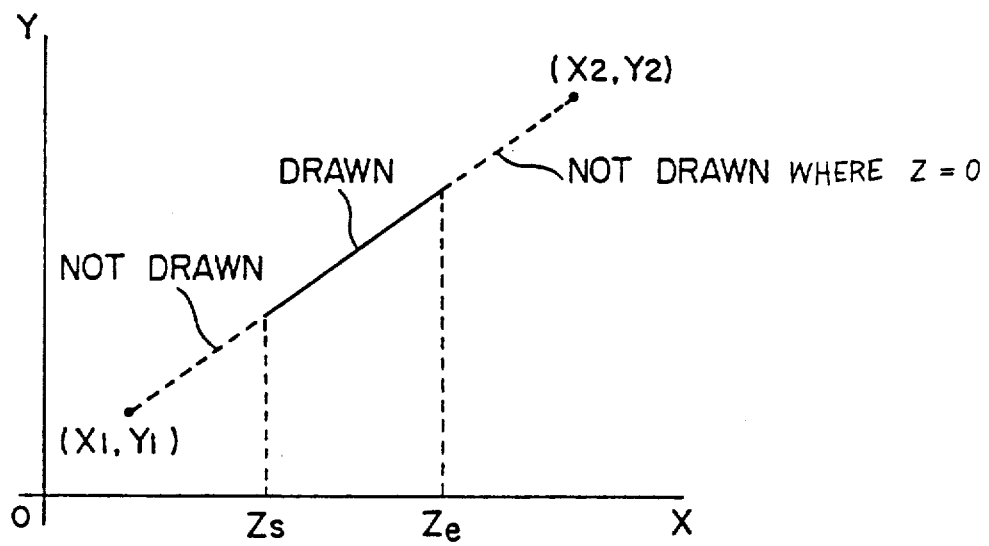
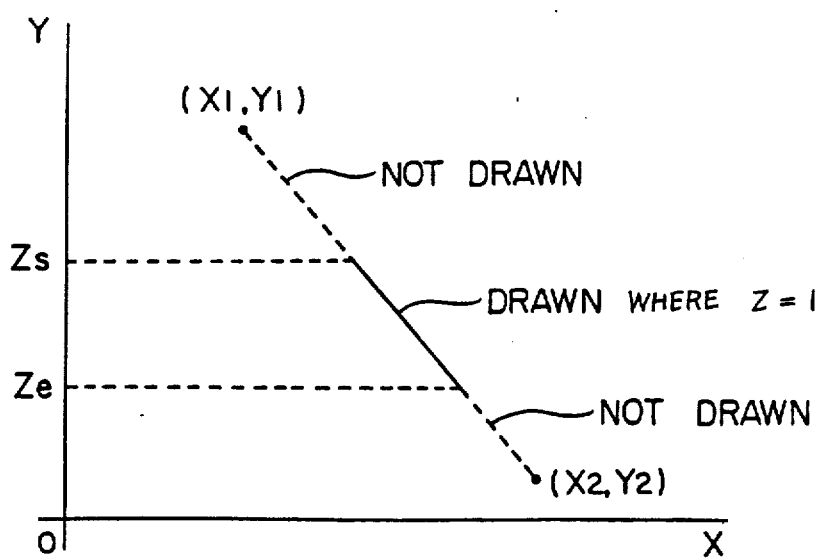

FIG. 30
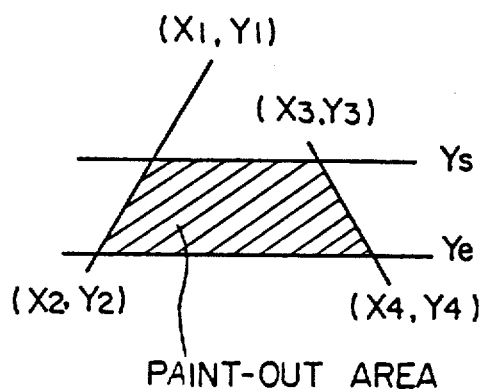
PAINT-OUT AREA
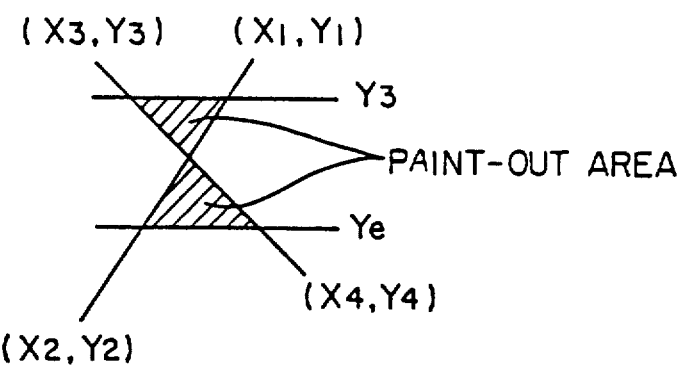
PAINT-OUT AREA
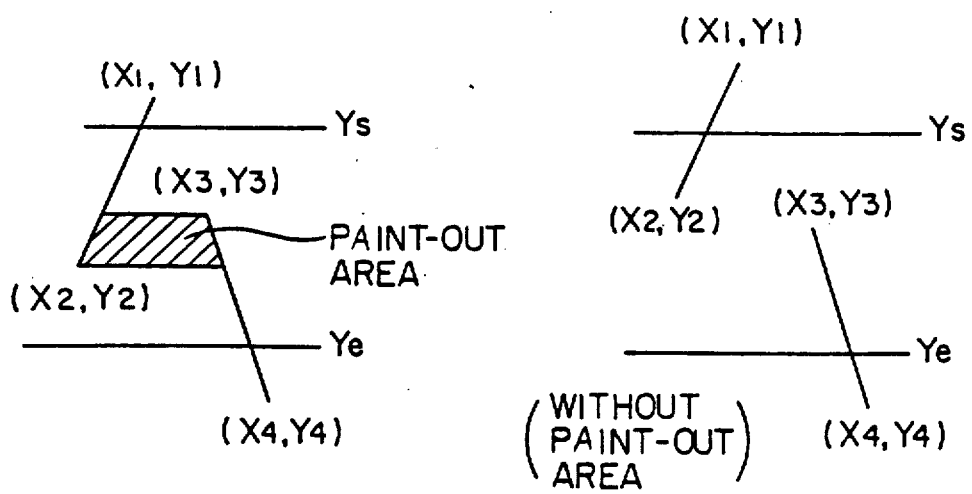
PAINT-OUT AREA
(WITHOUT PAINT-OUT AREA)

FIG. 31
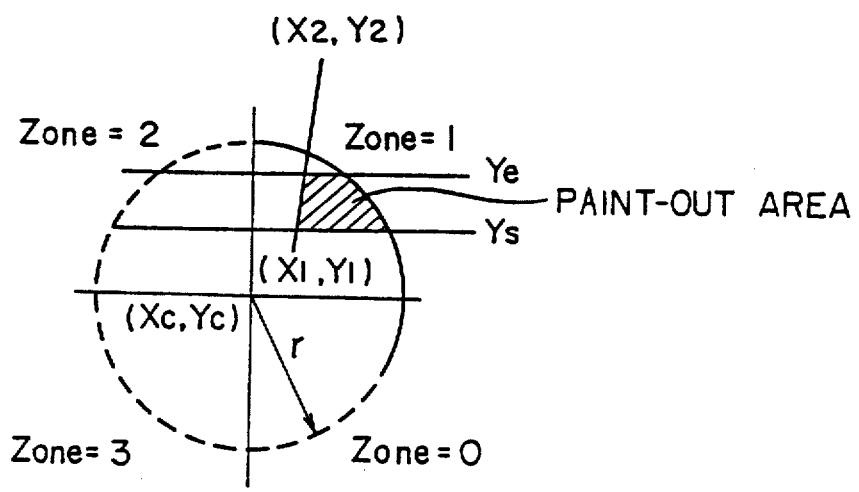
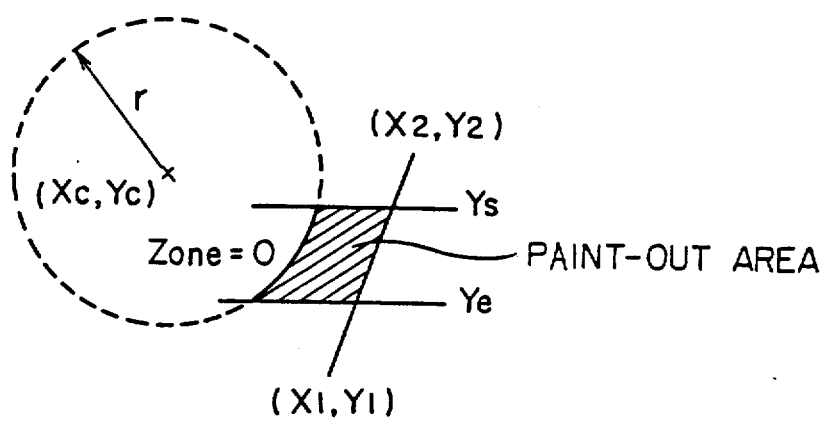
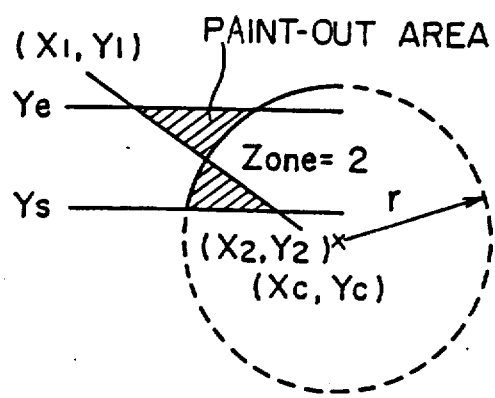

FIG. 32
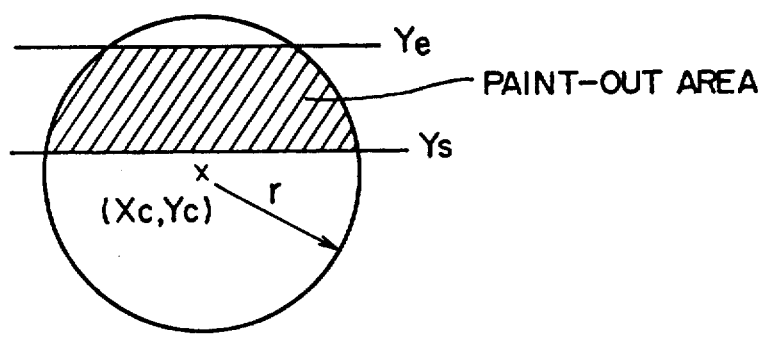
PAINT-OUT AREA
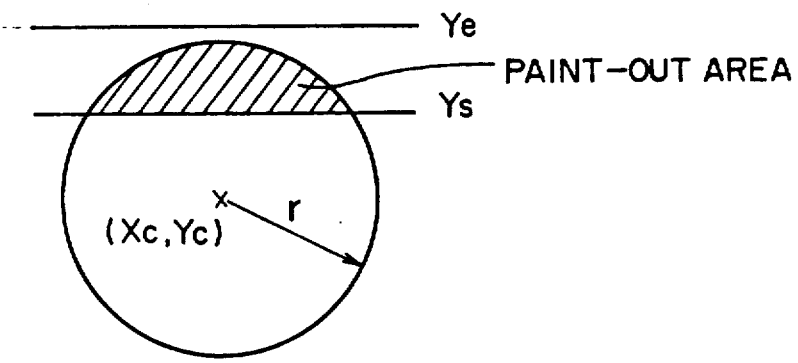
PAINT-OUT AREA
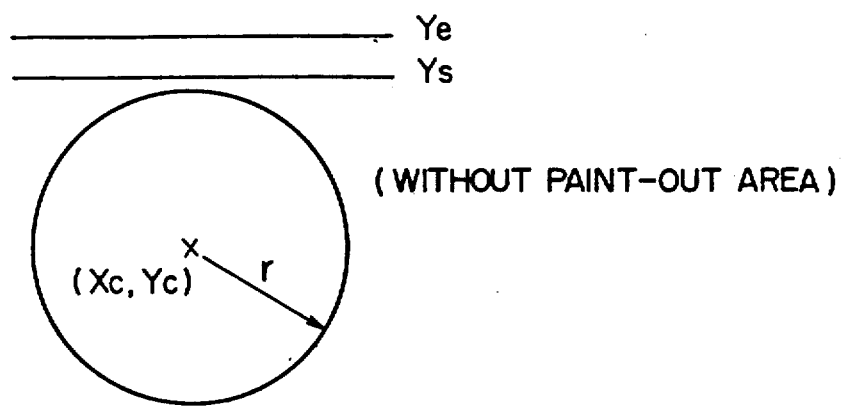
(WITHOUT PAINT-OUT AREA)

FIG. 33
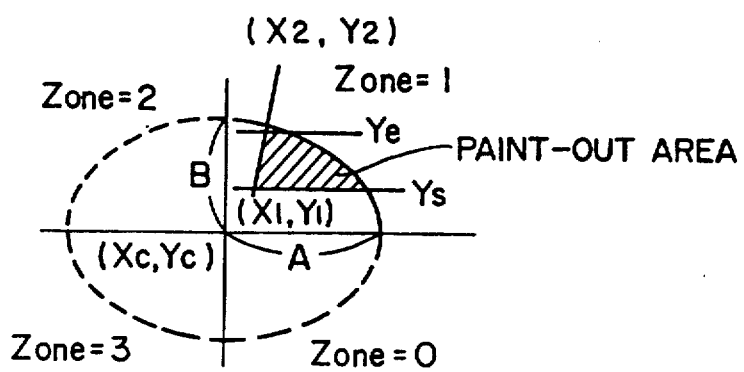
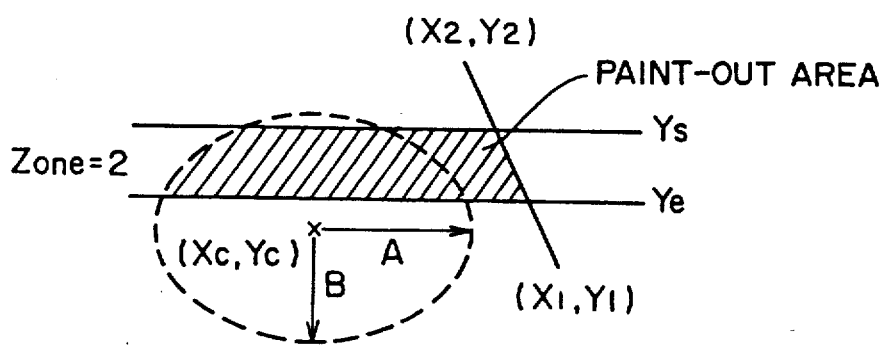
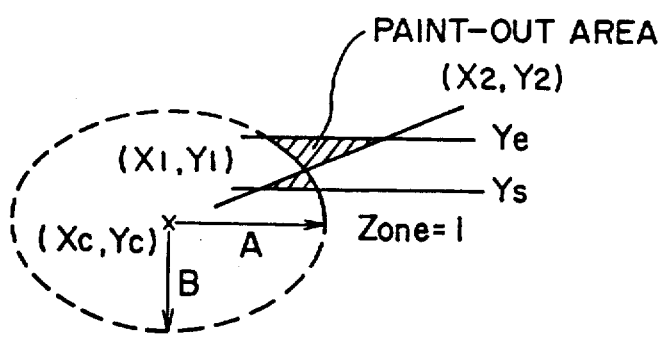
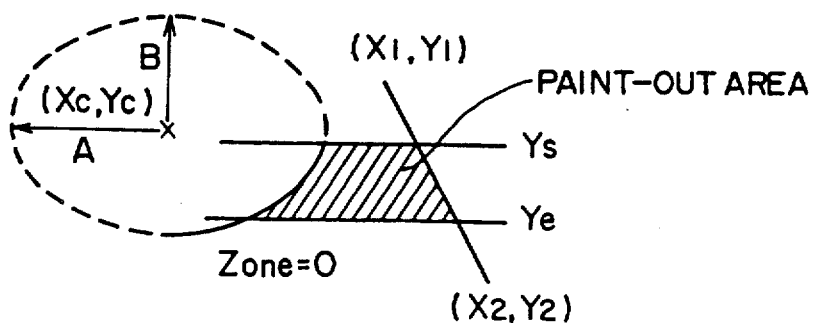

FIG. 34
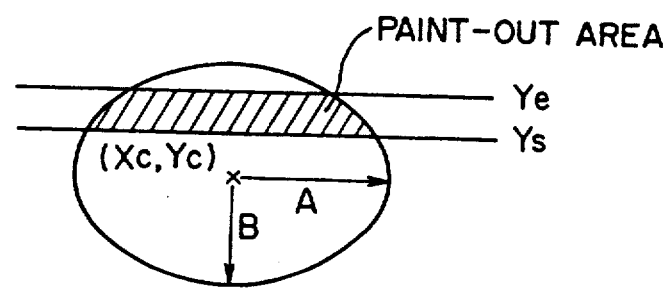
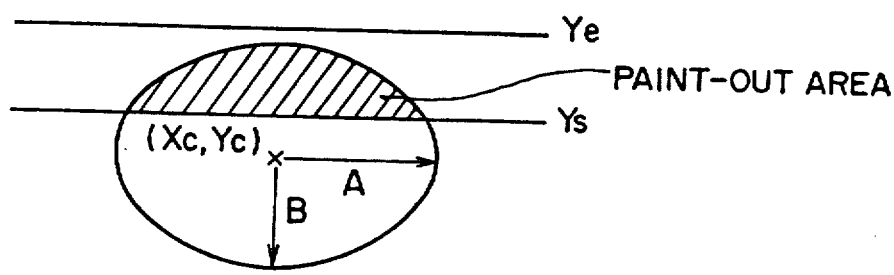
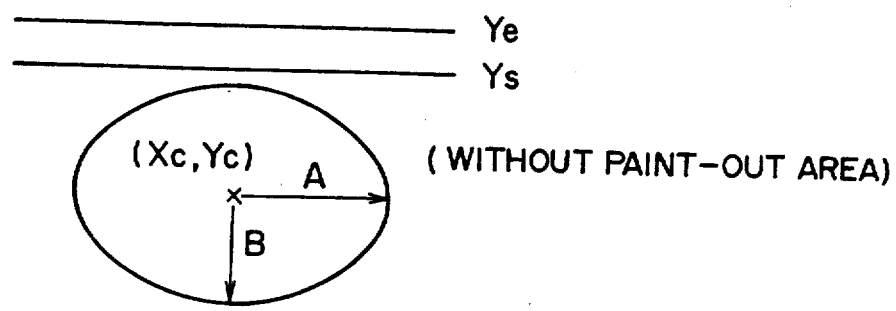

FIG. 38
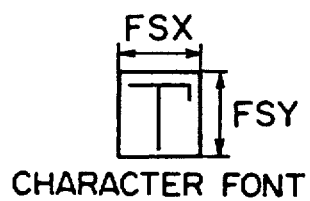
CHARACTER FONT
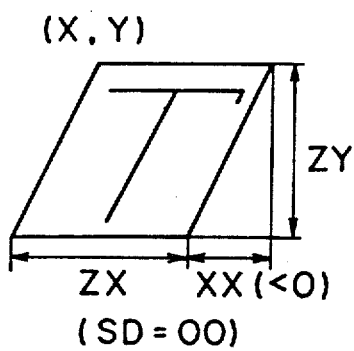
(SD = 00)
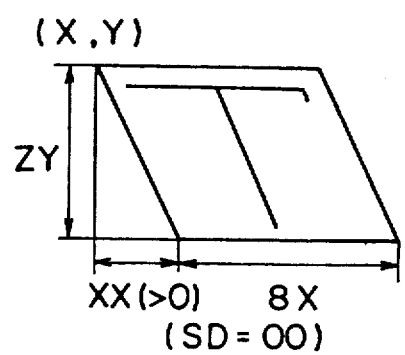
(SD = 00)
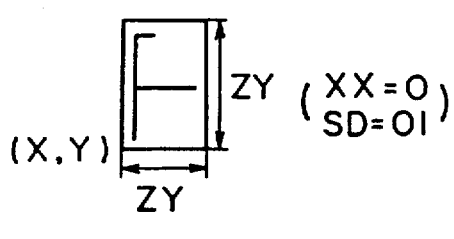
(XX=0, SD=01)
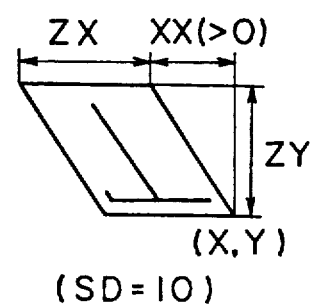
(SD = 10)
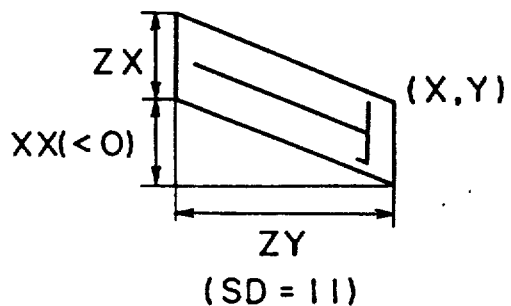
(SD = 11)

FIG. 44

| FBS3 | FBS2 | FBS1 | FBS0 | CONTENT |
|---|---|---|---|---|
| O | O | O | O | DO NOT ACCESS THE FRAME BUFFER |
| O | O | O | 1 | MEMORY WRITE CYCLE IN THE PIXEL UNIT |
| O | O | 1 | O | UNDEFINED |
| O | O | 1 | 1 | ADOUT EXECUTION CYCLE |
| O | 1 | O | O | 16-BIT UNIT MEMORY READ CYCLE |
| O | 1 | O | 1 | 16-BIT UNIT MEMORY WRITE CYCLE |
| O | 1 | 1 | O | 32-BIT UNIT MEMORY READ CYCLE |
| O | 1 | 1 | 1 | 32-BIT UNIT MEMORY WRITE CYCLE |
| 1 | O | O | O | DRAM REFRESH ADDRESS OUTPUT |
| 1 | O | O | 1 | DRAM REFRESH ADDRESS OUTPUT AND ATTRIBUTE SIGNAL OUTPUT |
| 1 | O | 1 | O | CURSOR ADDRESS OUTPUT |
| 1 | O | 1 | 1 | CURSOR ADDRESS OUTPUT AND ATTRIBUTE SIGNAL OUTPUT |
| 1 | 1 | O | O | BASE SCREEN DISPLAY ADDRESS OUTPUT |
| 1 | 1 | O | 1 | SUPERIMPOSED SCREEN DISPLAY ADDRESS OUTPUT |
| 1 | 1 | 1 | O | UNDEFINED |
| 1 | 1 | 1 | 1 | UNDEFINED |

FIG. 45

| OUTPUT TERMINAL | OUTPUT SIGNAL | | | | | | |
|---|---|---|---|---|---|---|---|
| | 32 BITS / PIXEL (LONG-WORD ACCESS) | 16 BITS / PIXEL (SHORT-WORD ACCESS) | 8 BITS / PIXEL | 4 BITS / PIXEL | 2 BITS / PIXEL | 1 BIT / PIXEL |
| MA 27 | MA 27 | MA 27 | MA 27 | MA 27 | MA 27 | MA 27 |
| MA 26 | MA 26 | MA 26 | PA 0 | PA 1 | PA 2 | PA 3 |
| MA 25 | MA 25 | MA 25 | MA 25 | PA 0 | PA 1 | PA 2 |
| MA 24 | MA 24 | MA 24 | MA 24 | MA 24 | PA 0 | PA 1 |
| MA 23 | MA 23 | MA 23 | MA 23 | MA 23 | MA 23 | PA 0 |
| MA 22 | MA 22 | MA 22 | MA 22 | MA 22 | MA 22 | MA 22 |
| MA 21 ∼ MA 0 | MA 21 ∼ MA 0 | MA 21 ∼ MA 0 | MA 21 ∼ MA 0 | MA 21 ∼ MA 0 | MA 21 ∼ MA 0 | MA 21 ∼ MA 0 |

DRAWING IN ARBITRARY DIRECTION
(VECTOR DRAWING)

DRAWING IN RASTER DIRECTION

FIG. 55A
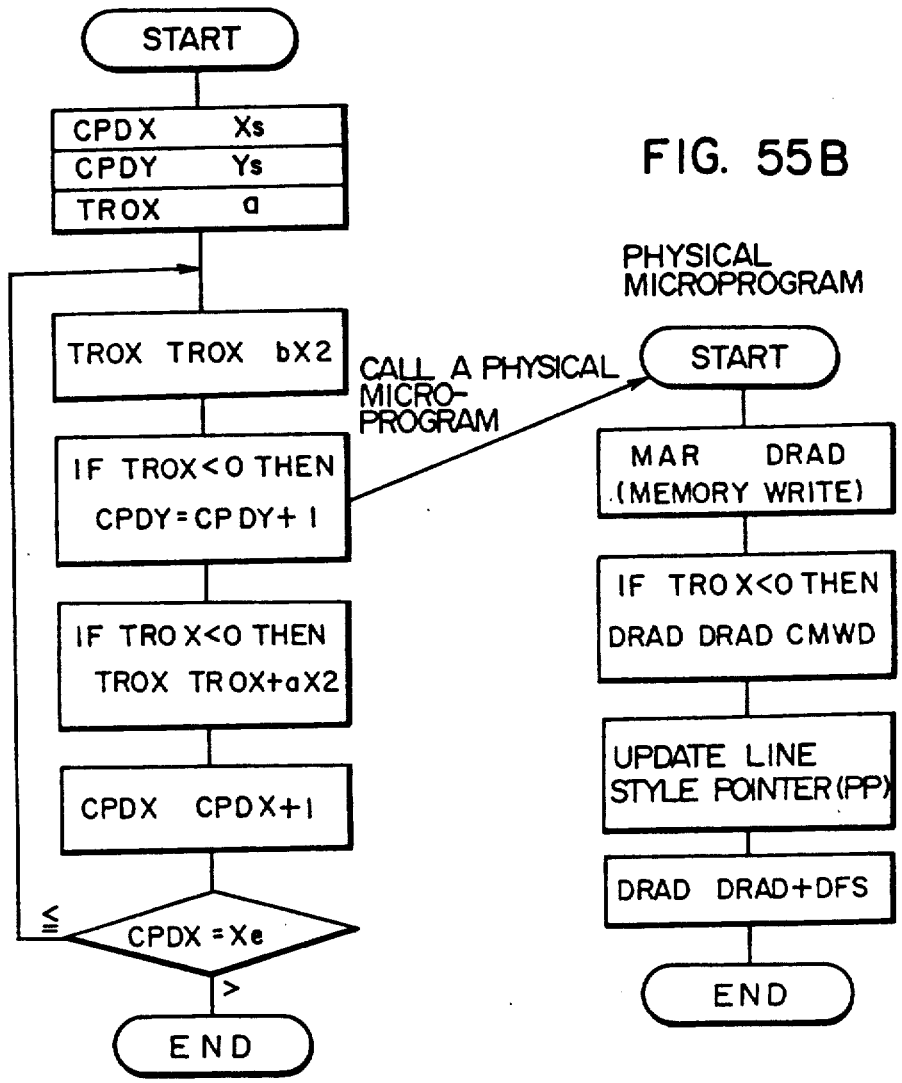
FIG. 55B
FIG. 55C
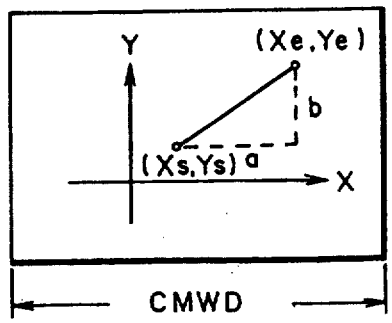

GRAPHIC PROCESSING SYSTEM HAVING BUS CONNECTION CONTROL CAPABLE OF HIGH-SPEED PARALLEL DRAWING PROCESSING IN A FRAME BUFFER AND A SYSTEM MEMORY

CROSS-REFERENCES TO THE RELATED APPLICATIONS

This application relates to the following U.S. applications:
1. U.S. Ser. No. 626,992 filed entitled "Display Controller", by Katsura et al., now U.S. Pat. No. 4,757,310;
2. U.S. Ser. No. 686,039 filed Dec. 24, 1984, entitled "Graphic Pattern Processing Apparatus", now U.S. Pat. No. 4,862,150;
3. U.S. Ser. No. 727,850 filed Apr. 26, 1985, entitled "Graphic Processing Apparatus", now U.S. Pat. No. 4,779,210;
4. U.S. Ser. No. 905,173 filed Sep. 9, 1986, entitled "Graphic Processing System", now U.S. Pat. No. 4,947,342, and
5. U.S. Ser. No. 565,910 filed Aug. 10, 1990, which is a continuation of U.s. Ser. No. 325,387 filed Mar. 20, 1989, now abandoned, which was a continuation of U.S. Ser. No. 072,094 filed July 10, 1987, now abandoned, entitled "Graphic Data Processing System", based on Japanese Patent Application No. 61-165393 filed July 14, 1986, and all assigned to the present assignee.

BACKGROUND OF THE INVENTION

The present invention relates to a graphic processing apparatus for displaying and printing out characters and graphics, and in particular, to a graphic processing apparatus capable of effecting a drawing processing at a high speed not only in a frame buffer but also in a system memory (main memory).

There has been a method (called a bit map method) to display characters and graphics on a CRT screen according to a raster scan method by use of a memory (bit map memory) storing information associated with each pixel of the display apparatus. Furthermore, this method including the bit map memory has also been applied to a case where control is effected to output data to a printer. Conventionally, processing to generate characters and graphic data in the bit map memory is primarily achieved by means of the software; however, there has arisen a problem that the processing speed is low because of a great amount of data to be processed. On the other hand, particularly, in a field where graphic forms are to be generated at a high speed, there has been partly used a method including dedicated hardware, which is however attended with a disadvantage that the cost of the graphic processing apparatus is increased.

To cope with such a situation, the function to generate characters and graphic data has become to be integrated in an LSI chip. Such an LSI has been proposed in the "CRT Controller Having a Plenty of Commands Such As Paint Out and Copy and Enabling to Specify Drawing Position by Coordinates" written by Kazuo Minorikawa in the "Nikkei Electronics", May 21, 1984, pp. 221-254; and in the U.S. Ser. Nos. 686,039 and 727,850. This LSI enables to greatly increase the speed of the graphic processing at a relatively low cost.

According to the paper above, the drawing processing can be executed in a frame buffer at a high speed; however, the drawing processing cannot be achieved in a system memory (main memory) connected to a CPU.

For example, other output means such as a control circuit of a printer is connected to a system bus in many cases, where a buffer for use with a print operation is reserved in the system memory. At the present stage of technology, in the case where graphic data is to be outputted to a printer, since the drawing operation cannot be accomplished by the CRT controller above, the drawing is effected by the software. As a result, though the graphic data to be displayed in the CRT screen is drawn at a high speed, the drawing of the graphic data to be outputted to a printer is executed at a low speed.

On the other hand, it can be considered as means to improve the processing performance, to subdivide the frame buffer in color plane units, thereby effecting a concurrent processing by use of a plurality of graphic processors. According to the method described in the papers above using the CRT controller, in order to achieve a copy processing of the same fundamental information (for example, font data of a character) onto a plurality of planes, it is necessary to beforehand store fundamental information in the frame buffer corresponding to the respective planes. Namely, the memory utilization efficiency is lowered because same information is arranged in a plurality of memories.

According to the prior art technology as described above, in addition to the low speed of the drawing operation in the system memory, a plurality of same information such as a character font must be provided in the case where the frame buffer is subdivided into color plane units to achieve a parallel processing thereon by a plurality of processors.

The JP-A-60-136793 has disclosed a graphic processing apparatus including a graphic generate function implemented as an LSI to achieve a graphic processing at a high speed by use of a bit map method. In the JP-A-60-136793, a plurality of pixel information are stored in a word of a memory, a predetermined word is read from the memory while an address identifying a pixel in sequence is being generated, particular pixel data is updated in the word, and the word data thus attained is written again in the word, thereby effecting a drawing operation. That is, the processing of a word is effected through a sequence of processing of a read operation, an arithmetic operation, and a write operation so as to achieve a drawing operation.

Furthermore, the JP-A-60-40588 describes a technology to write pixel information of a bit in a raster direction.

The JP-A-61-130991 (Japanese Patent Application No. 59-251907) has disclosed a graphic processing apparatus in which X and Y coordinates are calculated so as to effect a drawing operation while calculating an X-coordinate memory address corresponding to the attained coordinate values. According to the known example, the arithmetic unit to execute the coordinate calculation and an arithmetic unit to achieve the memory address calculation are controlled by a common microprogram.

In the "LSI Handbood", OHM-Sha, Ltd., Nov. 30, 1984, page 556 and subsequent pages, there has been disclosed a method in which in consideration of the fact that when a relatively complex processing is required to be executed in a unit of a pixel like in a graphics processing, it is not necessarily advantageous in the improvement of the utilization efficiency of the processor and in the enhancement of the speed of the image processing to accomplish all processing by the microprocessor, the generation of basic graphic forms, the operation to paint out a graphic form, the drawing of lines, etc. are achieved by an apparatus such as a display controller dedicated to the image processing.

Incidentally, when a bold line is to be drawn by a line drawing command in the prior art image processing apparatus such as a display controller, a line having a width determined by a size of a pixel is required to be many times drawn to attain the bold line.

As a processor for a graphic controller, there has been known a processor described in pages 522-589 of the "Hitachi Microcomputer 8/16-Bit Microcomputer Peripheral LSI" (HD63484) published from the Hitachi, Ltd. in Nov. 1985.

Representative drawing functions of the processor interpret and execute 38 kinds of graphic drawing commands, for example, to draw a line, to draw a circle, to paint a graphic form, to copy a graphic image, and the like. Moreover, the processor has several kinds of drawing and arithmetic operation modes. Particularly, when a conditional replacement is used, color drawing functions can be developed, for example, to specify a particular background color, to designate a drawing inhibit color, and to draw an image with a priority assigned to color data.

SUMMARY OF THE INVENTION

It is therefore an object of the present invention to provide a graphic processing system which enables the graphic processor to access the system memory so as to increase the speed of the drawing operation on the system memory and in which, when a parallel processing is executed by a plurality of processors, fundamental information such as a character font to be commonly used is located in the system memory so as to be shared among the processors.

Another object of the present invention is to provide a graphic processing apparatus in which processing of a pixel is accomplished on through a write operation so as to generate and to draw graphic data including a line, an arc, and the like.

Still another object of the present invention is to provide a graphic processing apparatus in which a microprogram to achieve the coordinate calculation and a microprogram to execute the memory address calculation are separated from each other so as to improve the describability or the describing capability of a program.

Further, another object of the present invention is to provide a graphic processing apparatus including a multi-way branch method improving the efficiency of a microprogram.

Another object of the present invention is to provide a graphic processing apparatus having an efficient method of debugging a microprogram in which a microprogram in execution is halted at a desired address, internal information of the graphic processing apparatus is read out, and thereafter the halted microprogram is restarted for the execution thereof.

Still another object of the present invention is to provide an graphic processing apparatus which is capable of effecting a drawing operation by use of as the basic unit a picture element (PEL), namely, a dot having an arbitrary shape and an arbitrary size configured in association with a plurality of picture cells (pixels).

Another object of the present invention is to provide an graphic processing apparatus in which during the drawing operation using the pel as the basic unit, a high-speed drawing operation and a drawing operation through a control effected on a pel region for a drawing area can be effected.

Another object of the present invention is to provide an image processing apparatus capable of achieving a data processing of a plurality of color pixel information in the unit of a word so as to increase the speed of the drawing processing.

According to a feature of the present invention, there is provided a graphic processing system having a graphic processor (GDP) which interprets a command transferred from a first data bus connected to a main processor (CPU) and effects an access (for example, a drawing) by use of a second address bus and a second data bus connected to a frame buffer. In the graphic processing system, there is provided bus connection control means capable of effecting a connection or a disconnection between the first address bus and the first data bus each connected to the main processor and the main memory and the second address bus and the second data bus each connected to the frame buffer.

In order to enable the graphic processor to achieve a drawing in the system memory, an address sent to the second address bus connected to the frame buffer is transferred via the bus connection control means and the first address bus to the system memory, and at the same time, the first data bus is connected to the second data bus so as to effect a data read/write operation requested by the GDP to read/write data in/from the system memory.

Furthermore, in a system including a plurality of graphic processors and a plurality of frame buffers for the respective color planes, the bus connection control means is controlled such that based on an address supplied from one of the graphic processors, basic information is read from the system memory and the obtained data is loaded in the processors at the same time. A high-speed drawing operation can be accomplished on the main memory by use of a second processor dedicated to the drawing operation.

According to a second feature of the present invention, drawing processor means which sequentially calculates drawing addresses and outputs drawing data so as to effect a drawing control outputs an address in word units together with information identifying pixels in a word, and then outputted information is interpreted by memory write control means, thereby achieving a write operation only in a portion of the memory corresponding to the identified pixels.

That is, the memory write control means generates a different write control signal for each memory element corresponding to each pixel of a word. The circuit configuration is implemented such that a write control signal is outputted for a word in the case of a write operation in the unit of a word, and a write control signal is delivered for a predetermined pixel in the case of a write operation in the unit of a pixel.

According to the third feature of the present invention, there is provided a drawing processing apparatus in which a microprogram to control the coordinate operation and a microprogram to control the memory address operation are separately arranged. The microprogram controlling the coordinate operation causes the microprogram controlling the memory address operation to operate and thereafter the microprogram controlling the memory address operation independently effects execution of the microprogram. When an operation request is issued during the operation of the microprogram controlling the memory address operation, there is used a means provided to cause the microprogram controlling the coordinate operation to stop the operation thereof until the processing of the microprogram controlling the memory address operation is finished.

According to another aspect of the features of the present invention there are provided means for storing information used to effect a multi-way branch in a microprogram controlling the coordinate operation and means for storing the number of the significant bits of said means such that when loading a jump address in an address register, only for the bits specified by the means storing the significant bit count, the data of means storing information of the multi-way branch is used in place of the jump address.

According to another aspect of the present invention, there are provided means for storing an address used to stop the microprogram controlling the coordinate operation and means for comparing the content of the means storing the stop address with an address of the microprogram so as to output a signal when a signal agreement results such that the agreement signal is used to set or reset the address register.

According to the third feature above, since the microprogram controlling the coordinate operation is separated from that controlling the memory address operation, the microprogram controlling the coordinate operation needs to only include a description of a drawing algorithm, which improves the descriptivity or the describing capability of the program.

The provisions of the means storing information to effect a multi-way branch in the microprogram and means indicating the significant bits of the means enable a variable number of branches to be specified.

Owing to the means comparing the content of the means storing an address to stop the microprogram with an address of the microprogram so as to output an agreement signal when a signal agreement results, a unique value can be generated and loaded in the address register of the microprogram in response to the agreement signal, thereby stopping the microprogram to effect a debug.

According to the outline of the fourth feature of the present invention, there is provided a graphic processing apparatus including pel data store means for storing pel data in the form of binary information associated with a dot having an arbitrary shape and an arbitrary size configured corresponding to a plurality of pixels and arithmetic means for achieving a logic operation to draw data undergone a color development based on the pel data according to a position of the indication point of the current pointer.

According to the constitution described above, a predetermined pel data is selected from various pel data defined in the pel data store means so as to effect a logic operation to achieve a drawing operation depending on the position of the indication point of the current pointer, thereby accomplishing an efficient operation to draw a bold line.

According to the fifth feature of the present invention, on receiving information including a plurality of bits representing a character or a graphic form in which a pixel comprises a bit, a plurality of bits are extracted therefrom so as to be subjected to a color development by use of a barrel shifter, the attained bits are expanded into bit information equivalent to a plurality of color pixels corresponding to color pixels in which a pixel comprise N bits, and depending on said bit information, the contents of a first color register and a second color register holding color pixel information equivalent to the plurality of pixels each comprising N bits are selectively outputted. Furthermore, color pixel information of two words each including a plurality of color pixel information is stored in a source data register, pixel data is extracted in the word units in association with the destination data by use of a barrel shifter, a color operation comparison is achieved depending on a color compare mode on color information specified by a combination of an output signal from the barrel shifter and the destination data or a combination of the output signal from the barrel shifter and the color compare register and color information specified by the destination data and the color compare register, and then depending on the output signal and a predetermined color processing signal, write color pixel information in the unit of a word is generated from the output signal from the barrel shifter and the destination data.

BRIEF DESCRIPTION OF THE DRAWINGS

The present invention will be apparent from the following detailed description taken in conjunction with the accompanying drawings in which:

FIGS. 11-19, 20A-20C and 21-24 are explanatory diagrams useful to explain functions of internal registers of the graphic processing apparatus;

FIGS. 25-41 are explanatory diagrams useful to explain command functions of the graphic processing apparatus;

FIG. 44 is an explanatory diagram useful to explain an access state signal to be used to access a bus;

FIG. 45 an explanatory diagram useful to explain an address multiplex operation;

FIGS. 55A-55C are flow charts and a graph schematically illustrating a 2-level microprogramming example;

DESCRIPTION OF THE PREFERRED EMBODIMENTS

Figure 1:
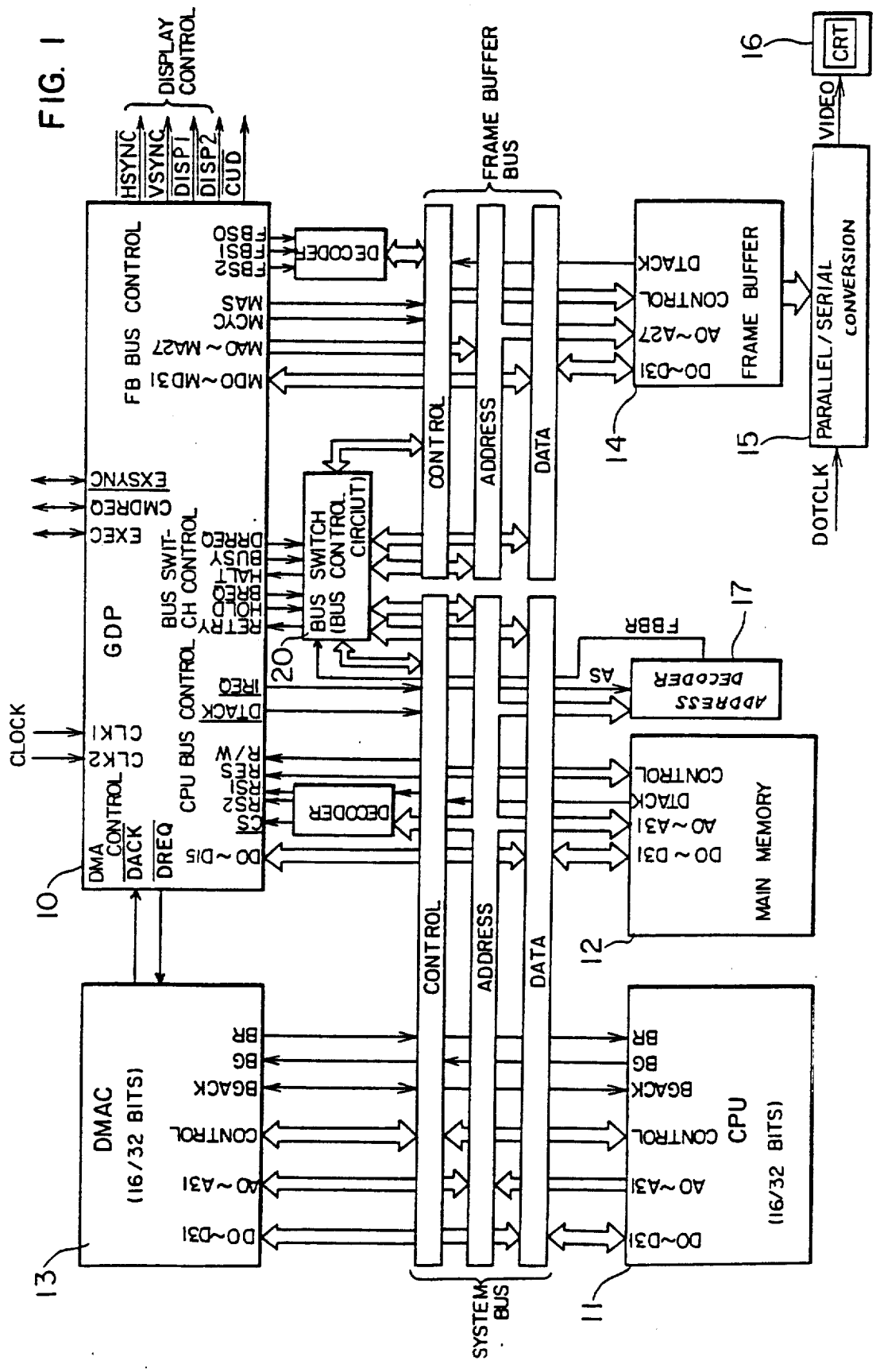
FIG. 1 is a schematic block diagram illustrating an embodiment, of,. the present invention.

Referring now to the drawings, the preferred embodiments of the present invention will be described.

FIG. 1 is a schematic diagram showing an example of the overall configuration of a graphic display apparatus according to the present invention. The configuration of FIG. 1 includes a graphic display processor (GDP) 10 to be used as second processor means, a central processing unit (CPU) 11 to be disposed as first processor means, a main memory 12 as first store means, a direct memory access controller (DMAC) 13, a frame buffer 14 as second store means, a display device (CRT) 16 as output means, an address decoder 17, and a bus switch 20 as bus connection control means. The GDP 10 may be generally called "graphic data processor". Although not shown in the configuration diagram, a system bus connected to the CPU 11 may be connected to other input/output means such as a display equipment and a printer so as to achieve input/output operations, for example, to display or print out data by use of pixel information stored in the main memory 12.

The CPU 11 executes programs stored in the main memory 12 or programs transferred from an external device (not shown) so as to manage and to control the overall system. The DMAC 13 controls direct memory accesses between the main memory 12 and the GDP 10, the frame buffer 14, or another input/output device (not shown). The graphic display processor 10 receives from a data bus connected to the central processing unit 11 a command and parameter information transferred from the central processing unit 11 or the main memory 12 and then accesses, according to a predetermined processing procedure, the frame buffer 14 or the main memory 12 via an address bus and a data bus each connected to the frame buffer 14 so as to generate a character and a graphic form. The graphic display processor 10 can also read a command and parameter information from the frame buffer 14. Furthermore, the graphic display processor 10 effects a control on a generation of a synchronization timing signal controlling the display device 16 and on an operation to read information to be sequentially displayed from the frame buffer 14 in synchronism with a predetermined timing. The graphic display processor 10 effects generation of a signal controlling the bus switch 20 which controls a direct memory access between the central processing unit 11 or the direct memory access controller 13 and the frame buffer 14 and generation of a control signal used by the graphic display processor 10 to access the main memory 12 for a generation of characters and graphics. The address decoder 17 decodes an address on the address bus and generates a frame buffer bus request signal to be sent to the bus switch 20. The bus switch 20 effects a change-over operation between the address buses, respectively, connected to the graphic display processor 10 and the central processing unit 11 so as to supply an address of the frame buffer 14 via the address bus thus selected. Alternatively, the bus switch 20 effects a change-over operation between the address buses, respectively, connected to the central processing unit 11 and the graphic display processor 10 so as to supply an address of the main memory 12 via the address bus thus selected. Namely, the bus switch develops a function as a bidirectional switch and is controlled by a control signal from the graphic display processor 10.

Figure 2:
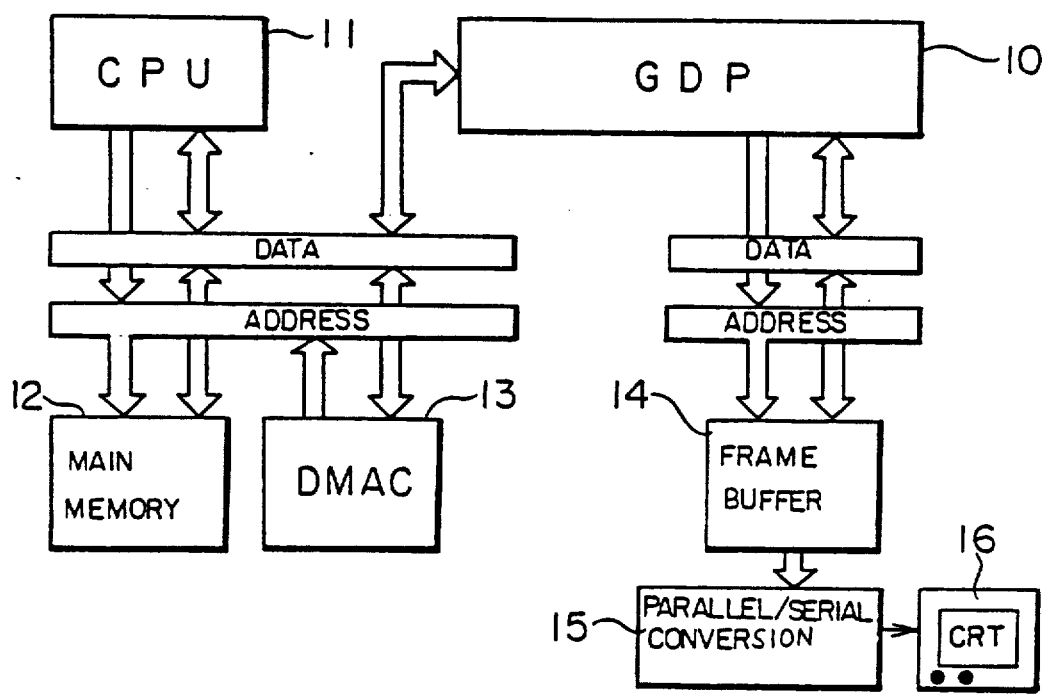
FIGS. 2-4 are schematic block diagrams respectively illustrating alternative system configurations.
Figure 3:
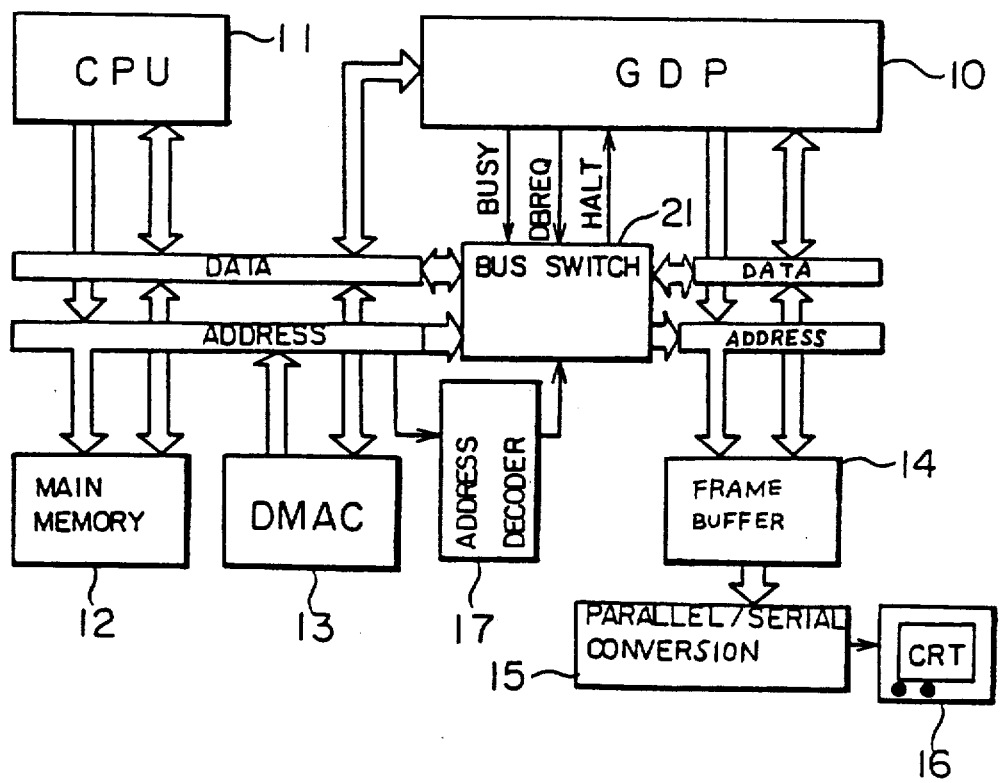
Figure 4:
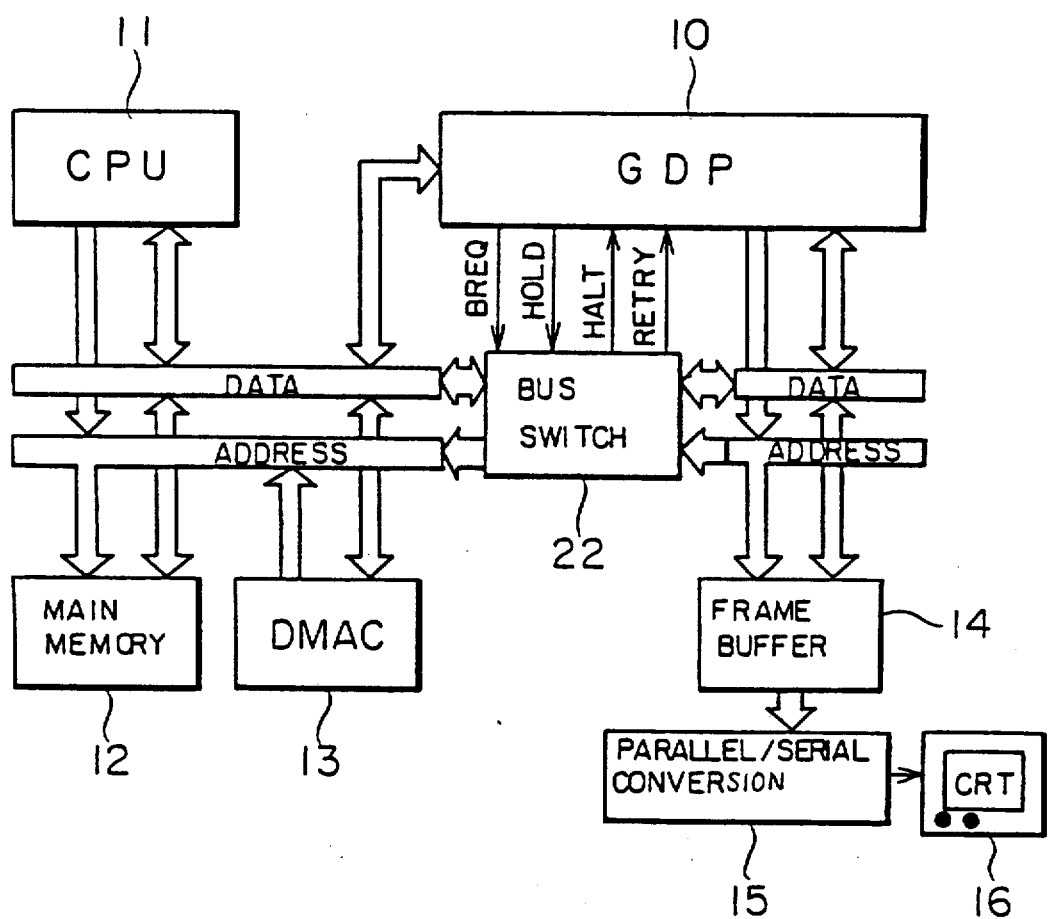

FIGS. 2-4 are schematic diagrams respectively, showing alternative configuration examples of the graphic processing apparatus. These configurations are also applicable to display devices such as a CRT, a liquid crystal display (LED), an EL display, a plasma display, an ECD display as well as to printing devices such as a thermal printer, a liquid crystal printer, an LED printer, and a laser beam printer. In the case of the printers, the portion of the display device 16 as an output device is replaced with a printing device.

FIG. 2 is a configuration diagram of a graphic display apparatus in which a bus connected to a central processing unit 11 is separated from a bus connected to a frame buffer 14.

The configuration of FIG. 2 includes a graphic display processor (GDP) 10, a central processing unit (CPU) 11, a main memory 12, a direct memory access controller (DMAC) 13, a frame buffer 14, a parallel/-serial convert circuit 15, and a display device (CRT) 16.

This configuration is simple and is hence suitable for a small-sized system.

FIG. 3 is a configuration diagram of an example of a graphic display apparatus including a bus switch 21 effecting a change-over operation between the address buses respectively connected to the graphic display processor 10 and the central processing unit 11 so as to supply an address of the frame buffer 14 via the address bus thus determined.

The configuration of FIG. 3 includes a graphic display processor (GDP) 10, a central processing unit (CPU) 11, a main memory 12, a direct memory access controller (DMAC) 13, a frame buffer 14, a parallel/ serial convert circuit 15, a display device (CRT) 16, an address decoder 17, and a bus switch 21.

In the configuration example of FIG. 1 or 3, the frame buffer 14 is assigned to a portion of the address space of the central processing unit 11 such that a signal requesting the right to use the bus of the frame buffer 14 is generated through a decode operation of the address decoder 17, thereby accomplishing a data transfer between the central processing unit 11 and the frame buffer 14 or directly between the memory access controller 13 and the frame buffer 14 without necessitating an intervention from the graphic display processor 10. As a result, there is attained an effect that the central processing unit 11 is enabled to arbitrarily access the frame buffer 14.

FIG. 4 is a configuration diagram showing an example of a graphic display apparatus having a bus switch 22 which achieves a change-over operation between the address bus connected to the central processing unit 11 and the address bus connected to the graphic display processor 10 so as to supply an address of the main memory 12 via the address bus thus selected.

The configuration of FIG. 4 comprises a graphic display processor (GDP) 10, a central processing unit (CPU) 11, a main memory 12, a direct memory access controller (DMAC) 13, a frame buffer 14, a parallel/-serial convert circuit 15, a display device (CRT) 16, and a bus switch 22.

In the configuration of FIG. 1 or 4, if a character font is arranged in a region of the main memory 12, the graphic display processor 10 can effect a color expansion processing of a bit map character. Furthermore, if pattern information including binary information or multi-value information is disposed in a region of the main memory 12, the graphic display processor 10 can execute a pattern expansion processing. Alternatively, a bit map may be copied between the main memory 12 and the frame buffer 14. The copy of the bit map can be achieved also between bit maps in which the memory width or the number of bits per pixel varies therebetween.

A detailed description will now be given of a control example in the case where the central processing unit 11 directly accesses the frame buffer 14 without using the graphic display processor 10. It should be noted that the direct access capability to directly access the frame buffer 14 is not limited to the central processing unit 11, in other words, the present access method is applicable to any semiconductor devices such as direct memory access controller 13 which are connected to the address bus and the data bus related to the central processing unit 11 and which have a data transfer function.

Figure 5:
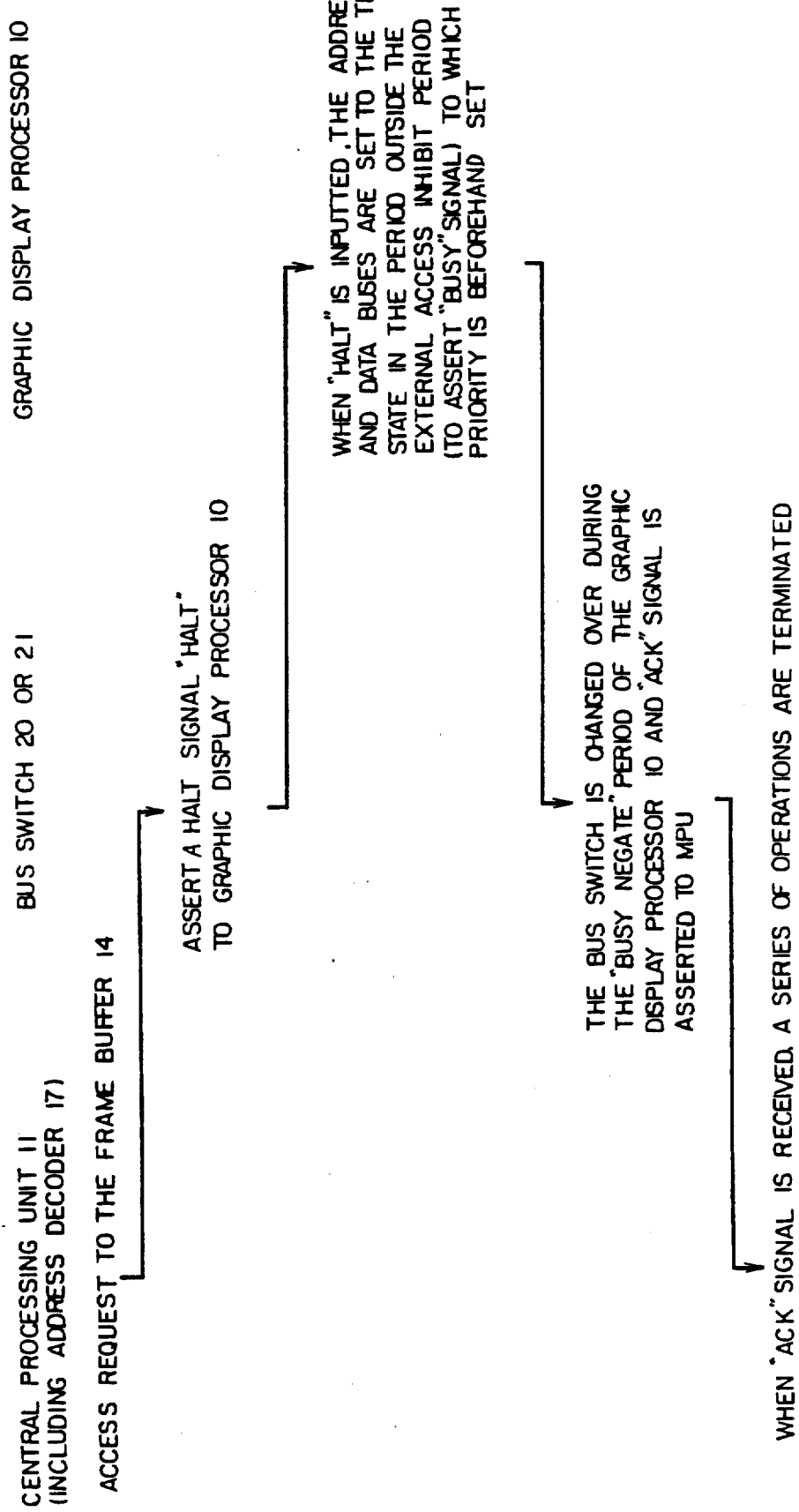
FIGS. 5-6 are operation flow diagrams associated with a memory access.

FIG. 5 is a schematic diagram showing a sequence used when the central processing unit 11 accesses the frame buffer 14 via the bus switch 20 or the bus switch 21. The address decoder 17 decodes an address of the address bus connected to the central processing unit 11 so as to assert a signal requesting a bus right of the frame buffer 14 to the bus switch 20 or 21. On receiving the signal requesting the bus right, the bus switch 20 or 21 asserts a halt signal HALT to the graphic display processor 10. Although the graphic display processor 10 effects a drawing, a display, a refresh control, and an attribute output on the frame buffer 14, the graphic display processor 10 can beforehand set priority to the HALT input and asserts to an external device a BUSY signal indicating a period of time during which the HALT signal is not effective. For a HALT input in a period of time other than the period associated with the BUSY signal, the graphic display processor 10 stops the internal operation thereof to set the address bus and the data bus to the try state. During the period other than that associated with the BUSY signal, the bus switch 20 or 21 connects the system bus to the frame buffer bus, which enables the central processing unit 11 to access the frame buffer 14. When an access is achieved, the bus switch 20 or 21 delivers an ACK signal to the central processing unit 11, thereby completing the sequence of operations.

A description has been given of the case where the graphic processing apparatus includes one graphic display processor 10. When a plurality of graphic display processors 10 or graphic display processors having different functions are connected to the same frame buffer bus, each graphic display processor is so configured to output a drawing request signal DRREQ, thereby enabling a bus arbitration to be effected.

Figure 6:
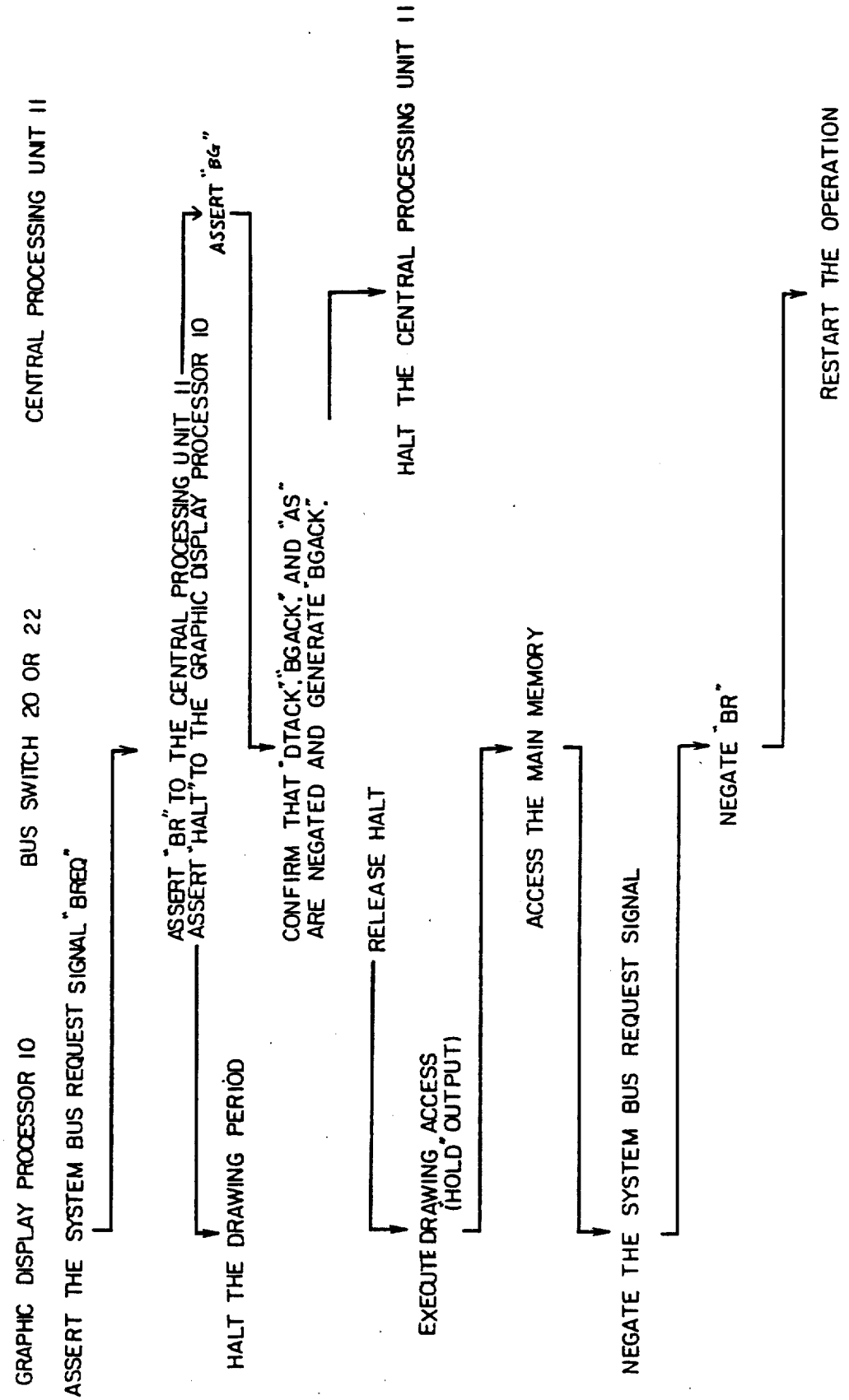

FIG. 6 is a schematic diagram showing a sequence applied to the case where the graphic display processor 10 accesses the main memory 12 via the bus switch 20 or 22.

If a command Main Memory Access Mode (MMA) is beforehand set to the graphic display processor 10, the 256 megabytes of the upper-half of the address space (512 megabytes in total) possessed by the graphic display processor 10 can be allocated as space of the main memory 12. In this case, the graphic display processor 10 asserts the system bus request signal BREQ. On receiving the bus request signal, the bus switch 20 or 22 asserts a bus request signal BR to the central processing unit 11 (e.g. Hitachi's HD68000). At the same time, a HALT signal is delivered to the graphic display processor 10 so as to cause the drawing processor to be stopped. When the bus switch 20 or 22 receives a bus grant signal BG from the central processing unit 11, the bus switch 20 or 22 confirms that the system bus has been opened and then asserts a BGACK (bus grant acknowledge) signal to the central processing unit 11. Simultaneously, a HALT signal is negated for the graphic display processor 10 so as to allow an access to the system bus. In the drawing period, the graphic display processor 10 outputs a HOLD signal to indicate a period during which an access to the system bus is achieved. During the HOLD period, the bus switch 20 or 22 executes an access to the main memory 12.

When a drawing on the main memory 12 is not finished in one cycle, the bus switch 20 or 22 asserts a RETRY signal to the graphic display processor 10 so as to enable the drawing operation to be executed again.

Figure 7:
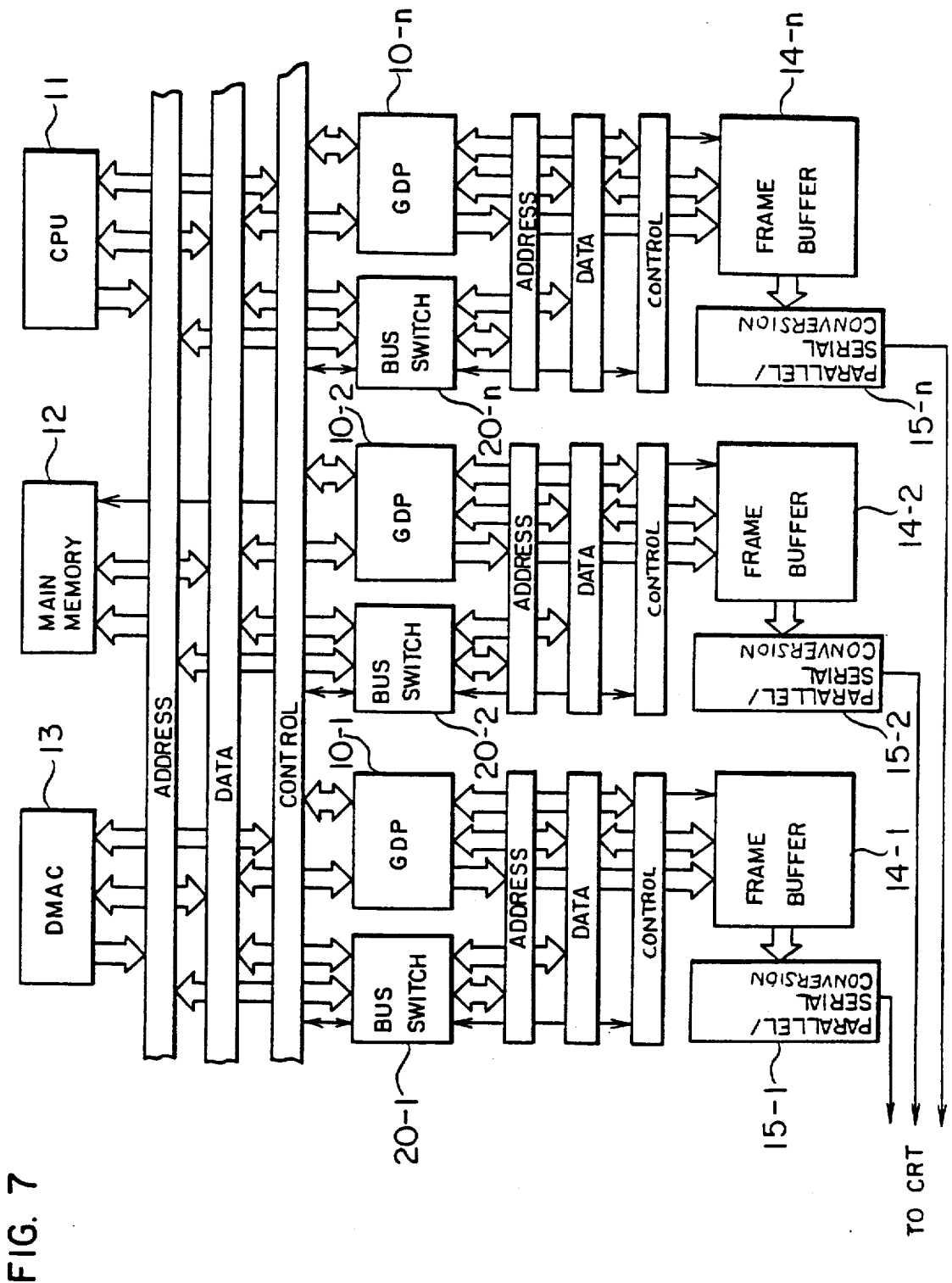
FIG. 7 is a schematic block diagram illustrating another embodiment of the present invention.

FIG. 7 is a schematic diagram showing an example of a graphic display apparatus including a plurality of graphic display processors 10. The configuration includes n graphic display processors 10-1 to 10−n (n≧2), a central processing unit 11, a main memory 12, a direct memory access controller 13, n frame buffers 14-1 to 14-n, n parallel/serial convert circuit 15-1 to 15-n, a display device (CRT, not shown), and n bus switches 20-1 to 20-n.

According to the embodiment of FIG. 7, when data of a pixel is represented by a plurality of bits (for a multicolor or a multitone display), the frame buffer 14 is subdivided in the color plane units and a plurality of graphic display processors 10 are arranged so as to enable a parallel processing to be accomplished. The graphic display processors 10-1 to 10-n can access the main memory 12 owing to an effect of the bus switches 20-1 to 20-n, respectively. As a consequence, such fundamental information as a character font to be commonly used can be loaded in the main memory 12, which enables to improve the memory utilization efficiency. Furthermore, in the case where a common processing is executed, for example, to develop a character font in the respective frame buffers 14-1 to 14-n, the command processing can be synchronized by use of an EXEC (execute) signal and therefore data read from the main memory 12 can be simultaneously obtained by the graphic data processors 10-1 to 10-n. As a result, the same data need undergo only one read operation and hence the processing efficiency can be increased.

Next, a detailed explanation will be given of the internal configuration of the graphic display processor (GDP) 10.

Figure 8:
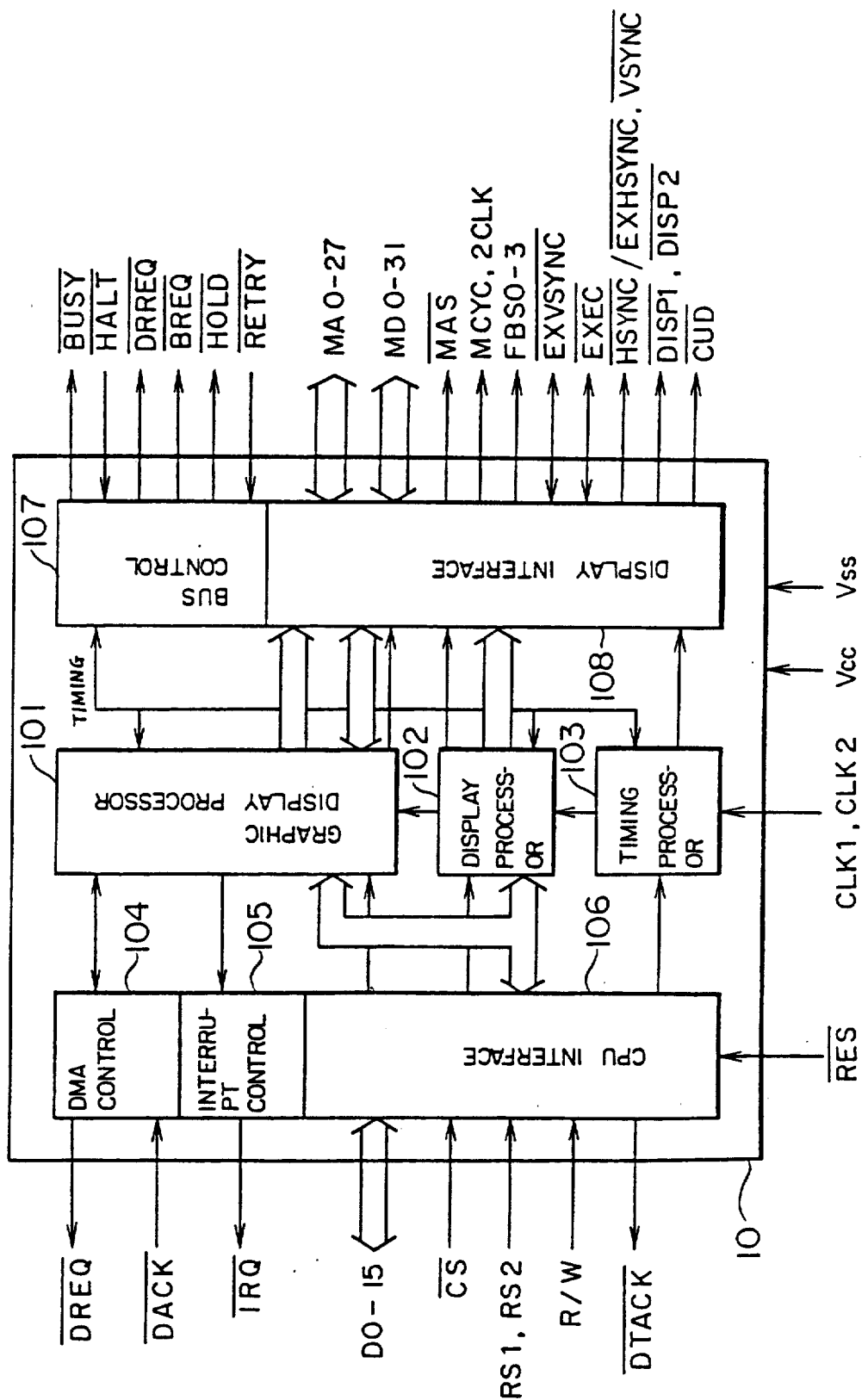
FIGS. 8-10 are schematic block diagrams respectively illustrating internal configurations of a graphic processing apparatus.

FIG. 8 is a schematic diagram showing the internal configuration of the graphic display processor 10 including a drawing processor 101, a display processor 102, a timing processor 103, a CPU interface 106, an interrupt control circuit 105, a DMA control circuit 104, a display interface 108, and a bus control circuit 107. The drawing processor 101 controls a graphic generation of a line, a plane, and the like, a data transfer between a CPU and a display memory, and the like; namely, the drawing processor 101 outputs a drawing address to effect a read/write operation in the display memory. The display processor 102 outputs display addresses of the display memory for a sequential display effected according to a rastar scan operation. The timing processor 103 generates various timing signals such as a synchronization signal and a display timing signal of the CRT and a signal to be used to change over between a display operation and a drawing operation. The CPU interface 106 supervises the interface with respect to the central processing unit (CPU) 11 such as an operation to synchronize the CPU data bus with the graphic display processor 10. The interrupt control circuit 105 generates an interrupt request signal ($\overline{IRQ}$) to the CPU. The direct memory access (DMA) control circuit 104 controls communication of control signals with respect to the DMA controller (DMAC) 13. The display interface 108 supervises the interface between the display memory and the display device, for example, the changeover control between a display operation and a drawing operation. The bus control circuit 107 controls the bus access right for the frame buffer so as to determine whether or not a bus usage is allowed for a signal requested from an external device. In the graphic display processor 10, the functions are divided among the three processors related to the drawing, display, and timing functions to achieve a parallel operation, thereby improving the processing efficiency.

Next, a detailed description will be given of functions of the input/output terminals of the graphic display processor 10.

(1) Bidirectional data bus (D0-D15: Input/output)

Input/output signals used to a data transfer between the system bus and the graphic display processor 10. The terminal includes a three-state buffer and is set to a high-impedance state in operations other than an operation to read an internal register of the graphic display processor 10 from the side of the central processing unit 11.

(2) Reset ($\overline{RES}$: Input)

Input signal to reset the internal state of the graphic display processor 10 from an external device. When a signal at a "Low" level is inputted to this terminal, the internal state is reset to stop the display and drawing operations.

(3) Read/write (R/$\overline{W}$: Input)

Input signal to control the direction of a data transfer between the system bus on the central processing unit 11 and the graphic display processor 10. When this signal is at a "High" level, a read operation is effected (to transfer data from the graphic display processor 10 to the side of the central processing unit 11); whereas when this signal is at a "Low" level, a write operation is executed (to transfer data from the side of the central processing unit 11 to the graphic display processor 10). In the DMA transfer mode, however, when the R./$\overline{W}$ signal is at a "High" level, data is transferred from the main memory side to the graphic display processor 10; whereas when the R/$\overline{W}$ signal is at a "Low" level, data is transferred from the GDP 10 to the side of the main memory 12.

(4) Chip select ($\overline{CS}$: Input)

Select input used by the central processing unit 11 to access the graphic display processor 10. Only when a "Low"-level signal is supplied to the $\overline{CS}$ terminal, a read/write operation can be achieved on an internal register of the graphic display processor 10.

(5) Register select (RS 1-2: Input)

Input signals to select an internal register of the graphic display processor 10. When the RS 1 and RS 2 are both at a "Low" level, an address register is selected for a write operation and a status register is selected for a read operation. For RS 1 ="Low" and RS 2 ="High", an FIFO register is selected; where as for RS 1 ="High" and RS 2 ="Low", a control register specified by the address register is selected.

(6) Data transfer acknowledge ($\overline{DTACK}$: Output)

Output signal indicating a completion of a data transfer. When establishing an interface with an asynchronous bus, the data transfer is controlled by use of this signal.

(7) Interrupt request ($\overline{IRQ}$: Output)

Output signal for an interrupt request indicating the central processing unit 11 a condition such as a command termination or a detection of an undefined command. This terminal is of an open drain output and hence a wired OR operation can be effected with an interrupt request outputted from another device.

(8) DMA transfer request ($\overline{DREQ}$: Output)

Output signal to request a data transfer to the DMAC 13 when a data transfer is achieved in the DMA transfer mode. For the DMA transfer operation, a cycle steal or a burst mode can be selected.

(9) DMA transfer acknowledge ($\overline{DMCK}$: Input)

Answer input from the DMAC 13 in response to the $\overline{DREQ}$ signal. When a signal at a "Low" level is inputted to this terminal, an access of data is achieved.

(10) Horizontal synchronization/external horizontal synchronization ($\overline{HSYNC}/\overline{EXHSYNC}$: Input/output)

When set to an output, this terminal outputs a horizontal synchronization signal of the CRT display device 16. When set to an input, the horizontal synchronization signal is inputted from an external device such as a TV set and the internal horizontal synchronization operation is effected in synchronism with the input signal.

(11) Vertical synchronization ($\overline{VSYNC}$: Output)

Output signal to apply a vertical synchronization to the CRT display device 16.

(12) External vertical synchronization ($\overline{EXVSYNC}$: Input/Output)

Input/output signals to effect a parallel operation of a plurality of graphic display processors 10-1 to 10-n and a synchronization operation with respect to another external device. In the master mode, this terminal is used for an output, whereas in the slave mode, the terminal is used for an input. In the noninterlace operation, the synchornization is achieved by use of a signal identical to $\overline{VSYNC}$: whereas in the interlace mode, a signal obtained by extracting the $\overline{VSYNC}$ only from the odd fields is sued for the synchornization.

(13) Display timing ⅓ $\overline{DISP1}$, $\overline{DISP2}$: Output)

Output signal to indicate a display timing of a screeen. $\overline{DISP1}$ is a signal output obtained by O-Ring the screens set s the base screen during the display period. $\overline{DISP2}$ outputs a signal indicating a display period of a superimposed screen.

(14) Cursor display ($\overline{CUD}$: Output)

Output signal to display a cursor on a screen of the CRT display device 16. By controlling a cursor define register, a graphic cursor or a cross-hair cursor can be selected.

(15) Memory data (MDO-31: Input/output)

Input/output terminal comprising 32 bits used to transfer data between the graphic display processor 10 and the frame buffer 14. During the display cycle, this terminal issued to output an attribute signal.

(15) Memory address (MAO-27: Otuput)

Terminal to otuput an address of the frame buffer 14. When a dynamic RAM is sued for the frame buffer 14, a refresh address can be outputted to this terminal during the horizontal synchronization period.

(17) Memory address strobe (MAS: output)

Strobe signal indicating periods during which outputs of MA0-27 are effective.

(18) Frame buffer bus status (FBS0-3: Output)

Output signal to indicate a status of the frame memory bus for each memory cycle. Externally, the type of the bus cycle can be known by decoding this signal. Details are listed in that following Table.

| FBS3 | FBS2 | FBS1 | FBS0 | Contents |
| --- | --- | --- | --- | --- |
| 0 | 0 | 0 | 0 | The graphic display processor is not accessing the frame buffer. |
| 0 | 0 | 0 | 1 | Indicates a memory write for each pixel in the write only mode. |
| 0 | 0 | 1 | 0 | Indicates a memory read in a drawing for each word (16 bits). |
| 0 | 0 | 1 | 1 | Indicates a memory write in a drawing for each word (16 bits). |
| 0 | 1 | 0 | 0 | Indicates a memory read in a drawing for each long word (32 bits). |
| 0 | 1 | 0 | 1 | Indicates a memory write in a drawing for each long word (32 bits). |
| 0 | 1 | 1 | 0 | Undefined. |
| 0 | 1 | 1 | 1 | Indicates an execute cycle of ADOUT command. |
| 1 | 0 | 0 | 0 | Indicates a display address output of a base screen (other than the superimposed screen). |
| 1 | 0 | 0 | 1 | Indicates a display address output of a superimposed screen. |
| 1 | 0 | 1 | 0 | Undefined. |
| 1 | 0 | 1 | 1 | Undefined. |
| 1 | 1 | 0 | 0 | Indicates a refresh address output of DRAM. |
| 1 | 1 | 0 | 1 | Indicates a refresh address output of DRAM and an attribute output from the MD terminal. |
| 1 | 1 | 1 | 0 | Outputted in a drawing cycle for a memory cycle when CDEND is executed. |
| 1 | 1 | 1 | 1 | Indicates that GDP is stopped in a drawing of outside of an area during an execution of PUT with data DMA in the burst mode. |

(19) Execute (EXEC: Input/output)

Input/output signals to synchronize the drawing operation for each command when n graphic display processors 10-1 to 10-n are used in the color plane units.

This terminal is of the open drain and the signal for each of the graphic display processors 10-1 to 10-n is connected in a wired OR circuit. The graphic display processors 10-1 to 10-n each set this terminal to "Low" during an execution of a command, and when the command is completed, the terminal is set to "High". Consequently, the terminal undergone the wired-OR connection is set to "High" when all graphic display processors 10-1 to 10-n finish the execution of a command. Although the graphic display processors 10-1 to 10-n each cannot proceed to execution of the next command while this terminal is in the "Low" level, the execution of the next command can be commenced immediately after a state that the terminal is in the "High" level is detected.

(20) Clock 1, 2 (CLK 1, 2: Input)

Inputs clock signals to be a reference of the internal operation of the graphic display processor 10. Clock signal CLK 2 receives a signal which is delayed in phase by 90° from a signal received by clock signal CLK 1.

(21) 2 clock (2 CLK: Output)

Outputs a clock signal obtained by dividing the clock signal CLK 1 by two.

(22) Memory cycle (MCYC: Output)

Signal output indicating a memory access timing of the frame buffer 14. This signal is obtained by dividing the 2CLK by two.

(23) Bus request (BREQ: Output)

Request signal for a bus utilization right when the graphic display processor 10 accesses the system memory 12.

(24) Hold (HOLD: Output)

When the bus master state is set as a result of a bus request issued from the graphic display processor 10 to the system bus, the graphic display processor 10 outputs "High" to this terminal while the bus is being occupied.

(25) Retry (RETRY: Input)

Input terminal to instruct reexecution of a drawing access. In the case where the graphic display processor 10 accesses the system memory 12, when the cycle time of the system memory 12 is longer than that of the graphic display processor 10, if "High" is inputted to this terminal, the same memory access can be reexecuted in the subsequent memory cycle.

(26) Busy (BUSY: Output)

Indicates a period of a memory cycle during which the graphic display processor 10 cannot release the frame buffer 14. A "High"-level signal is outputted while a refresh address is being outputted or during a period of the display memory cycle in the display priority mode.

(27) Halt (HALT: Input)

Input signal to inhibit a frame buffer access of the graphic display processor 10. When the BUSY is at a "Low" level, the HALT is accepted and the graphic display processor 10 therefore does not execute a memory access. When the BUSY signal is at a "High" level, this signal input is ignored. Consequently, the drawing memory cycle can be inhibited in the display priority mode, whereas the drawing and display memory cycles can be inhibited in the drawing priority mode by use of this signal. Furthermore, when the graphic display processor 10 accesses the system memory 12, a "High"-level signal is inputted from an external circuit to this terminal after a BREQ signal is outputted, and then a "Low"-level signal is supplied to the HALT terminal in response to the utilization approval signal on the system bus, thereby notifying that the bus can be used.

(28) Draw request (DRREQ: Output)

Draw request signal for the frame buffer 14. When a plurality of graphic display processors 10 share the frame buffer 14, this signal is judged by an external bus arbitrate circuit to assign a bus usage right.

Figure 9:
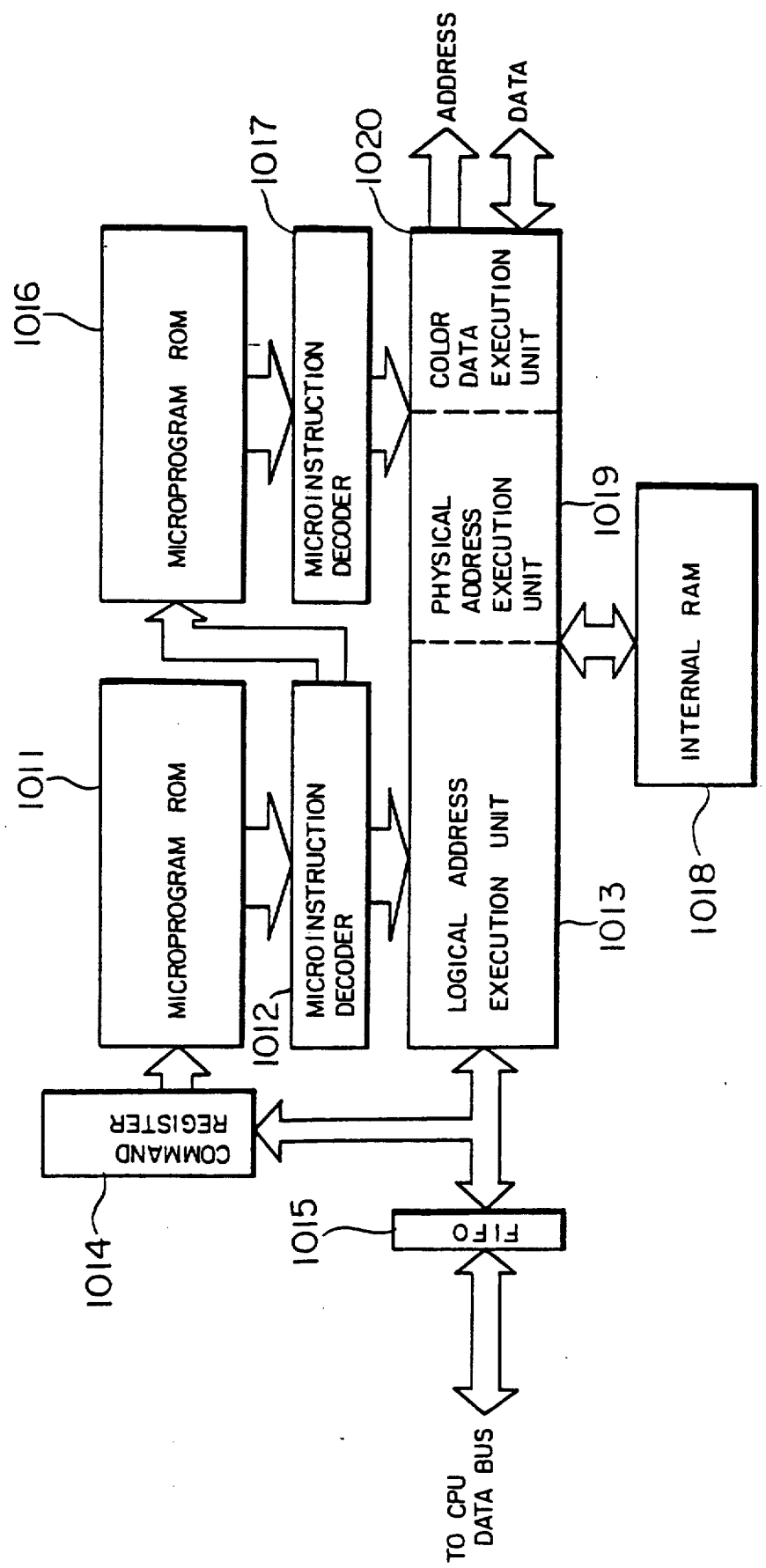

FIG. 9 is a configuration diagram showing an internal structure of the drawing processor 101 in the graphic display processor 10. The drawing processor 101 includes an FIFO 1015 to communicate commands and parameters with the central processing unit 11 and the like, a command register 1014 to set a command, a logical address execution unit 1013, a first microprogram ROM 1011 and a first microinstruction decoder 1012 each controlling the logical address execution unit 1013, a physical address execution unit 1019, a color data execution unit 1020, a second microprogram ROM 1016 and a second microinstruction decoder 1017 each controlling the physical address execution unit 1019 and the color data execution unit 1020, and an internal RAM 1018 storing line type information, pel information and the like.

A command received from the central processing unit (CPU) 11 is loaded in the command register 1015 and then a microprogram corresponding thereto is read from the first microprogram ROM 1011. The first microinstruction decoder 1012 decodes the command so as to control the logical address execution unit 1013. On the other hand, a portion of the microinstruction is used as an address to read the microprogram ROM 1016. The obtained microprogram is decoded by the second microinstruction decoder 1017 so as to control the logical address execution unit 1019 calculating a memory address of the frame buffer 14 corresponding to the logical address and the color data execution unit 1020 calculating graphic data. Furthermore, the internal RAM 1018 includes an addressing space unique to the internal RAM 1018 and a frame buffer addressing space which can be accessed as a part of the frame buffer space. Since the internal RAM 1018 can be accessed at a higher speed as compared with the frame buffer 14, the internal RAM 1018 is suitable for a storage of information to be frequently accessed. Such information includes line type information specifying a line type when drawing a line, pel information specifying a width of a line, pattern information specifying a pattern when a plane drawing is effected, and a stack temporarily saving internal information. According to the present embodiment, line type information and pel information are controlled in the addressing space unique to the internal RAM 1018, while pattern information and the stack are controlled in the frame addressing space for the following reason. Namely, a higher access can be achieved through the addressing unique to the internal RAM 1018 as compared with the frame buffer addressing. On the other hand, since pattern information and the stack each cannot exceed the capacity thereof, in the case where pattern information and the stack cannot be established in the internal RAM 1018, the frame buffer addressing is used to control pattern information and the stack so as to enable an expansion into the frame buffer 14.

However, there can also be considered utilization methods of the internal RAM 1018 other than the method of the embodiment such as a method in which only the addressing unique to the internal RAM 1018 is used to access a pattern and a stack at a higher speed and a method including only the frame buffer addressing so as to enable an expansion of the capacity of line type and pel information.

Next, a description will be given of the frame buffer addressing of the internal RAM 1018.

Figure 10:
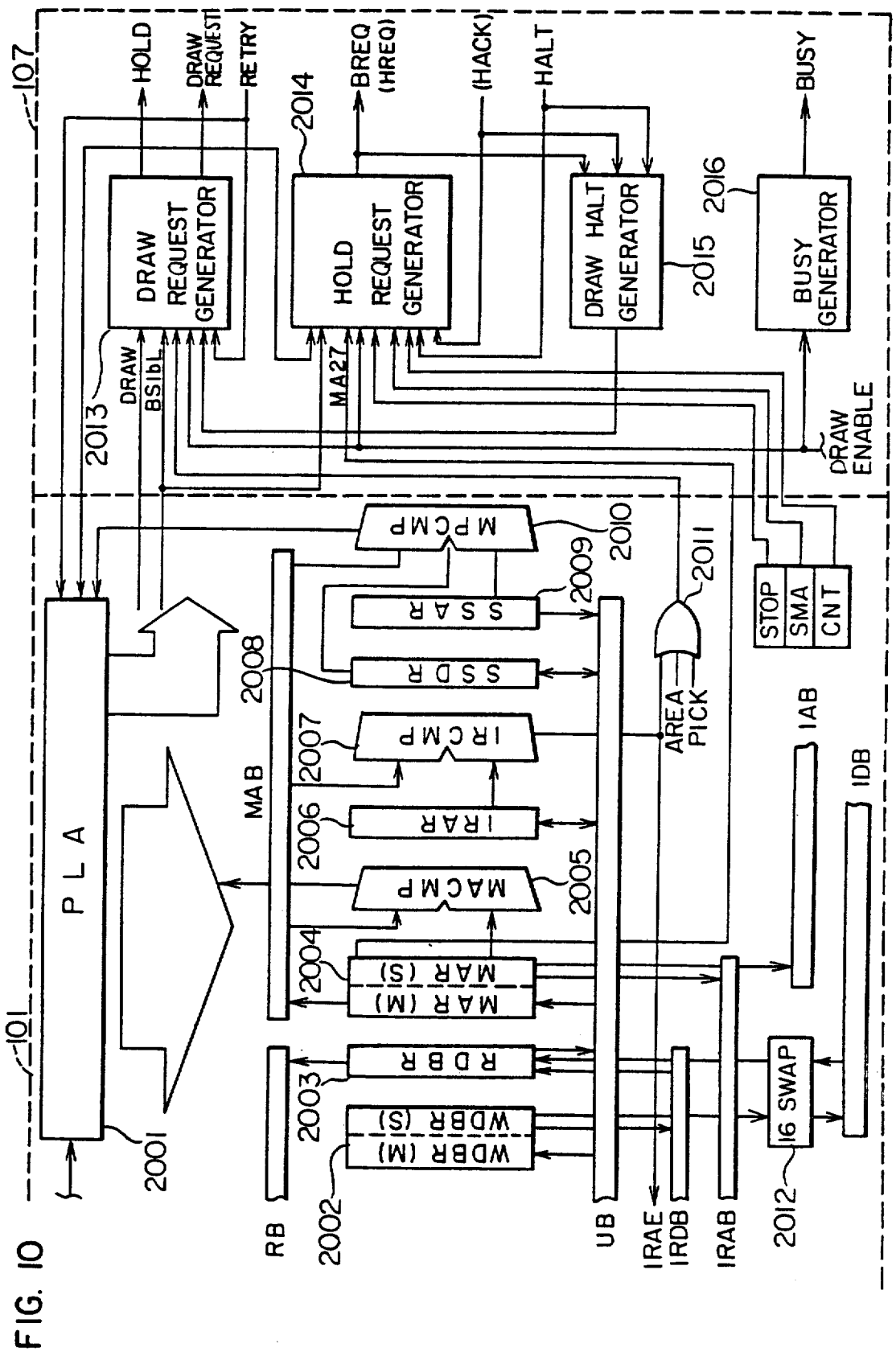

FIG. 10 is a schematic block diagram showing the bus control circuit and portions related to the interface with the frame buffer 14 of the drawing processor 101 in the graphic display processor (GDP) 10. The bus control circuit 107 generates a control signal to access the frame buffer 14 connected to the system bus of the central processing unit 11 and a control signal to access the system memory 12 from the graphic display processor 10.

When the internal RAM 1018 is to be accessed through the frame buffer addressing, the internal RAM address register (IRAR) 2006 is first loaded with the first address of an area to be accessed in the frame buffer 14. In the 32-bit IRAR 2006, the 12 low-order bits are not set. When accessing the frame buffer 14, the drawing processor 101 sets the address in the memory address register (MAR) 2004 in the bit units. In this situation, the content of the register 2004 is compared with that of the IRAR 2006 by the agreement detector (IRCMP) 2007. The comparator 2007 compares only the 20 high-order bits of the 32 bits. As a result, if the comparator 2007 outputs an agreement or coincidence signal, the address set to the memory address register 2004 is regarded as an address to be used to access the internal RAM 1018. In response to the agreement signal, in place of address information associated with the addressing unique to the internal RAM 1018, an address obtained by combining the address value of the memory address register 2004 with the 12 low-order bits is used to access the internal RAM 1018. On the other hand, to prevent an access to the frame buffer 14, an instruction is delivered to the draw request generator 2013 to inhibit the access.

Figure 11:
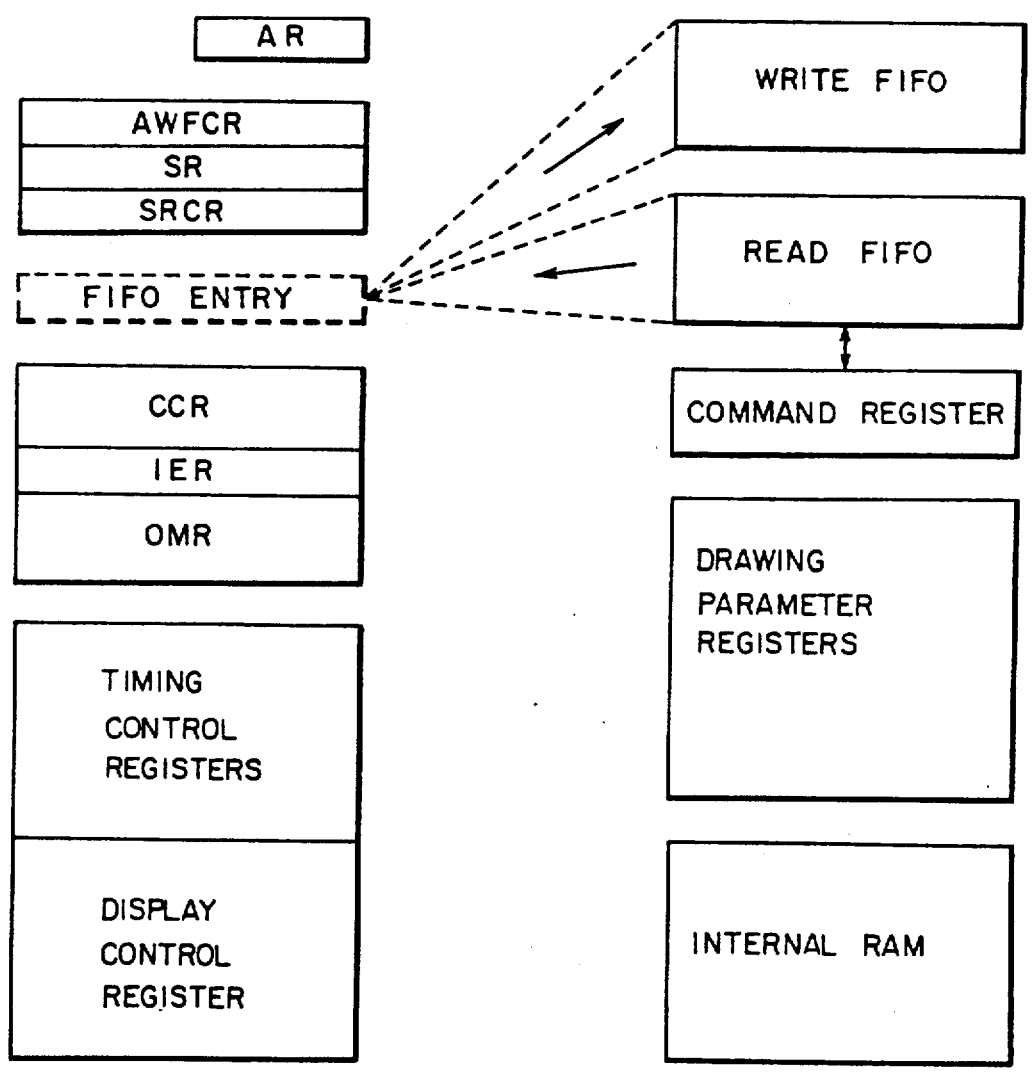

FIG. 11 is a schematic diagram showing control registers and the RAM in the graphic display processor (GDP) 10 which are accessible from the central processing unit (CPU) 11. These internal registers are classified into two groups according to the access method as follows.

(1) Registers directly accessible from the central processing unit (CPU) 11

FIG. 12 is a schematic diagram showing a detailed structure of the registers and the RAM directly accessible from the central processing unit 11. When the RS1, RS2, $\overline{CS}$, and R/$\overline{W}$ are all at the "Low" level, a write operation is enabled on the address register. For the address/write FIFO counter register, when the RS1, RS2, and $\overline{CS}$ are at the "Low" level and the R/$\overline{W}$ is at the "High" level, a read operation is allowed on the address register and the write FIFO counter. When the RS1 is at the "Low" level, the RS2 is at the "High" level, the $\overline{CS}$ the "Low" level, and the R/$\overline{W}$ is at the "High" level, a read operation is enabled on the status register. For RS1 ="Low", RS2 ="High" $\overline{CS}$ ="Low", and R/$\overline{W}$ ="Low", a write operation is enabled on the status register clear register. The FIFO can be accessed under a condition of RS1 ="High", RS2 ="Low", and $\overline{CS}$ ="Low". Any other register can be accessed for RS1 ="High", RS2 ="High", and $\overline{CS}$ ="Low" after the pertinent register number is specified through the address register.

(2) Registers accessible via the FIFO

Registers controlling the drawing operation and the RAM are accessed via the First In First Out (FIFO).

The write FIFO includes 32 words, whereas the read FIFO comprises eight words. Internally, each time a command is processed, the next command is transferred to the command register. FIG. 13 is a schematic diagram showing in detail the structure of the drawing parameter registers.

Next, a description will be given of the function of each register with reference to FIG. 12.

(1) Address register (AR)

The address register is used to specify an address (000–1FF) of the control register in the graphic display processor (GDP) 10. When a read or write operation is effected on the control register, an address of the pertinent control register must be first written in the AR. Furthermore, when an INC bit of this register is set to 0, the address register is not updated, whereas if the INC bit is set to 1, the address register is so updated to be incremented by two each time the control register is accessed. That is, when successively accessing the control register, the address register needs only to be set at the start point.

(2) Address/write FIFO counter register (AWFCR)

Used to read the contents of the address register and the unused word count of the write FIFO. By use of the register, the central processing unit 11 can attain the setting value of the address register and the unused word count of the write FIFO counter, and hence a command or a parameter containing the number of words indicated by the word count can be successively transferred to the write FIFO.

(3) Status register (SR)

Indicates an internal status of the graphic display processor 10. Each bit has the meaning as follows.

Update (UDT)

Indicates an enable period during which the timing and display control registers can be rewritten.

Command DMA complete (CDC)

This bit is set when a DEND command terminating a DMA command is executed in the command DMA mode.

DMA error (DER)

Set when a GET, RD command is executed in the command DMA mode so as to indicate that the command DMA mode cannot be continued.

Memory protection violation (MPV)

Indicates that a stack region is exceeded while accessing the stack region of the frame buffer by a PAINT command.

Stop (STP)

Indicates that a STOP command has been executed.

Command error (CER)

Indicates that an undefined command is attempted for an execution or that a ZOOM command or an ROT command is executed between a coordinate space represented in binary notation and a coordinate space represented by color information.

Area detect (ARD)

Indicates that an area has been detected according to a specification of the drawing area test mode.

Command end (CED)

Indicates that a command execution is ended or that a command has not been executed.

Read FIFO full (RFF)

Indicates that the read FIFO contains data including 8 words (16 bytes) and a data read command cannot be further executed. When the data is read from the read FIFO, the RFF is cleared.

Read FIFO ready (RFR)

Indicates that a data is prepared in the read FIFO. When the data is entirely read from the read FIFO, the RFR is cleared.

Write FIFO ready (WFR)

Indicates that a write operation is enabled on the write FIFO. When data comprising 32 words (64 bytes) are written in the write FIFO, the WFR is cleared.

Write FIFO empty (WFE)

Indicates that the write FIFO is empty. When the write FIFO is loaded with data, the WFE is cleared.

(3) Status register clear register (SRCR)

Used to clear the bits of the status register. When a bit corresponding to a bit to be cleared in the status register is set to 1, the pertinent bit is reset. However, the RFF, RFR, WFR, and WFE bits cannot be reset by use of this register.

(4) FIGO entry (FE)

The fE is a register to write a command/parameter in the graphic display processor 10 and to read data therefrom. Each graphic display processor (GDP) 10 includes a 16-byte read FIFO and a 64-byte write FIFO. When a read operation is effected, the read FIFO is selected, whereas when a write operation is achieved, the bite FIFO is selected. When a command/parameter is written in the write FIFO, the command is sequentially executed, and after an execution of a rad command, the read data is sequentially prepared in the read FIFO.

(5) Command control register (CCR)

Controls a command processing. Each bit of the CCR has the meaning as follows.

---

ABORT (ABT)
ABT
0  Enables a command processing.
1  Interrupts a command processing under execution and clears the read FIFO/write FIFO. Since an access to the read FIFO/write FIFO is inhibited, the command write operation must

--- be achieved after setting "0" to the ABT. When this bit is set to "1", the status register is also initialized.

Pause (PSE)
PSE
0  Enables a command execute processing and restarts a command execute processing.
1  Temporarily stops a command processing under execution and sets a wait state until the PSE is set to "0". This does not influence an access to the status register and the FIFO.

Data DMA mode (DDM)
DDM
0  Set when a data DMA transfer is not effected. Note: $\overline{DREQ}$ is not outputted even when a DMA data transfer command is written.
1  Set when a data DMA transfer is effected. This bit must be set in any case before the DMA data transfer command is written.

Command DMA mode (CDM)
CDM
0  Set when a command DMA transfer is stopped or an execute processing is inhibited.
1  Starts a command DMA transfer processing. Incidentally, since the transfer is executed in the cycle steal mode regardless of the setting of the DRC, any register in the graphic display processor (GDP) 10 can be accessed from the side of the central processing unit (CPU) 11; consequently, the command DMA transfer can be stopped by clearing the CDM to "0" or by use of a $\overline{DONE}$ input.

DMA transfer request control (DRC)
DRC
0  Sends the $\overline{DREQ}$ in the form of a level signal (burst mode). However, this bit can be set only by an execution of a data DMA transfer command.
1  Sends the $\overline{DREQ}$ in the form of pulse signals for each transfer of a word (byte) (cycle steal mode).

---

Graphic bit mode (GBM)

Bits to set a bit configuration of pixel data to be manipulated by the graphic display processor (GDP) 10. Any one of six kinds of bit configuration can be selected, which easily enables to implement a color (gradation or tone) configuration. Area mode (AREA)

Controls the drawing region and includes the modes described in FIG. 14.

---

Continuity mode (CNT)
CNT
0  The cycle steal mode is set when the graphic display processor 10 accesses the main memory 12.
1  The burst mode is set when the graphic display processor 10 accesses the main memory 12.

Main memory access mode (MMA)
MMA
0  The main memory 12 is not accessed as a portion of the frame buffer 14.
1  A half of the memory space of the frame buffer 14 is allocated to the main memory 12 and an access is made to the main memory 12.

---

Data configuration transform (DCT)

Bits specifying a transformation of the data configuration for a data transfer between the central processing unit 11 and the graphic display processor 10. When this setting is selected, there is established a connection between the central processing unit 11 and the graphic display processor 10. FIG. 15 shows the kinds of transform operations. Fraction set (FRS)

Bit used to set the position of the fixed decimal point for the current pointer. Four positions can be set for the decimal point as follows so as to enable easily select a drawing precision of a graphic form.

| FRS | |
|---|---|
| 00 | Only the integer part is subjected to an arithmetic operation without specifying the decimal point. |
| 01 | The least significant bit of the current pointer is assumed to be a fractional part. |
| 10 | Least significant two bits of the current pointer are treated as a fractional part. |
| 11 | Least significant three bits of the current pointer are treated as a fractional part. |

Write only mode (WTM)

When a rewrite operation is achieved for each pixel in a system operating with a word comprising a plurality of pixels, this bit is used to specify a mode enabling the 1-pixel-unit rewrite operation only through a write operation without necessitating the read modify write operation. This provision enables a pixel to be updated in a memory cycle, which increases the drawing speed.

| WTM | |
|---|---|
| 0 | The MA terminal outputs an address in the word units and does not achieve a write only mode operation. |
| 1 | The MA terminal outputs a pixel address (outputs an address in the unit of 1 bit, 2 bits, 4 bits, 8 bits, or 16 bits corresponding to the graphic bit mode (GBM)) and achieves a write only mode operation. However, this is the case only when the drawing operation mode is the substitution mode. |

Memory data size (MDS)

Bits to set the data bus width of the frame buffer 14. When a portion of the address space of the frame buffer 14 is allocated to the main memory 12, the data bus width can be separately set on the side of the frame buffer 14 and on the side of the main memory 12, which enables to cope with various changes in the system configuration.

| Bit0 | |
|---|---|
| 0 | The frame buffer 14 is set to the 16-bit configuration. MD0-MD15 are used to access the frame buffer 14. |
| 1 | The frame buffer 14 is set to the 32-bit configuration. MD0-MD31 are used to access the frame buffer 14. |
| Bit 1 | |
| 0 | The main memory 12 is set to the 16-bit configuration. MD0-MD15 are used to access the main memory 12. |
| 1 | The main memory 12 is set to the 32-bit configuration. MD0-MD31 are used to access the main memory 12. |

Timing control registers

A group of register defining output conditions of the synchronization signal, the cursor display control signal, and the screen control signal.

Display control registers

A group of registers controlling a memory address output for a display operation.

Next, based on FIG. 13, the functions of drawing parameter registers will be described.

Color register 0 (CL0)

Used when binary information such as a pattern, a line style, font data, etc. is converted into color data. The color data is set corresponding to "0" of binary data.

Color register 1 (CL 1)

Like the color register 0, this register is used when binary information is converted into color data. The color data is set corresponding to "1" of binary data.

Color comparison register (CCMP)

Defines an evaluation color in a drawing operation. When a color comparison mode (to be described later) is selected, the particular color specified by this register can be set as a drawing inhibit color or a changeable color.

Edge color register (EDG)

Defines a boundary color of a boundary defining a region by a PAINT command. Two cases are possible, namely, the case where the color specified by this register is set as the boundary color and the case where other than the color specified by this register is set as the boundary color.

Read mask register (RMASK)

Selects data of a particular color plane from color data and specifies a color plane when color data is converted into binary information.

Write mask register (WMASK)

In a drawing operation, this register is used to specify a color plane for which a rewrite operation is not effected. A plurality of planes may be specified for the rewrite operation. Combining this register with the read mask register, a copy can be achieved between planes.

Pattern control register (PTNC)

Defines an area in which a paint-out pattern of a PAINT command or FILL command is stored. Since the area can be set in the frame buffer, the size of the area can be arbitrarily set. This register comprises the following registers.

(i) Pattern pointer (PPX, PPY)

Indicates a reference point of a pattern area. The pattern area is associated with a unique pattern coordinate system, which is different from the drawing coordinate system.

(ii) Pattern start position (PSX, PSY)

Indicates the coordinates of the start point of the pattern area in the pattern coordinate system.

(iii) Pattern end position (PEX, PEY)

Indicates the end point of the pattern area according to the pattern coordinate system.

(iv) Pattern zooming counter (PZCX, PZCY)

Indicates a count value of the zooming factor when the pattern is referenced. The count value is obtained through a counting operation in the ranges of 0≦PZCX≦PZX and 0≦PZCY≦PZY and when the zooming factor is reached, the pattern pointer is moved.

(v) Pattern zooming factor (PZX, PZY)

Defines a zooming factor used to reference a pattern. The zooming factor varies from 1 to 16 according to the specified value ranging from 0 to 15.

Area definition register (ARD)

Defines a drawing area. The area is controlled according to the area mode.

Specifies the operation mode, color compare mode, color mode, or pel drawing mode for a drawing operation.

FIGS. 16-20 show the configuration of the drawing mode registers. DM0 is a register to be referenced in a drawing operation other than an operation initiated by an MCOPY command, whereas DM1 is used to define an operation between a transfer source data and pattern data. DM0 is referenced for an operation between a result of the operation and the transfer destination data.

With these two registers, 256 kinds of logic operations can be defined in an MCOPY command.

Figure 21:
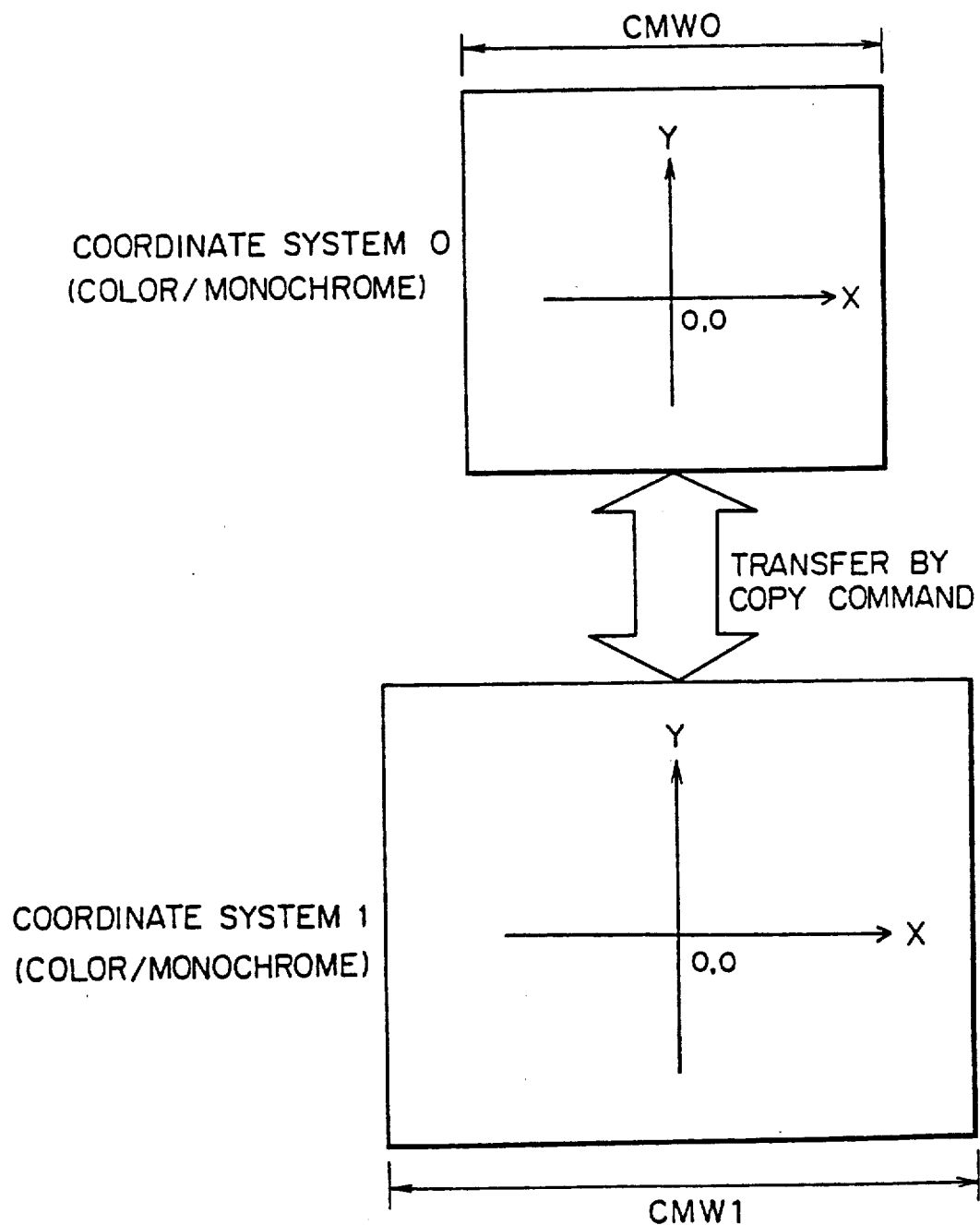

CMW0 and CMW1 are registers to define memory widths of the two drawing coordinate systems. FIG. 21 shows that the graphic display processor 10 controls two coordinate systems to achieve a data transfer between coordinate systems each having the different screen size. This means that a data transfer between windows can be easily accomplished in a system controlling a multiwindow.

Pattern definition register (PDR)

Defines the memory width of a pattern area. When the upper-most bit in 0, the pattern area is treated with color data; whereas when the most significant bit is 1, the pattern area is assumed to contain binary data.

Pattern memory address register (PTNA)

Controls a memory address of the frame buffer for the pattern pointer (PPX, PPY).

Pel memory address register (PLA)

Figure 22:
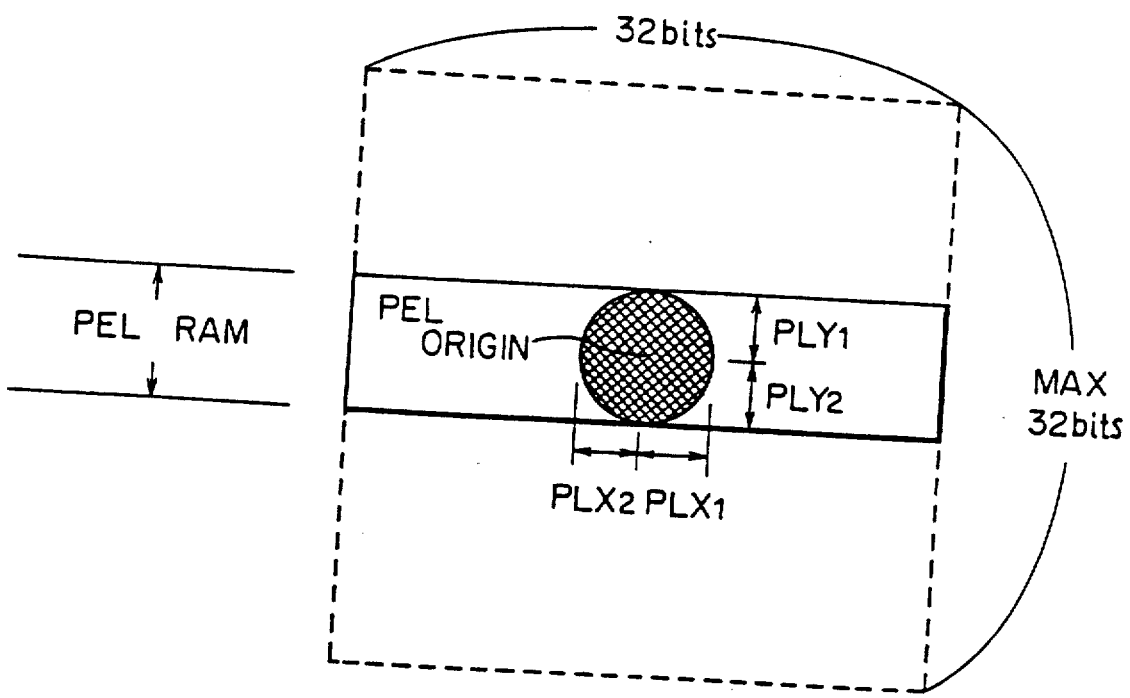

The graphic display processor 10 can reserve a pel area defining a shape corresponding to a pixel when a line drawing is achieved. The pel function facilitates a line drawing with a bold line. FIG. 22 shows definitions of a pel area. The PLA is used to set an address associated with the origin of the pel.

Pel control register (PLC)

Defines the size of a pel area. In FIG. 22, the pel origin corresponds to the current pointer in the drawing coordinate system, the size is defined by PLX 1, PLX 2, PLY1, and PLY 2 centered on the current pointer, and the shape of a pixel is defined in this range. Each bit of this data corresponds to a pixel of the frame buffer 14. A portion of 0 is ignored, whereas a portion of 1 undergoes a drawing operation based on line style information (to be described later). Namely, the drawing operation is accomplished by rendering a bit of line style information selected to draw a pixel to correspond to the portion of "1" of the pel. FIG. 23 shows the relationships between pels on line styles. Since the current pointer moves in the unit of a pixel regardless of the shape and size of the pel, a duplicated write operation is repeatedly performed depending on the shape.

Line style control register (LSC)

Defines a line style information area for a line drawing operation. By changing the line style, a dotted line or the like can be defined.

(i) Line style pointer (LSP)

Indicates a reference point for a line style. The pointer is moved corresponding to the current pointer.

(ii) Line style start point (LSS)

Indicates the start point of the line style.

(iii) Line style end point (LSE)

Indicates the end point of the line style.

(iv) Line style zooming counter (LSZC)

Indicates the count value of the zooming factor when the line style is referenced. The count value is counted in a range of 0≦LSZC≦LSZ and the line style pointer is moved when the zooming factor is reached.

(v) Line style zooming factor (LSZ)

Defines the zooming factor when the line style is referenced. The zooming factor varies from 1 to 16 according to the specified value ranging frame 0 to 15.

Font area definition register (FADR)

Defines a character font area for a bit map character drawing. The character font is defined in an address space of the frame buffer; however, when the MMA bit of the command control register (CCR) is set to "1", the character font may be located in the main memory.

(i) Font base address (FBAH, FBAL)

Defines a memory address of the reference point of the font area.

(ii) Number of font bits (FBN)

Defines the number of bits constituting the font of a character.

(iii) Font memory width (FAMW)

Defines the memory width of the font area.

(iv) Character interval (DX, DY)

Defines the interval between characters.

(v) Character zooming factor (ZX, ZY)

Defines the zooming/reduction factor of a character when a character is drawn by a CHR command. When the specified values exceed DX and DY, the character is zoomed, whereas when the values are less than DX and DY, the character is reduced. Since the values can be independently defined for the X and Y values, a character drawing may be achieved in which the zooming applies to the X direction and the reduction applies to the Y direction.

(vi) Font slant factor (XX)

Defines the slant ratio of a character when the character is drawn by a CHR command. Refer to the description of the CHR command later in this text.

Internal RAM address register (IRAR)

Figure 24:
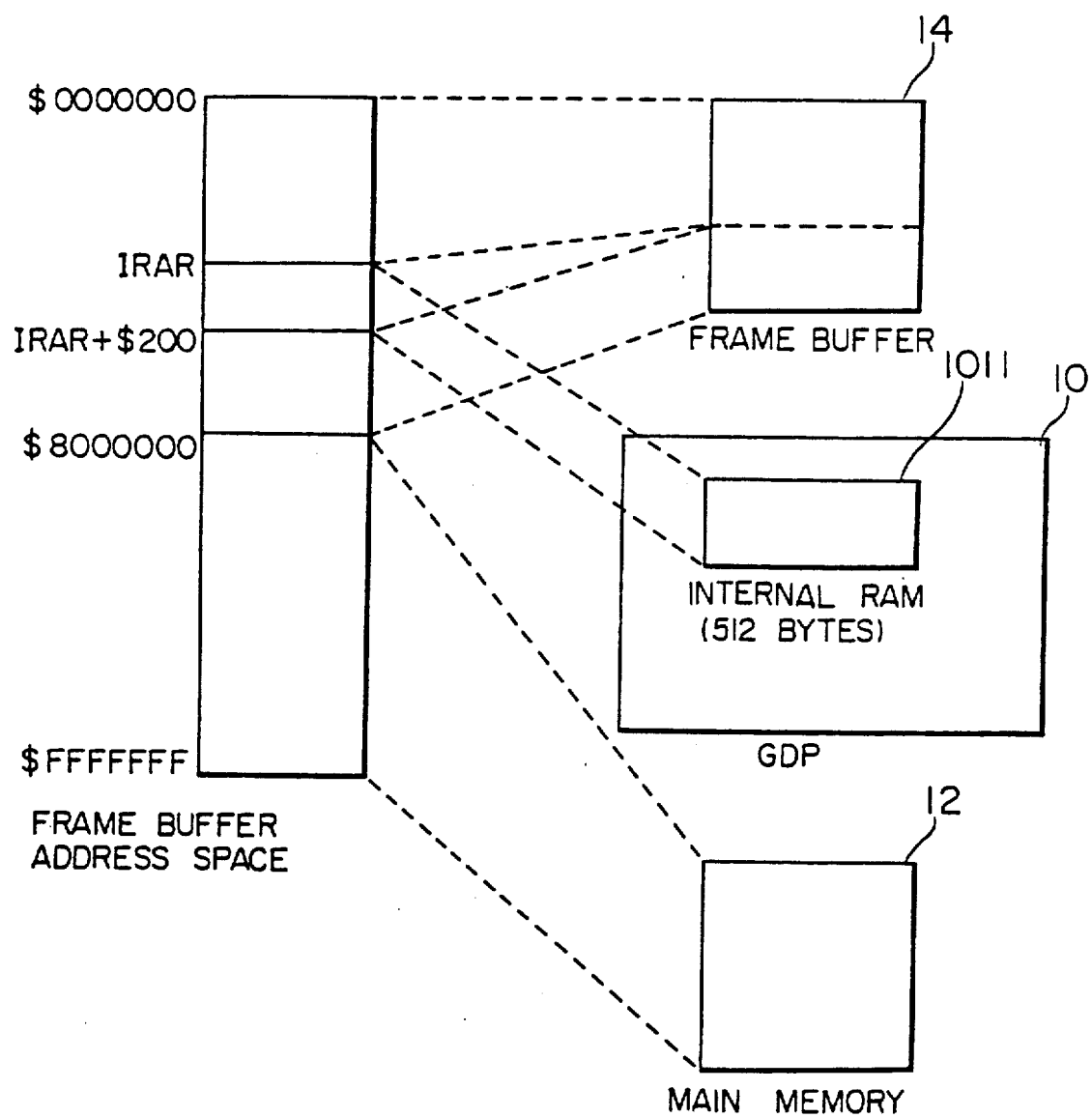

The graphic display processor 10 includes a 512-byte RAM, which can be accessed as an address space of the frame buffer. The internal RAM address register is loaded with the first address of an area allocated in the frame buffer. As compared with the frame buffer, the internal RAM can be accessed at a higher speed. As a consequence, when the pattern area is small, the processing speed can be increased by locating the pattern in the internal RAM. On the other hand, when the pattern area is desired to be expanded, the pattern memory address (PTNA) needs to only be changed, which enables to select either mode only by the software. FIG. 24 shows the relationships among the frame buffer 14, the internal RAM 1011, the main memory 12, and the frame buffer address space.

Stack start address register (SSAR)

Stacks coordinate points at intermediate points of processing in the frame buffer during an execution of a PAINT command. This register defines the start address of the stack area.

Stack area definition register (SADR)

Defines the size of the stack area. The area can be set in a step of $2^n$.

Stack pointer (SP)

Sets an address where the stack operation is effected.

Drawing pointer 0 (DP0)

This register indicates a drawing memory address of the coordinate system 0.

Current pointer 0 (CP0X, CP0Y)

Indicates a drawing coordinate point in the coordinate system 0. This coordinate point corresponds to the DP0.

Drawing pointer 1 (DP1)

Indicates a drawing memory address in the coordinate system 1.

Current pointer 1 (CP1X, CP1Y)

Indicates a drawing coordinate point in the coordinate system 1. The coordinate point correspond to the DP1.

Drawing start point (DSP)

Indicates a coordinate point on a circle from which a drawing operation is initiated by an ARC or EARC command.

Drawing end point (DEP)

Indicates a coordinate point on a circle at which a drawing operation of an ARC or EARC command is finished.

Next, description will be given of commands used in the graphic display processor (GDP) 10. FIGS. 25-28 shows the commands of the GDP 10, which can execute a part of commands described, for example, in the "Nikkei Electronics", May 21, 1984, pp. 221-254, a part of commands referenced in the Japanese Patent Application No. 60-201549 of the present assignee, now laid open as JP-A-62-62390, but not be admitted as prior art and the commands which will be described later in this text.

FIG. 29 shows an example of the operation associated with a PLINE command, which is used to draw an interval indicated by parameters $Z_s$, $Z_e$, and Z of a line between a point represented by parameters $X_1$ and $Y_1$ and a point indicated by parameters $X_2$ and $Y_2$. The parameters $Z_s$ and $Z_e$ limit the values of X and Y coordinates. Which one of the coordinate values is to be limited is denoted by the parameter Z. For Z=0, the drawing operation is accomplished in an interval from $Z_s$ to $Z_e$ with respect to the X coordinate value; while for Z=1, the drawing operation is achieved in an interval from $Z_s$ to $Z_e$ with respect to the Y coordinate value. This command enables the graphic display processor (GDP) 10 to effect a drawing operation of a straight line having a start point and an end point each not represented by integers, which has been attended with difficulties in the conventional graphic display processor. Furthermore, one of the two coordinate systems can be specified for the drawing operation by the parameter D.

FIG. 30 shows an example of the operation of an FTRAP command. This command is used to point out by use of a graphic form stored in the pattern RAM an area surrounded with four lines including a line between a point designated by parameters $X_1$ and $Y_1$ and a point denoted by parameters $X_2$ and $Y_2$, a line between a point indicated by parameters $X_3$ and $Y_3$ and a point represented by parameters $X_4$ and $Y_4$, a horizontal line associated with parameter $Y_s$, and a horizontal line expressed by parameter $Y_e$. By using this command in combination, a graphic form constituted from a plurality of arbitrary polygons can be painted out with a graphic pattern. Moreover, one of the two coordinate systems can be specified for the drawing portion by the parameter D.

FIG. 31 shows an operation example of an FARC-LN command. The FARC-LN command is sued to paint out with a graphic from stored in the pattern RAM an area surrounded with four lines including an arc of a quarter of a circle which has a center at a point indicated by parameters $X_c$ and $Y_c$ and a radius specified by parameter r, thre arc included in an area designated by parameter Zone, a line between a point associated with parameters $X_1$ and $Y_1$ and a point expressed by parameters $X_2$ and $Y_2$, a horizontal line indicated by parameter $Y_s$, and a horizontal line denoted by parameter $Y_e$. One of the two coordinate systems can be specified for the drawing operation by the parameter D.

FIG. 32 shows an operation example of an FPCRCL command. The FPCRCL command is sued to paint out with the graphic form stored in the pattern area an internal area of a circle having a center at a point represented by parameters $X_c$ and $Y_c$ and a radius specified by parameter r, the internal area surrounded with horizontal lines denoted by parameters $Y_s$ and $Y_e$, respectively. One of the two coordinate system can be specified for the drawing operation by the parameter D.

FIG. 33 shows an operation example of an FEARC-LN command. The FEARC-LN command is used to paint out with a graphic form stored in the pattern area an area surrounded by four lines including an elliptic arc of a quarter of an ellipse having a center at a point specified by parameters $X_c$ and $Y_c$, an X-axis radius indicated by paramter A, and a Y-axis radius represented by parameter B, the elliptic arc included in a zone specified by parameter Zone; a line between points respectively designated by parameters $X_2$ and $Y_2$, and horizontal lines indicated by parameters $Y_s$ and $Y_e$, respectively. One of the two coordinate systems can be specified for the drawing operation by parameter D.

FIG. 34 shows an operation example of an FPELS command. The FPELS command is used to draw with a graphic form stored in the pattern area an area in an ellipse having a center indicated by parameters $X_c$ and $Y_c$, an X-axis radius specified by parameter A, and a Y-axis radius denoted by parameter B, the area surrounded with horizontal lines designated by parameters $Y_s$ and $Y_e$, respectively. One of the two coordinate system can be specified for the drawing operation by parameter D.

When the five commands including FTRAP, FARC-LN, FPCRCL, FEARC-LN, and FPELPS are used in combination, a graphic form constituted with arbitrary lines, arcs, and/or elliptic arcs can be painted out with a graphic pattern.

Figure 35:
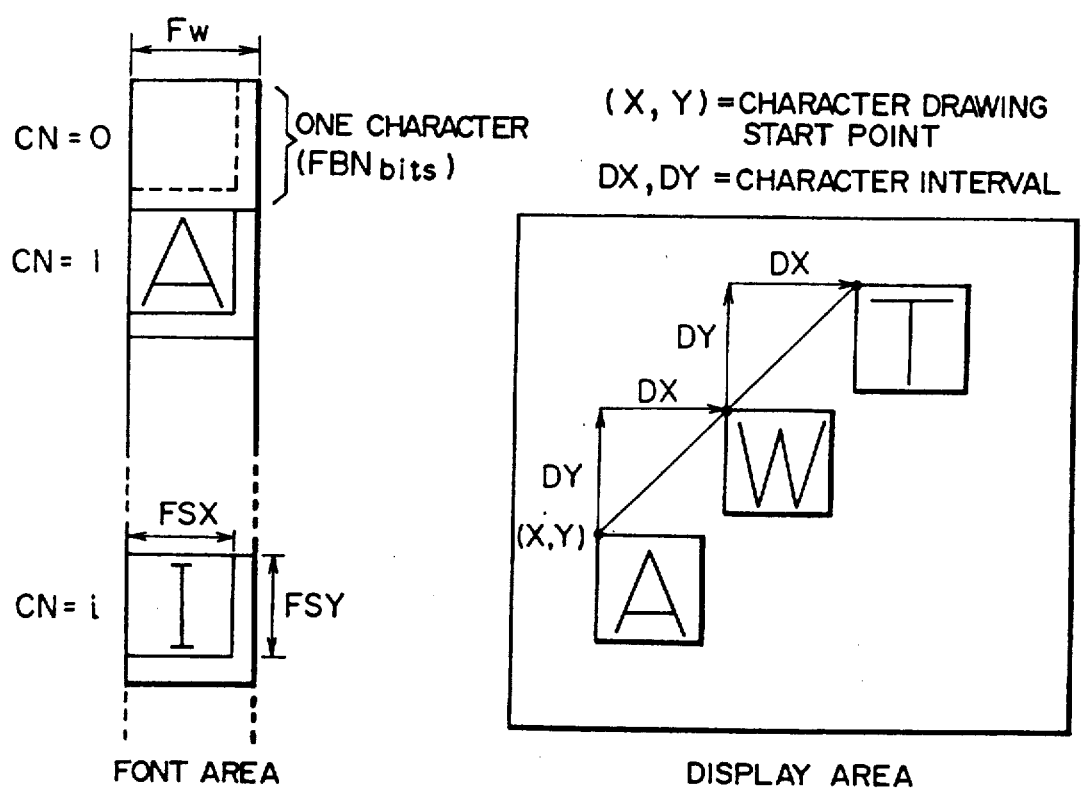

FIG. 35 shows an operation example of a TEXT command. The TEXT command is used in a system where a portion of the frame buffer 14 is assigned as a character font region to expand character font data associated with an input command code at a location indicated by parameters X and Y in a display area of the frame buffer 14. For this command, the following internal registers of the graphic display processor (GDP) 10 must be set in advance, namely the registers FSAH and FSAL to set the start address of the font area, the register FAMW to set the memory width of the font area, the registers FSX and FSY to set the actual character width for the expansion, the register FBN to set the total bit count of a character, the register DX to set the character interval in the X direction, and the register DY to set the character interval in the Y direction. Thereafter, the central processing unit (CPU) 11, following this command with the coordinate values X and Y for the development, sequentially transfers n characters of character codes CN subsequent to the parameter n set with the number of characters to be developed. The graphic display processor (GDP) 10 then calculates the address of each character font to develop the character font.

Figure 36:
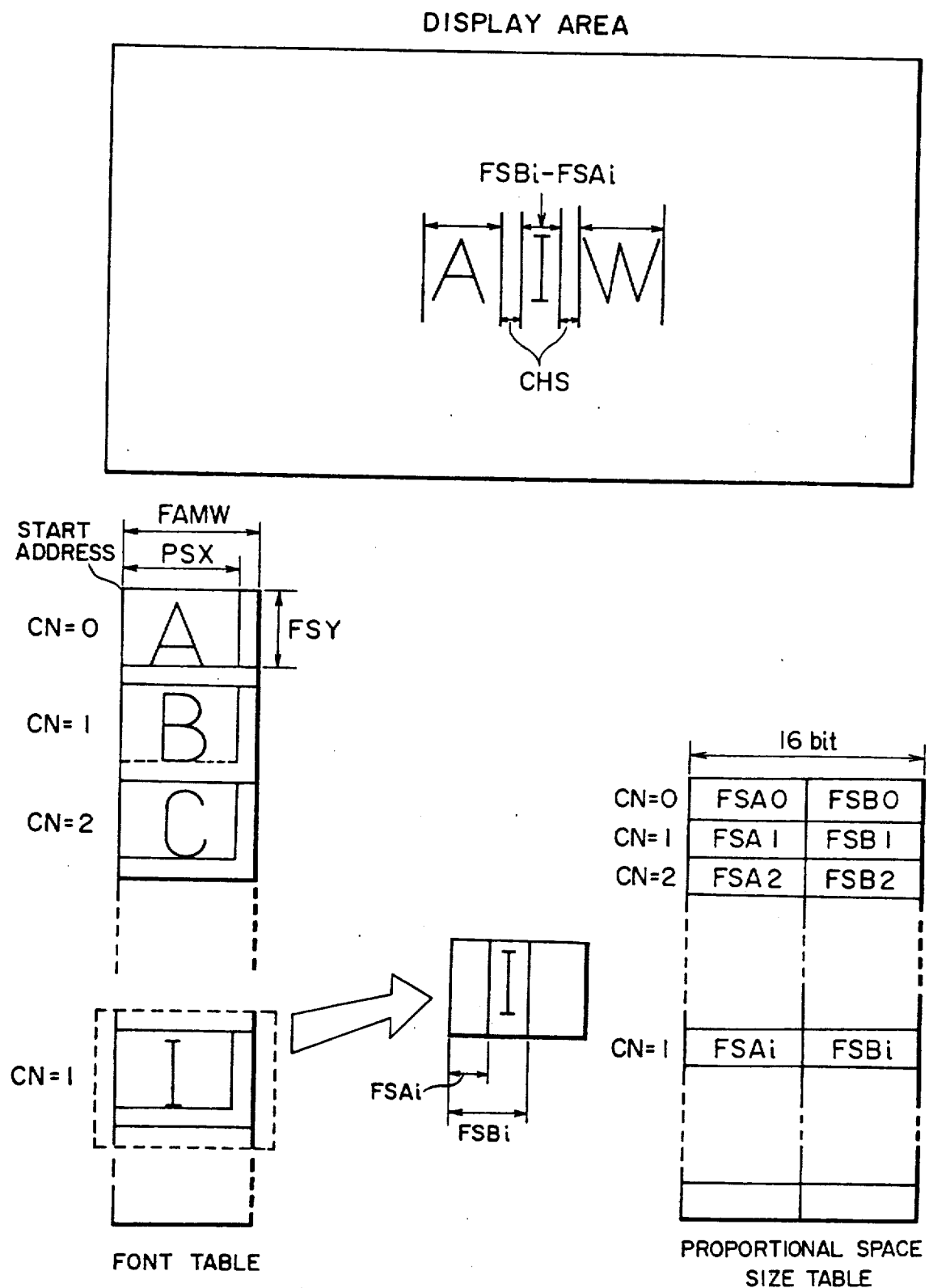

Furthermore, when a particular bit of the command code is specified, this command can change the expand size for each character. FIG. 36 shows an operation example of the TEXT command. In the frame buffer 14, there is beforehand set a table in which a font table and a expand size of a character are specified. The table includes FSA indicating the number of bits in the left margin for each character in the X direction and FSB designating the number of bits from the left end to the right end of the character. The difference from the operation of the character expansion method described above is that the expand size in the X direction is not specified by the parameter FSX, namely, the size is represented as X-directional develop size =FSB−FSA.

Figure 37:
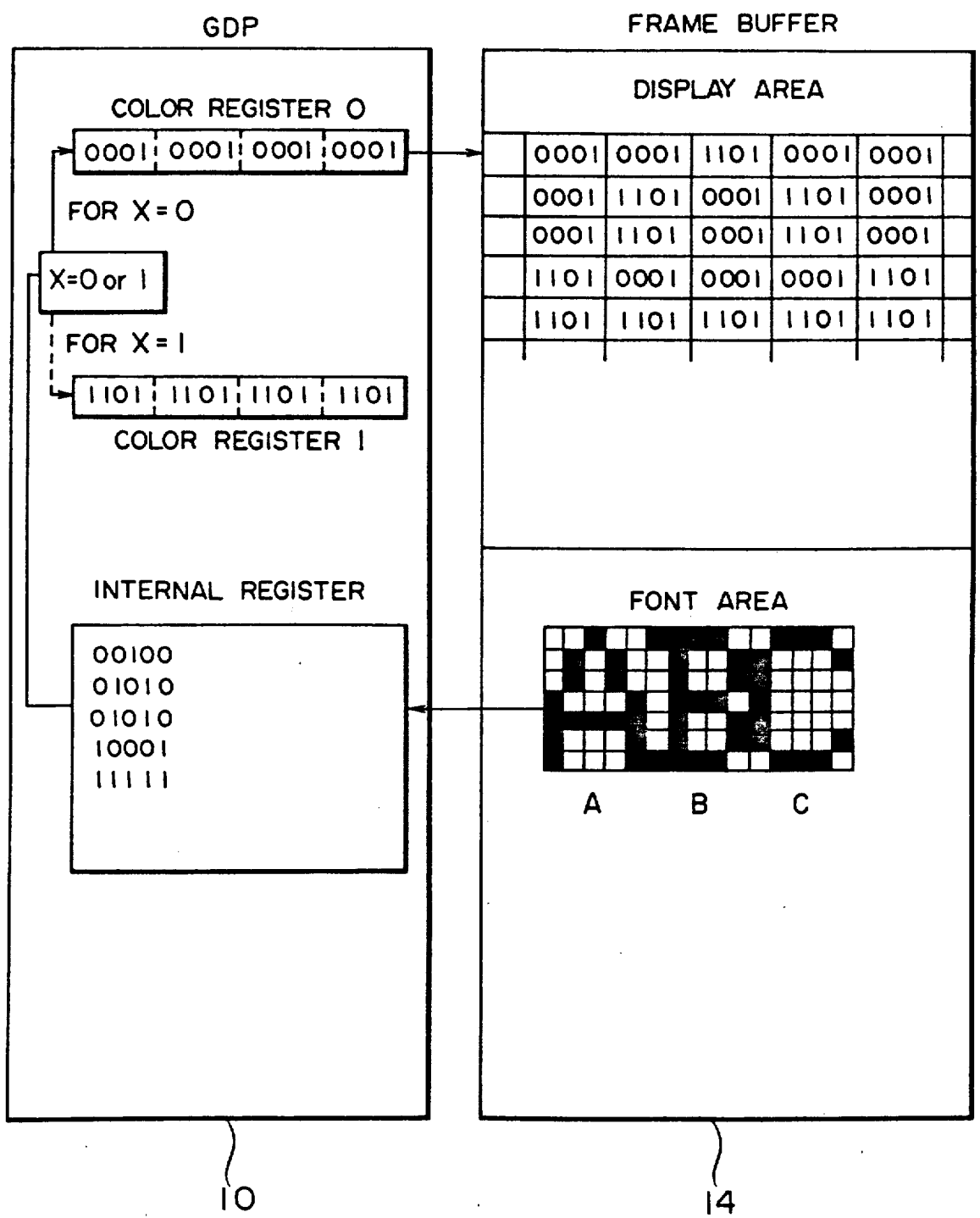

FIG. 37 shows an example of the color expansion with a TEXT command, namely, a method to convert font data including binary data into color data comprising multivalue information. The color register 0 which is one of the internal registers of the graphic display processor (GDP) 10 is loaded with color data associated with 0 of the font data, whereas the color register 1 is loaded with color data corresponding to 1 of the font data. The graphic display processor (GDP) 10 sequentially searches the font data read to write color data corresponding thereto in the frame buffer 14.

FIG. 38 shows an operation example of a CHR command. The CHR command is used in a system where a portion of the frame buffer 14 is assigned as a character font area to expand character font data corresponding to an input command code at a location indicated by parameters X and Y in the display area of the frame buffer 14. Rotation of a character can be specified in 90° units by parameter SD. The following internal registers of the graphic display processor (GDP) 10 must be set in advance, namely, the registers FSAH and FSAL to set the start address of the font area, the register FAMW to set the memory width of the font area, the registers FSX and FSY to set the actual character width for the expansion, the register FBN to set the total bit count per character, the registers ZX and ZY to set the numbers of dots for the size of the actual character to be expanded in the frame buffer 14, and the register XX to set the number of dots for the slant of the character. Whether the character is to be inclined to the right or to the left is specified by the sign of XX. The central processing unit (CPU) 11 thereafter transfers, following the command and the coordinate values X and Y for the expansion, character codes CN to be expanded. The graphic display processor (GDP) 10 in turn calculates the address of each character font to expand the font. Color expansion of a CHR command can be effected in the same fashion as the color expansion, for example, of the TEXT command.

Figure 39:
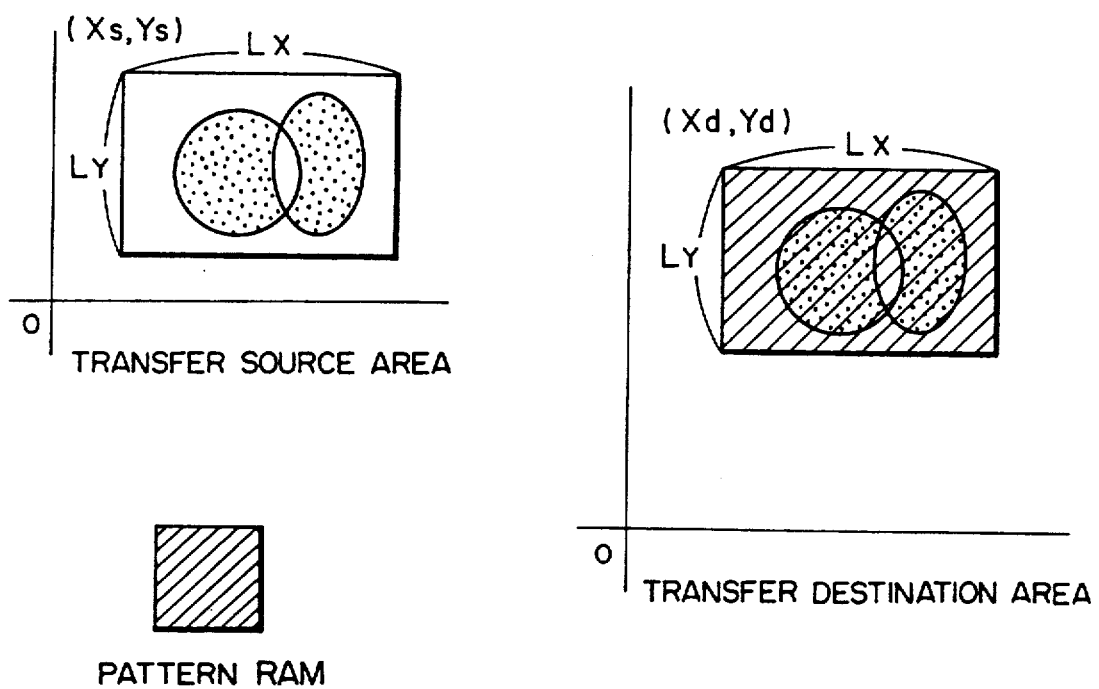
Figure 40:
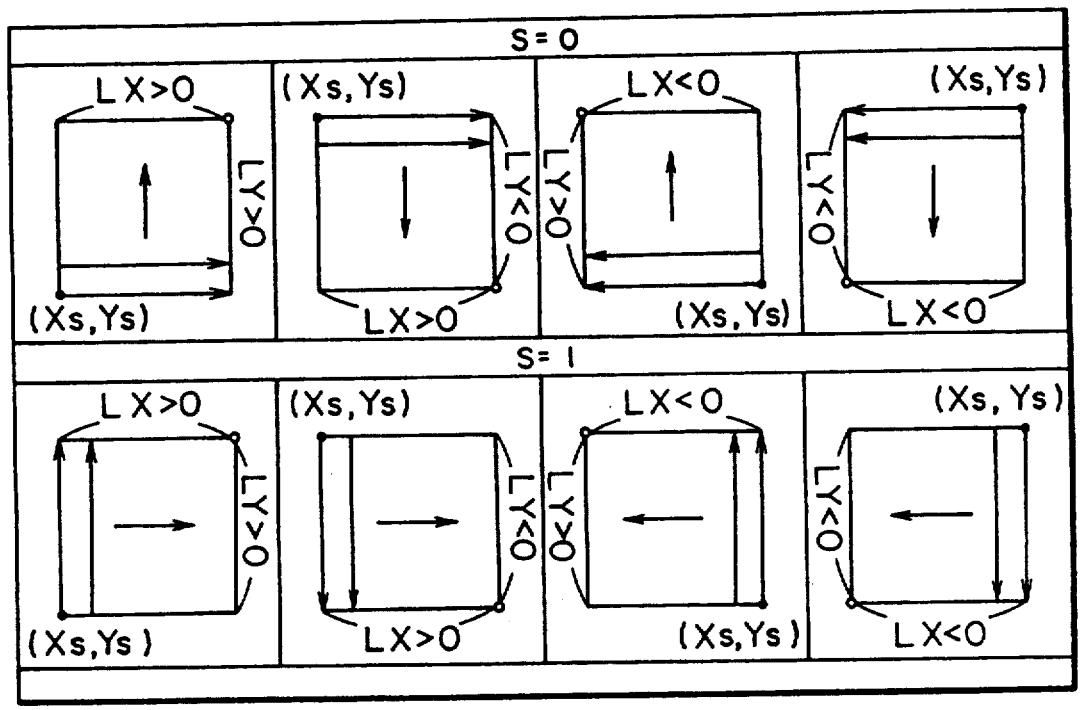
Figure 41:
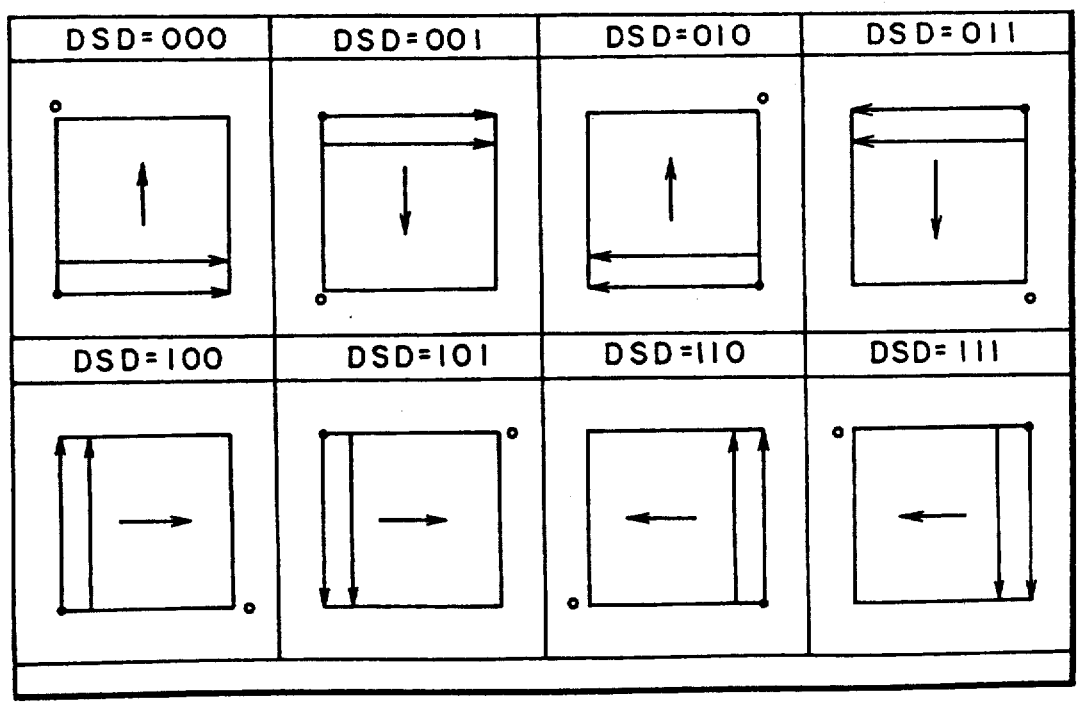

FIG. 39 shows an operation example of an MCOPY command. When the MCOPY command is executed, a logic operation is first achieved between data stored in the pattern area and data of a rectangular area having sides parallel to the respective coordinate axes and two diagonal points in the frame buffer 14, one of the diagonal points indicated by parameters $X_s$ and $Y_s$ and the other one of the diagonal points represented by parameters $L_x$ and $L_y$. Thereafter, while achieving a logical operation with data in a rectangular area having sides parallel to the respective coordinate axes and a start point specified by an absolute coordinate position represented by parameters $X_d$ and $Y_d$ with respect to the origin, the resultant data is transferred to the rectangular area. FIG. 40 shows scan directions of a transfer source area of an MCOPY command. The direction to scan the transfer source area is specified by the signs of parameters LX and LY and the parameter S. FIG. 41 shows scan directions of a transfer destination area of an MCOPY command. The scanning direction of the transfer destination area is designated by the parameter DSD. One of the two coordinate systems can be specified for the transfer destination by the parameter D. The coordinate system specified for the transfer source by the parameter $S_o$ may be the same as or different from that of the transfer destination.

The graphic display processor 10 of the embodiment described above can process the command system having sophisticated functions as described above, which enables to greatly reduce the processing load imposed on the central processing unit (CPU) 11. As a result, a high-performance graphic display apparatus can be implemented. Furthermore, when the graphic display processor 10 is provided in the form of an LSI, the cost of the graphic processing apparatus can also be minimized.

Figure 42:
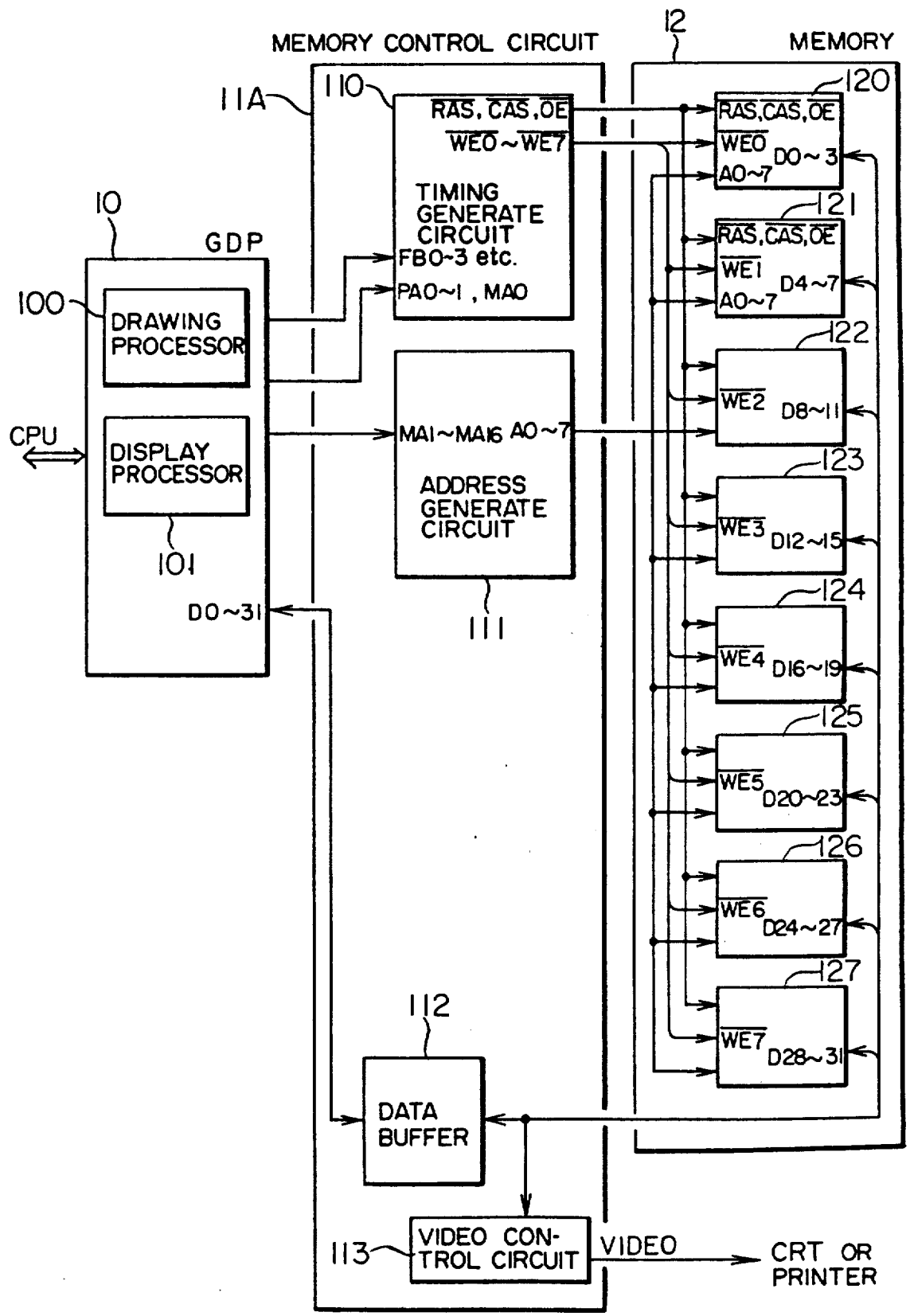
FIG. 42 is a schematic block diagram illustrating still another embodiment of the present invention.

FIG. 42 shows another embodiment of the present invention which includes a graphic display processor (GDP) 10, a memory control circuit 11A, and a memory 12. The GDP 10 receives a command and a parameter transferred from a CPU (not shown) and effects necessary controls for a graphic generation and a display on a CRT. The GDP 10 internally has a drawing processor 100 and a display processor 101. The drawing processor 100 interprets a command, executes various graphic processing algorithms, generates an address to read or write a memory, and effects an arithmetic processing of graphic data. The display processor 101 generates a memory read address in synchronism with a raster scan of a CRT (not shown). Another output device, for example, a printer connected as an output device also achieves the similar operation. The memory control circuit 11A includes a timing generation circuit 110, an address generate circuit 111, a data buffer 112, and a video control circuit 113. The timing generation circuit 110 generates timing signals ($\overline{RAS}$, $\overline{CAS}$, $\overline{OE}$, $\overline{WE0}$-$\overline{WE7}$) necessary to access the memory 12 based on bus status signals (FBS0-3) and pixel address signals (PA0-PA1) supplied from the GDP 10 and other control signals. The address generation circuit 111 generates, from an address from the GDP 10, a multiplexer address necessary to control the dynamic memory 12. The data buffer 112 is provided to buffer a data transfer between the GDP 10 and the memory 12. The video control circuit 113 receives display data read from the memory 12 and generates video signals required for the CRT, a printer, or the like. Although the memory 12 of this embodiment comprises eight dynamic memory chips 120-127, the configuration may be easily expanded for another memory element (such as a static RAM) and for the case where a greater number of memories are used. Control signals different from those of the present embodiment may also be necessary in such cases; however, the configuration is naturally applicable like in the case of this embodiment.

Figure 43A:
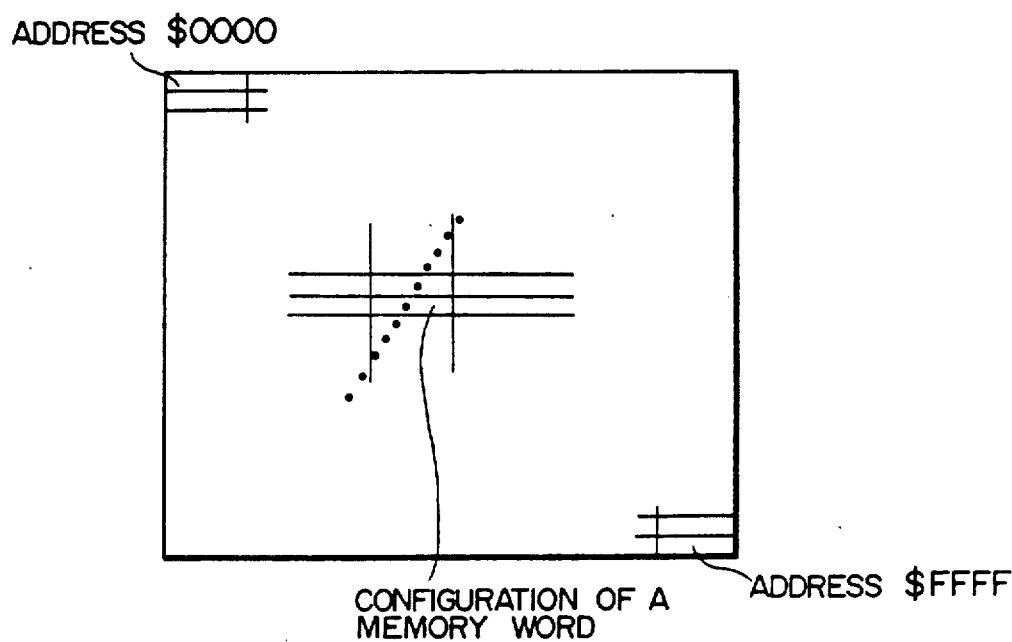
FIGS. 43A-43B are explanatory diagrams useful to explain a memory array.
Figure 43B:
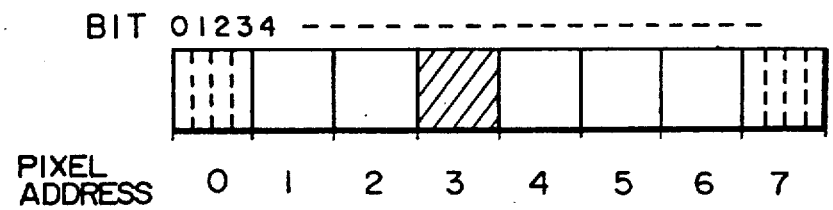

FIG. 43A shows an example of a logical array of the memory 12, whereas FIG. 43B is an example of a configuration of a memory word. The memory is constituted with the lower address on the upper-left corner and the upper address on the lower-right corner in the two-dimensional structure. This embodiment is an example of a 4 bits/pixel configuration in which four bits are allocated to each pixel and is applicable to a 16-color display or a multitone display with 16 tone levels. A memory word comprises, for example, 32 bits; however, the memory addresses are assigned in the 16-bit units. Data of horizontally successive eight pixels are assigned to a word. In FIG. 42, each of the memory elements 120-127 corresponds to four bits of a word. Conventionally, a read operation and a write operation are simultaneously accomplished on a memory word; however, in this embodiment, the different write control signals ($\overline{WE0}$-$\overline{WE7}$) are supplied for each memory element so as to enable a write operation for each pixel. Namely, in the case where the bus status signal (FBS0-3) specifies a write operation for each pixel, the pixel address (PA0-1) and the memory address (MA0) are decoded to generate the signals $\overline{WE0}$-$\overline{WE7}$.

Referring now to FIG. 44, description will be given of an example of the bus status signal (FBS0-3) delivered from the GDP 10. As shown in FIG. 44, there are 16 states (including three undefined states) of access status of the memory (frame buffer) bus. FBS="0000" indicates that no action is taken on the frame bus. The memory write operation can be achieved in three different units, namely, in a unit of 32 bits (FBS="0111"), 16 bits (FBS="0101"), and a pixel (FBS="0001"). The memory control circuit 11A decodes the status signal to output a "Low" level signal to all of $\overline{WE0}$-$\overline{WE7}$ in the case of a write operation of the 32-bit unit so as to instruct a write operation in all of the memory chips 120-127. In a write operation in the 16-bit unit, the upper or lower 16 bits are specified by the MA0 signal so as to activate $\overline{WE0}$-$\overline{WE3}$ or $\overline{WE4}$-$\overline{WE7}$. Futhermore, in a pixel-unit write operation, one of $\overline{WE0}$-$\overline{WE7}$ is set to be active by use of a pixel address (PA0-PA1) and a bit (MA0) of the memory address.

The terminals of the GDP 10 may be configured in the same fashion as those of FIG. 1. The CPU bus control terminal delivers control signals controlling a data bus connected to the CPU bus. The DMA control terminal handles control signals associated with the direct memory access controller (DMAC). The bus switch control signal is a group of signals controlling an externally connected bus switch in an application where the CPU bus is connected to the frame buffer bus. The FB bus control signal is used to control the frame buffer bus. The display control signal includes signal inputs and outputs required when a video control and a synchronization control are effected. The system is provided with an input clock system and three output clock systems. Incidentally, for the address bus (MA0-MA27) for the frame buffer, the memory address output and the pixel address output are multiplexed according to the operation mode.

FIG. 45 is a schematic diagram showing multiplexed outputs of the memory address. Since the memory address is assigned in the unit of 16 bits, these terminals are used to output memory addressed for the 32 bits/pixel and 16 bits/pixel operation. To the contrast, a 1-bit pixel address is outputted to the MA26 terminal in the 8 bits/pixel operation. In the case of a pixel comprising 4 bits, 2 bits, or 1 bit, respectively, an address signal including 2, 3, or 4 bits is outputted to terminals MA25-MA26, MA24-MA26, or MA23-MA26, respectively. The MA27 output is used as a change-over signal to change over between the address space of the CPU and the address space of the system memory and is to be outputted in any cases. Due to the provision of the multiplexing operation, as the number of bits per pixel decreases, the maximum memory space is reduced; however, the size of the available screen range becomes to be fixed, which is favorable for the practice.

Among the primary commands to be processed by the GDP 10, the line drawing commands, CHR, ZOOM, and ROT each effect a memory access in the pixel unit. Furthermore, among the command processing modes including the replacement mode, the logic operation mode, the arithmetic operation mode, and the conditional replacement mode, a data operation is necessary in other than the replacement mode, namely, in cases of pixel-unit operation and word-unit operation, two memory accesses are required for a read operand and a write operation. On the other hand, the operation in the replacement mode can be executed only by use of a write cycle, and hence the processing speed can be increased.

Figure 49A:
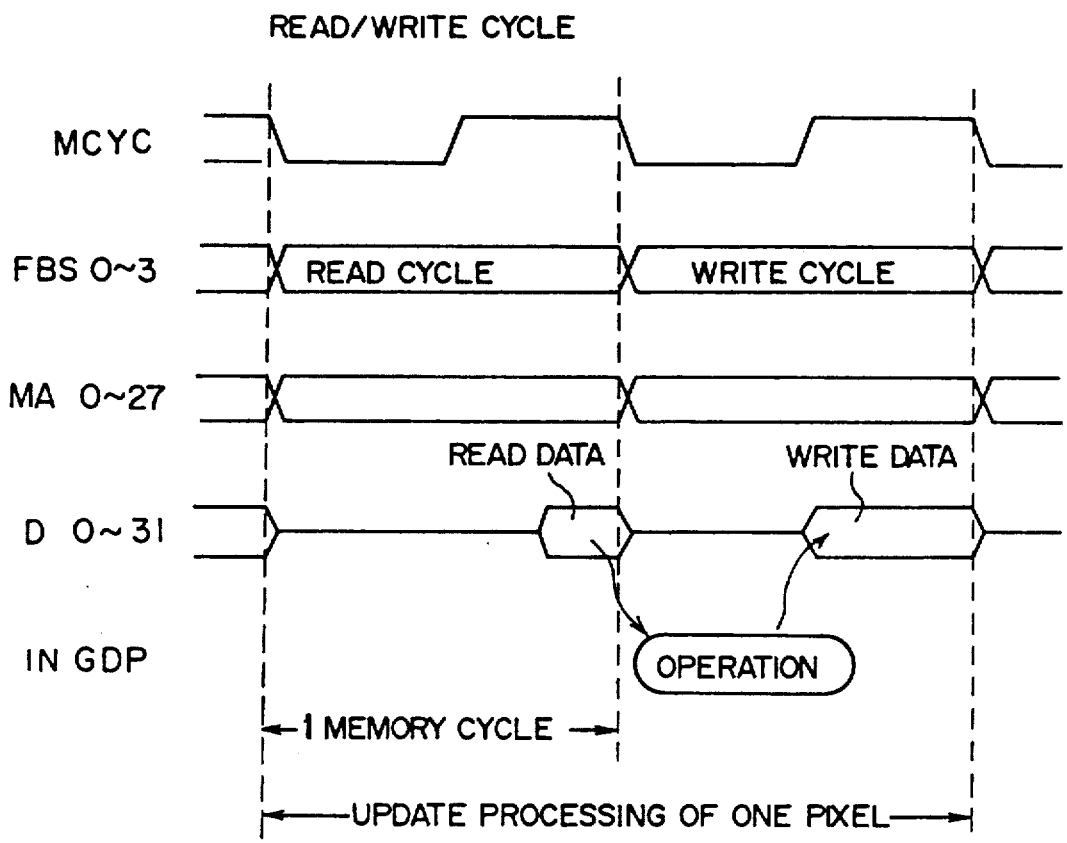
FIGS. 49A-49B are timing charts related to a memory read/write operation and a write operation in pixel units, respectively.
Figure 49B:
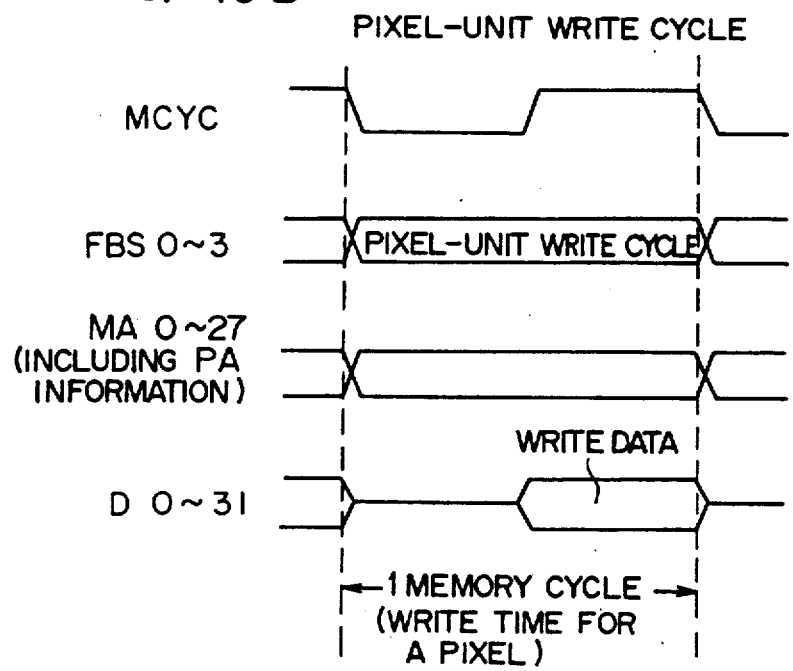

FIGS. 49A-49B are timing charts of memory read and write operations, respectively.

FIG. 49A shows the case of the conventional update processing of a pixel where two cycles of the general read and write operations are used. MCYC is a clock signal (not shown in FIG. 42) indicating the period for each memory cycle. FBS0-3 are coded signals representing a bus status (refer to FIG. 44), MA0-27 stand for address outputs, and D0-31 are data input/ output terminals. In order to update data of a pixel, a word including pixel data to be processed is read from the memory in the first memory cycle. In the second memory cycle, for the data thus read, a specified operation is accomplished at a specified pixel location in the GDP and the result is written again in the memory. Namely, two cycles are used to effect a data update processing of a pixel. FIG. 49B shows a write cycle to effect a pixel-unit write operation. In this case; FBS0-3 indicates a pixel-unit write cycle and the MA terminal outputs information (PA) specifying a pixel. These signals are decoded by a device externally disposed with respect to the GDP 10 so as to generate write signals for the pixel-unit write operation. As a consequence, a write operation of a pixel can be achieved in a memory cycle, and hence a higher processing speed can be developed as compared with the case associated with the method of FIG. 49A.

The drawing mode register in the GDP 10 may also be configured in the similar fashion to that of the embodiment described above. The drawing mode register comprises 32 bits to specify one of various operation modes in a drawing operation and is mapped as one of the parameter registers so as to be externally rewritten and read out by use of the WPR and PPR commands, respectively. These bits are allocated to specify the operation mode, the color compare mode, the binary value generate mode, the color mode, the logic pel mode, the character area mode, the drawing area mode, and the pick mode. Since the operation modes concerning the present embodiment need only be implemented as described in conjunction with FIG. 17, the detailed description thereabout will be omitted.

FIG. 17 shows the contents of the five bits specified as an operation mode. The system allows to specify 16 kinds of logic operations and four kinds of arithmetic operations. In this diagram, S indicates drawing data (transfer source data for a command associated with a text and image transfer), D stands for memory data in the write destination, and D' represents write data. For example, when OPM=00001 is specified as an operation mode, a logical product is obtained between the drawing data and the memory data in the write destination and a write operation is achieved. For a specification of OPM=00011, only a write operation of the drawing data is accomplished, namely, the substitution (replacement) mode is effected. The column on the right end of each part of the diagram related to assignment of a cycle dedicated to a write operation indicates whether or not the operation is executed in the pixel-unit write cycle when the write dedication mode is specified. Since an operation mode which requires the write destination memory data (D) for the operation necessitates the memory data in any case, the update of the pixel data is achieved by use of two memory cycles for the read and write operations regardless of the specification of the write dedication mode. In contrast, when the write dedication mode is specified in such an operation mode not requiring the write destination memory data (D) as D'=0, D'=S, D'=NOT(S), or D'=1, the pixel unit write cycle is effected.

As described above, according to the embodiment, the pixel-unit access necessitates only a write cycle in the substitution mode, which leads to an effect that the operation speed is increased.

Figure 46:
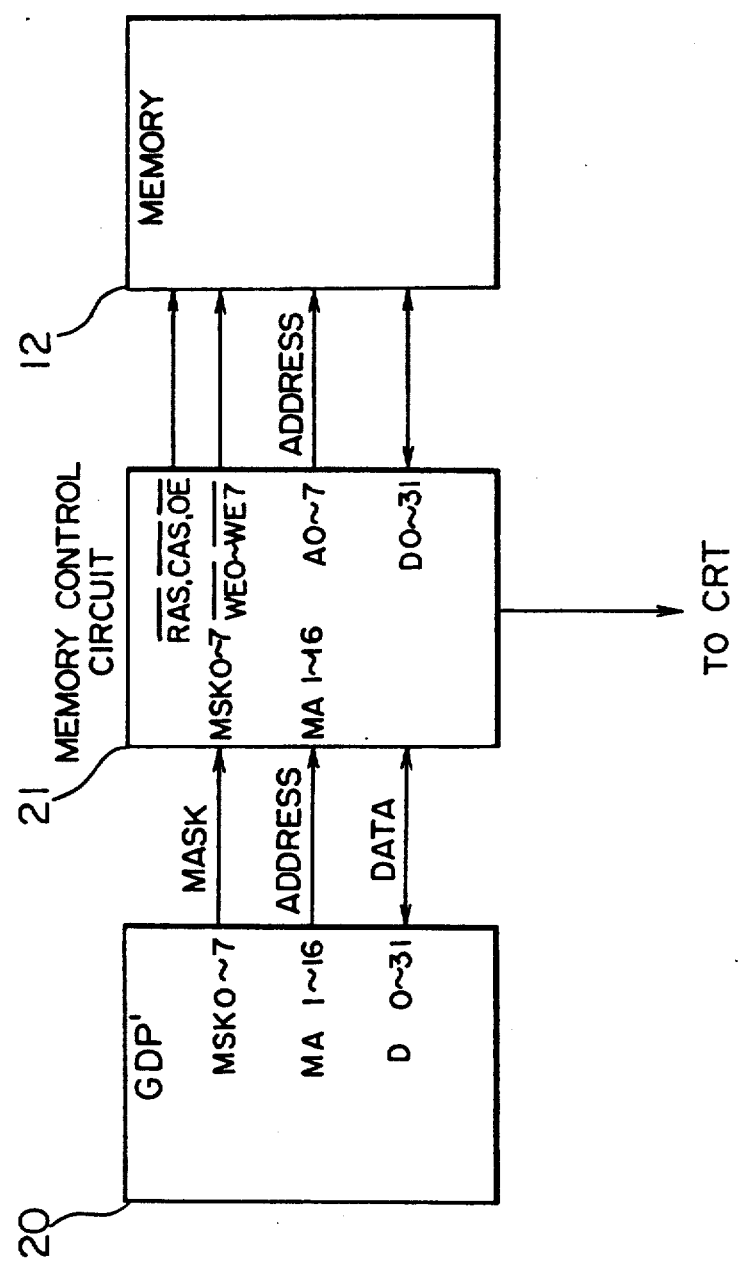
FIG. 46 is a schematic diagram illustrating further another embodiment of the present invention.

Next, another embodiment of the present invention will be described. FIG. 46 shows another embodiment of the present invention including a GDP' 20 which is so designed to output pixel mask information (MS0-7) in place of a pixel address. Namely, pixel mask information indicates pixel positions to be drawn in the eight pixels (32 bits in the case of the 4 bits/ pixel configuration). Depending on pixel mask information, the control circuit 21 can control $\overline{WE0}$-$\overline{WE7}$, which therefore enables to achieve a write operation in a plurality of arbitrary pixels of a word. Although this embodiment is associated with the 4 bits/pixel configuration, if a pixel is desired to be constituted from at least eight bits, it is only necessary to use bits in a portion of pixel mask information. Furthermore, when pixel mask information includes 32 bits, this mask configuration is naturally applicable to the 1 bit/pixel and 2 bits/pixel operations. According to the embodiment, as described above, a write operation of a plurality of bits is enabled in a word, which further increases the processing speed.

Figure 47A:
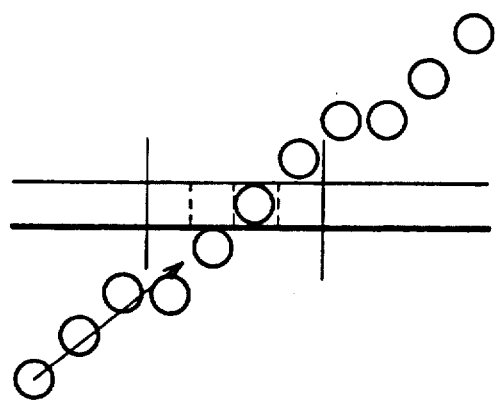
FIGS. 47A-47B are schematic diagrams illustrating examples of a vector drawing and a raster-directional drawing, respectively.
Figure 47B:
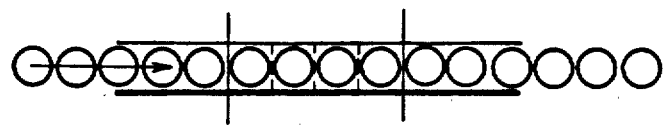

FIGS. 47A-47B are explanatory diagrams useful to explain two kinds of drawing operations and respectively, show an example of drawing in an arbitrary direction (vector drawing operation) and an example of a drawing in the raster direction. The vector drawing operation is related to the case where the drawing point is sequentially moved to an arbitrary direction so as to effect line drawing operations to generate a direct line in an arbitrary direction, an arc, an elliptic arc, and an arbitrary curve. Namely, the vector drawing is achieved in principle through a pixel-unit processing, namely, the pixel-unit write operation according to the present invention is applicable thereto. On the other hand, in the raster-directional drawing operation, the drawing is effected in the horizontal direction along which the pixels are arranged, and hence this drawing operation is applied to plane drawing operations, for example, to draw a line in the horizontal direction, to paint out an area, and to copy data of an area. The raster-directional drawing enables the word-unit write operation in any areas excepting the marginal regions on the right and left ends. Although the boundary of the drawing operation does not necessarily match the boundary of a word in such marginal regions, if the embodiment of FIG. 46 is applied to this case, the drawing operation can also be effected by use of the write cycle. Also in the case of the vector drawing, a plurality of horizontally successive pixels are located in a word. In this case, the drawing can also be achieved only by use of the write cycle if the embodiment of FIG. 46 is applied thereto.

Figure 48:
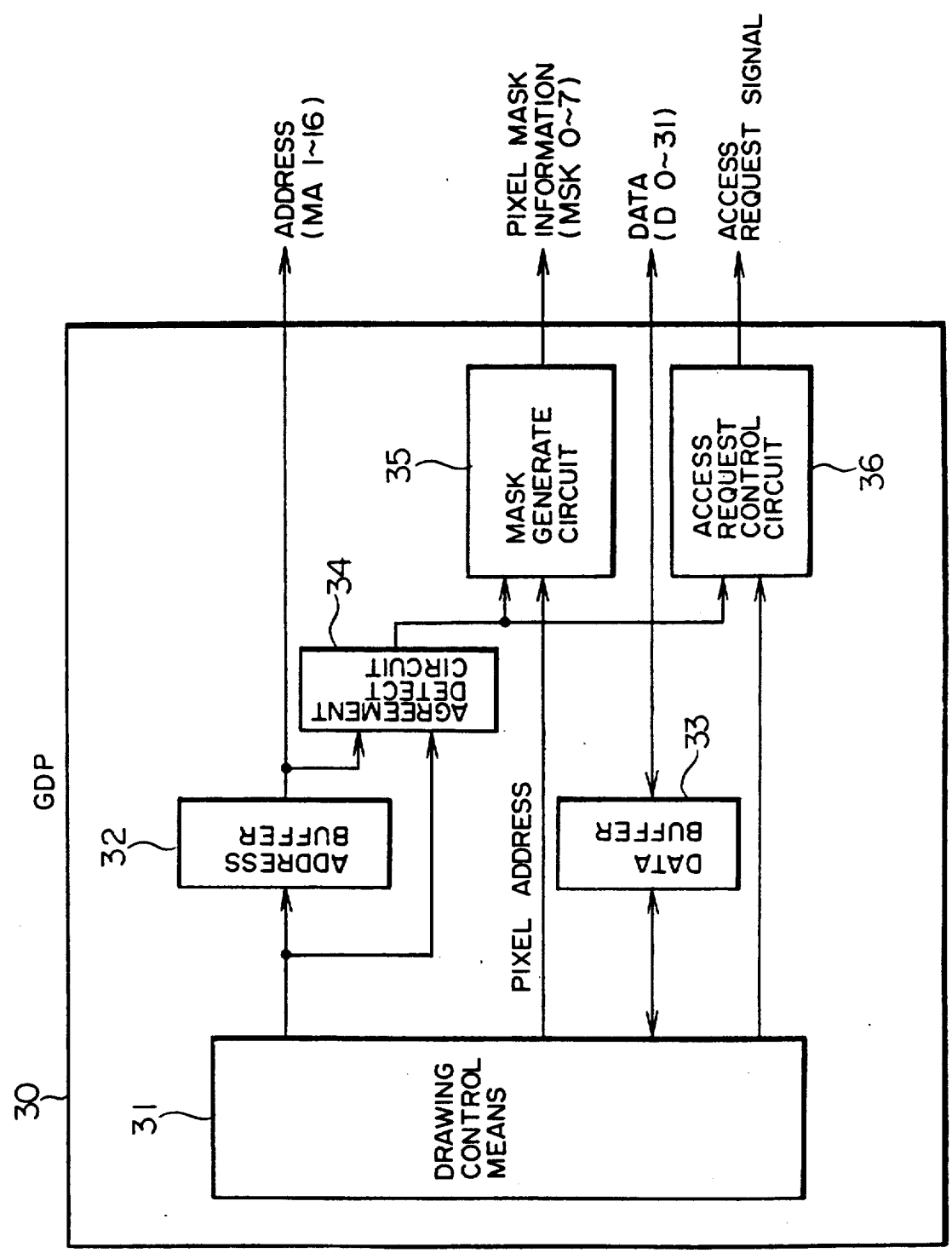
FIG. 48 is a schematic diagram illustrating another embodiment of the present invention.

FIG. 48 is a schematic diagram showing further another embodiment of the present invention in which an automatic detection is effected to detect the case where a plurality of successive pixels are contained in a word so as to achieve a write operation of a plurality of pixels of a word through a single operation. A drawing processor (GDP) 30 includes therein drawing control means 31, an address buffer 32, a data buffer 33, an agreement detect circuit 34, a mask generate circuit 35, and an access request control circuit 36. The drawing control means 31 sequentially calculates the drawing pixel position according to a predetermined algorithm so as to accomplish an operation on the drawing data. The address buffer 32 is provided to temporarily store memory address information outputted from the drawing control means 31. The data buffer 33 is used to buffer a data transfer between the drawing control means 31 and the memory. The agreement detect circuit 34 compares an address stored in the address buffer 32 for the present processing with a memory address outputted from the drawing control means 31 for the next processing so as to determine an agreement therebetween, thereby outputting a signal indicating whether or not the memory addresses coincide with each other. The mask generate circuit 35 decodes a pixel address supplied from the drawing control means 31 to generate pixel mask information and is controlled by an output from the agreement detect circuit 34. While the agreement is being detected therebetween, the mask generate circuit 35 operates to set only the bits corresponding to the pixel positions for the next processing in the previous pixel mask information. If the memory addresses are different from each other, the previous pixel mask information is delivered to an external device, and then the mask generate circuit 35 operates to clear mask information and to set therein only the bits associated with the subsequent drawing positions. The access request control circuit 36 outputting an access request signal to the memory does not achieve a memory write operation while an agreement is being detected for the memory address of the processing address. The access request signal is generated for a write operation when a memory address different from the previous memory address is specified. Namely, the memory write operation is not effected while the processing of pixels in a word is being continuously effected; whereas when the objective memory address is changed, a write processing is achieved for the previous memory address. Consequently, for example, like in the case where a straight line in an arbitrary direction is to be generated, when a pixel-unit processing is accomplished, if the pixels to be processed are horizontally successive in a word, the processing can be executed only through a memory write operation. According to the embodiment, as described above, also in the case where operations are achieved in accordance with a pixel-unit processing algorithm, a write operation of a plurality of pixels in a word can be accomplished through a memory access. As a result, there arises an advantageous effect that the number of memory accesses can be reduced.

Figure 50:
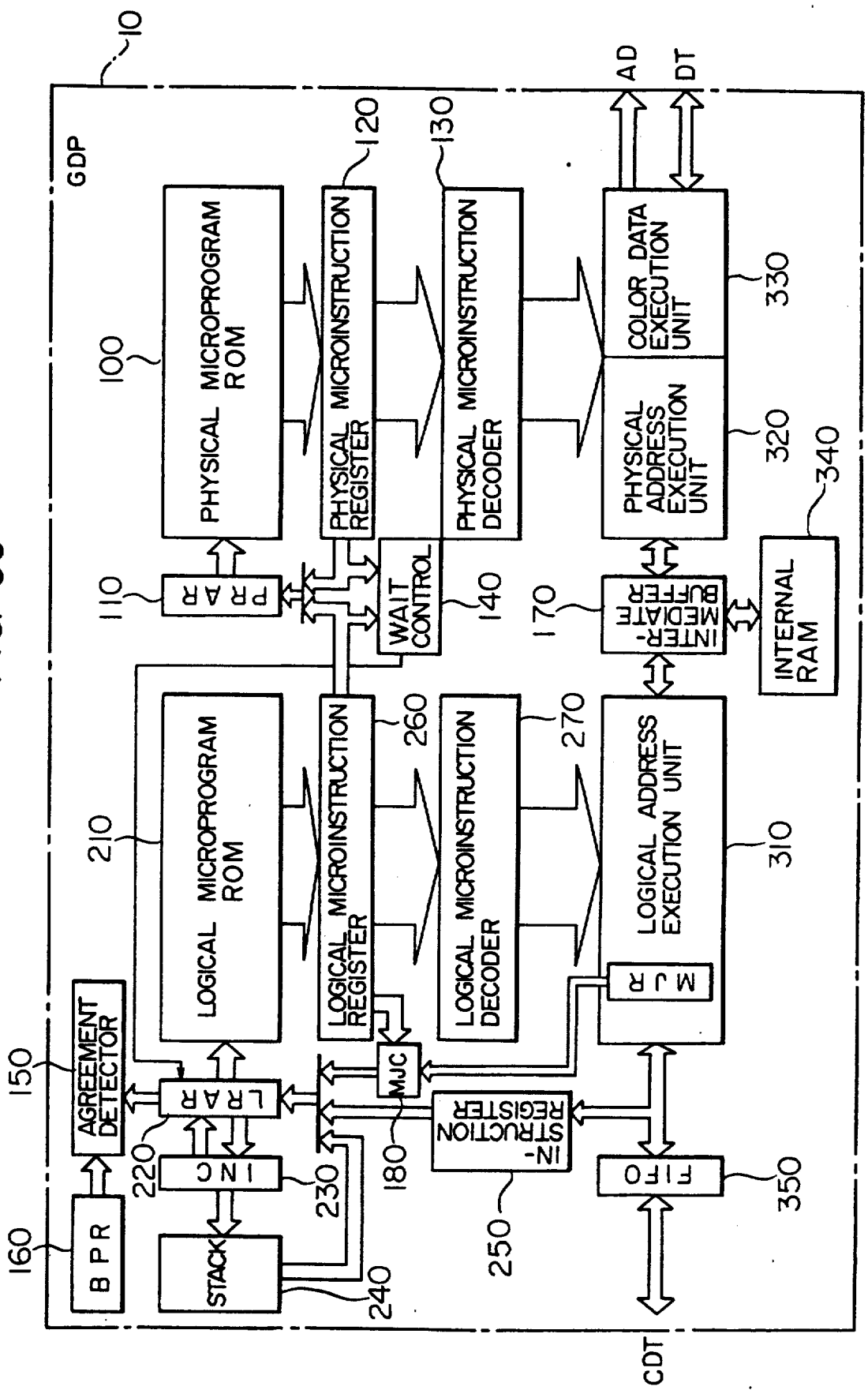
FIG. 50 is a schematic block diagram illustrating a graphic processing apparatus as an embodiment according to the present invention.

FIG. 50 is a block diagram schematically showing a graphic processing apparatus according to the present invention.

The graphic processing apparatus of FIG. 50 mainly includes a logical address execution unit 310 to effect an operation of a drawing coordinate point in the form of X and Y coordinate values, a physical address execution unit 320 to calculate a memory address corresponding to the coordinate values, and a color data execution unit 330 to effect an operation on drawing data.

The logical address execution unit 310 performs an operation primarily based on a drawing algorithm to determine a drawing point on a screen and comprises a logical microprogram ROM 210, a logical micro instruction register 260, a logical micro instruction decoder 270, a logical microprogram ROM address register (LRAR) 220, an address incrementer (INC) 230, a stack 240, an instruction register 250, a multijump control (MJC) 180, a break point register (BPR) 160, and an agreement (coincidence) detect circuit 150.

The physical address execution unit 320 and the color data execution unit 330 are controlled by a physical microprogram ROM 100A and include a physical micro instruction register 120A a physical micro instruction decoder 130, a physical microprogram ROM address register 110A and a wait control 140.

The configuration further includes an intermediate buffer 170 for transfer data between the logical address execution unit 310 and the physical address execution unit 320 and an internal RAM 340 for storing operation parameters, line kind information, and pattern information for a paint out operation.

Figure 51:
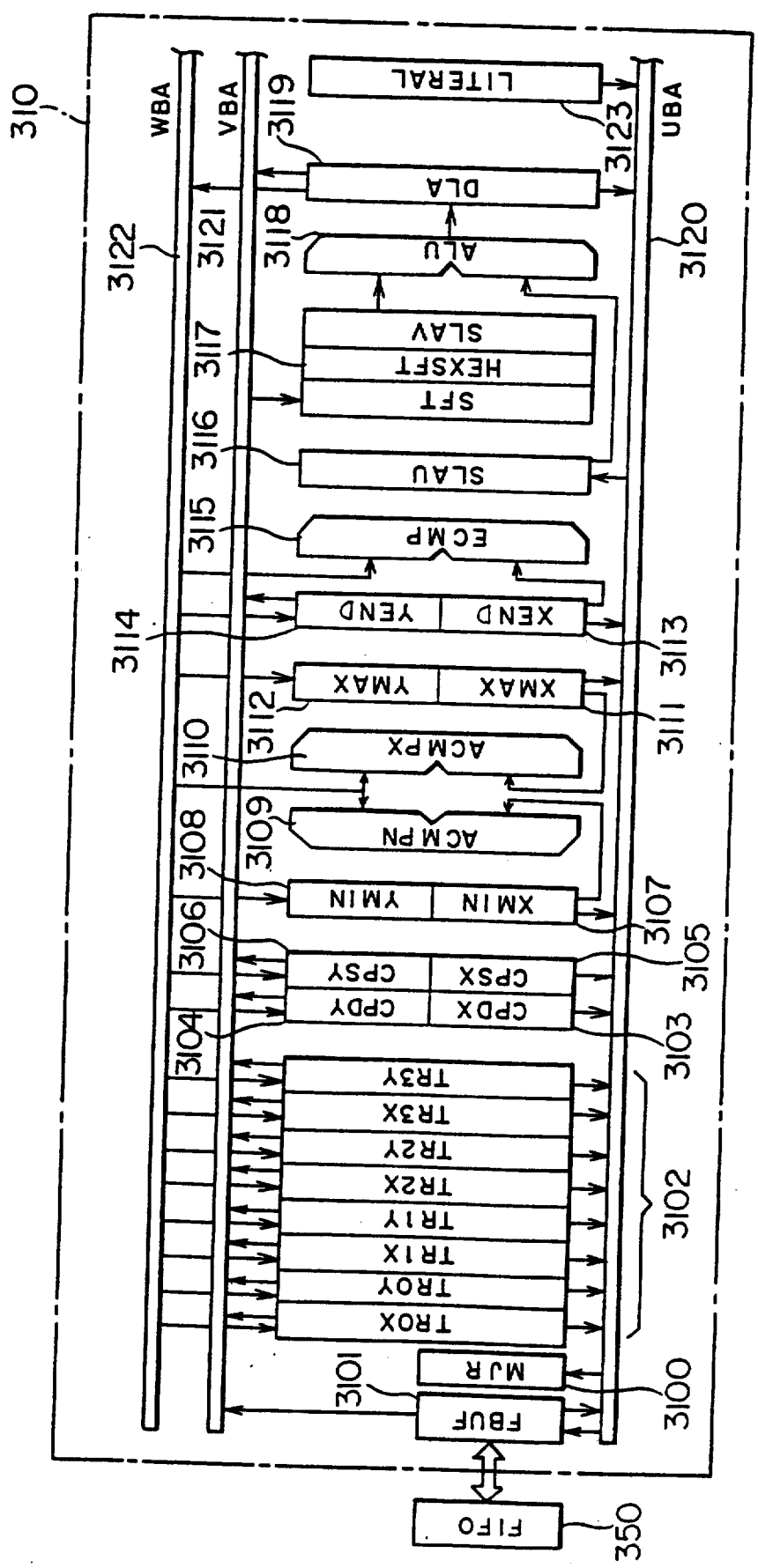
FIGS. 51-54 are schematic block diagrams illustrating details of an arithmetic unit.

FIG. 51 is a schematic diagram showing in detail the logical address execution unit 310, which comprises an FIFO buffer 3101, a multijump register (MJR) 3100, a group of general-purpose registers (TR0X, TR0Y, TR1X, TR1Y, TR2X, TR2Y, TR3X, and TR3Y), a drawing coordinate current pointer including CPDX 3103 and CPDY 3104 indicating the respective drawing coordinate values, a transfer source coordinate current pointer including CPSX 3105 and CPSY 3106 indicating the respective transfer source coordinate values, area control registers XMIN 3107, YMIN 3108, XMAX 3111, and YMAX 3112; an area judge comparator including ACMPN 3109 and ACMPX 3110, an end point register including XEND 3113 and YEND 3114, an end point comparator ECMP 3115, a source latch section including source latches (SFT, HEXSFT, and SLAV) 3117 and SLAU 3116, a destination latch DLA 3119, a constant generator LITERAL 3123, a read bus section including UBA 3120 and VBA 3121, and a write bus 3122.

Figure 52:
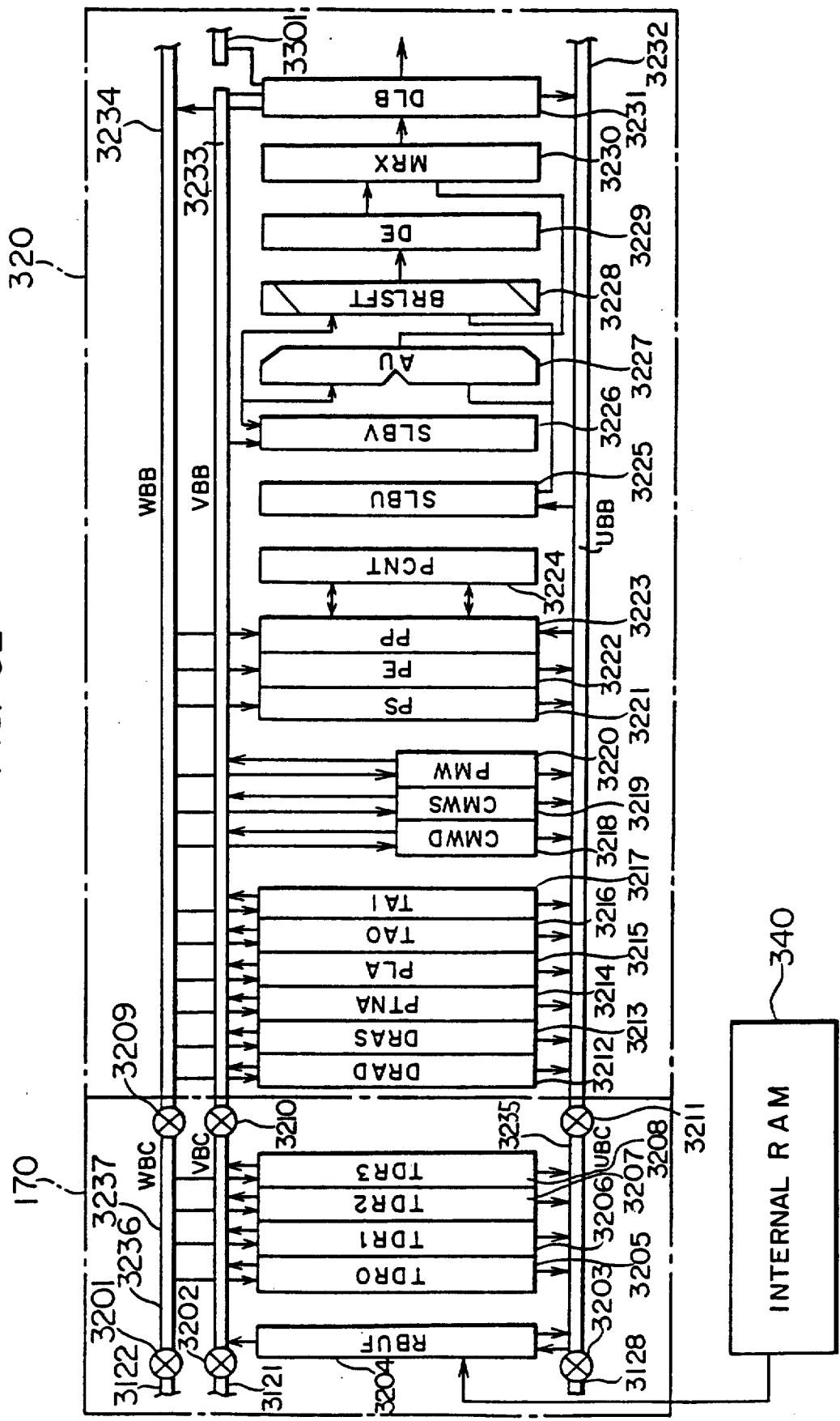

FIG. 52 is a schematic diagram showing in detail the intermediate buffer 170 and the physical address execution unit 320.

There are provided an internal RAM buffer RBUF 3204, a group of general-purpose registers TDR0 3205, TDR1 3206, TDR2 3207, and TDR3 3208; a register DRAD 3212 to store a memory address in the drawing coordinate system, a register DRAS 3213 to store a memory address in the transfer source coordinate system, a register PTNA to store a memory address of the pattern coordinate system of a pattern storing a graphic form to paint out a graphic image, a register PLA 3215 to indicate a pel area for a bold-line drawing operation, general purpose registers TA0 3216 and TA1 3217, a register CMWD to store a memory width of the drawing coordinate system, a register CMWS 3219 to store a memory width of the transfer source coordinate system, a register PMW 3220 to store a memory width of the pattern coordinate system, pattern control registers PS 3221, PE 3222, and PP 3223, a pattern pointer counter PCNT 3224 to update a pattern pointer PP 3223, source latches SLBU 3225 and SLBV 3226, an arithmetic unit AU 3227, a barrel shifter BRLSFT 3228, a data expander DE 3229, a multiplexer MPX 3230, a destination latch BLB 3231, read buses UBB 3232, VBB 3233, UBC 3235, and VBC 3236; write buses WBB 3234 and WBC 3237, and bus switches 3201, 3202, 3203, 3209, 3210, and 3211.

Figure 53:
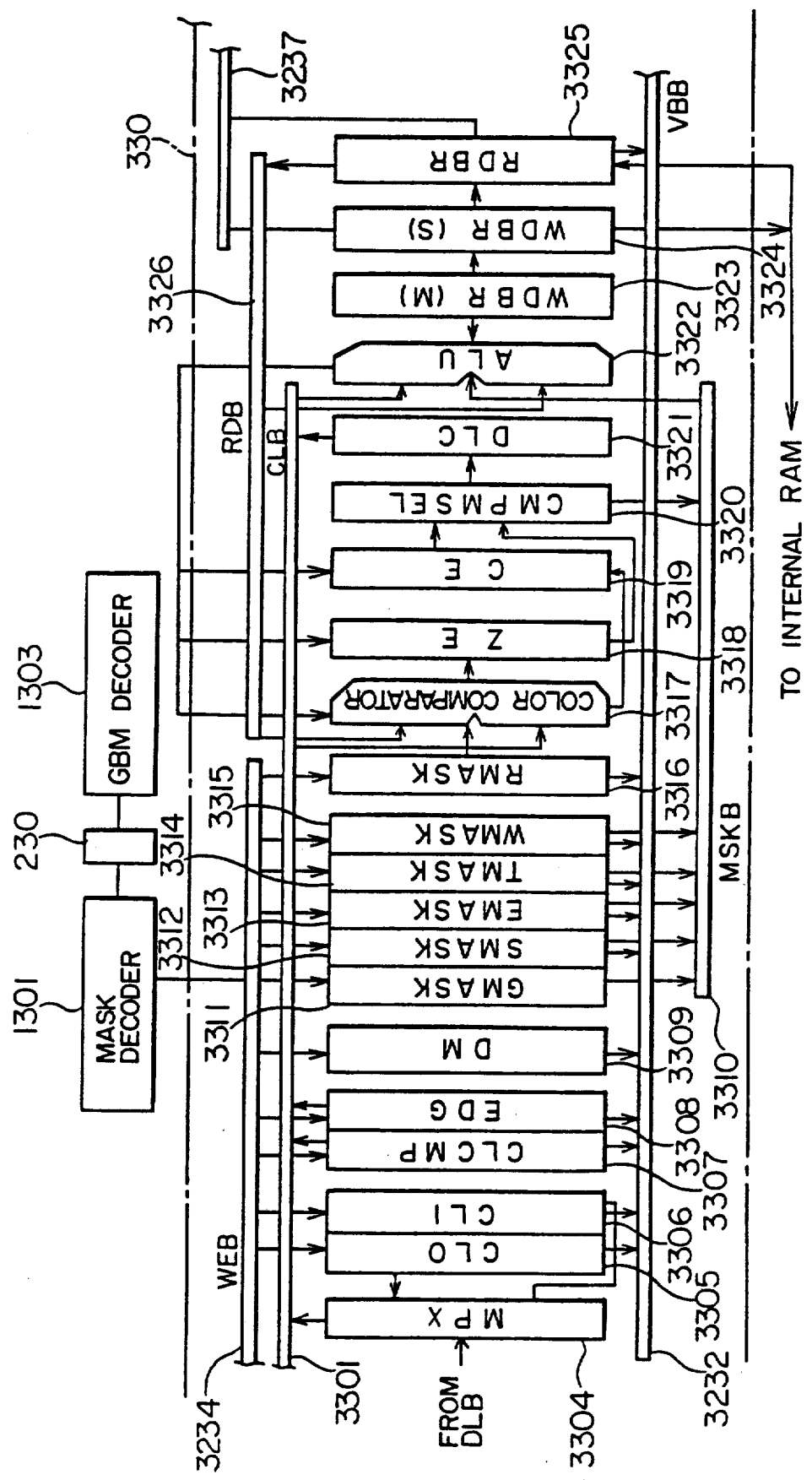
Figure 54:
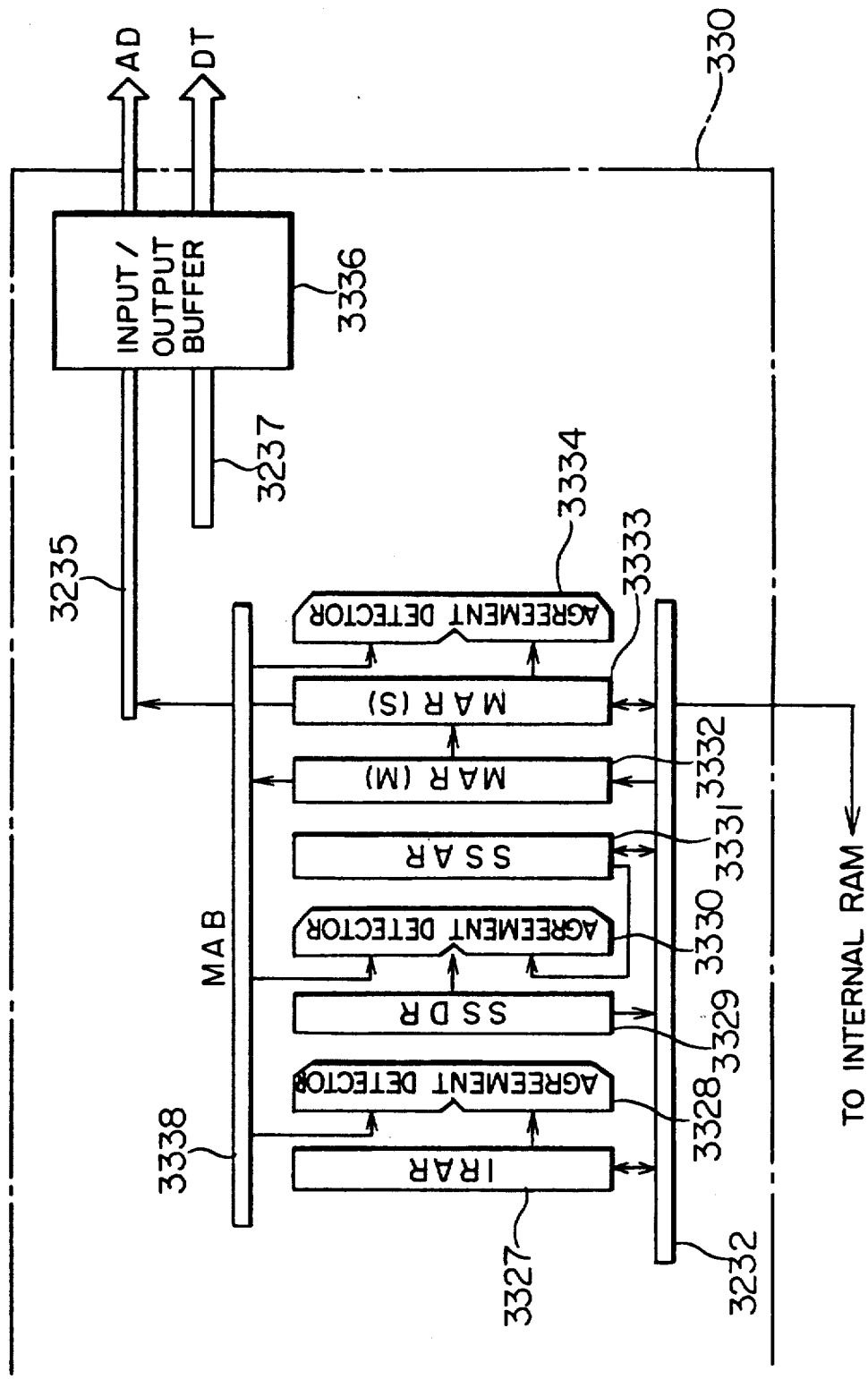

FIGS. 53-54 are schematic diagrams showing in detail the color data execution unit 330, which includes a multiplexer 3304, color registers CL0 3305 and CL1 3306, a color compare register CLCMP 3307, an edge color register EDG 3308, a drawing mode register DM 3309, mask registers GMASK 3311, SMASK 3312, EMASK 3313, TMASK 3314, WMASK 3315, and RMASK 3316, a color comparator 3317, a zero flag expander ZE 3318, a carrier flag expander CMPMSEL 3320, a destination latch (DLC) 3321, an arithmetic logic unit ALU 3322, write data buffers WDBR(M)

3223 and WDBR(S) 3224, a read data buffer RDBR 3325, an internal RAM address define register IRAR 3327, an agreement detector 3328, a stack area define register SSDR 3329, an agreement (or coincidence) detector 3330, a stack first address register SSAR 3331, memory address registers MAR(M) 3332 and MAR(S) 3333, an agreement (coincidence) detector 3334, a mask bus MSKB 3310, a a color data bus CLB 3301, a memory input/output bus 3237, an address output bus 3335, a memory address bus MAB 3338, and an input/output buffer 3336.

Next, description will be given of operations of the embodiment configured as described above. First, one of the features of the present invention, namely, a 2-level microprogram will be described.

In the configuration of FIG. 50, an instruction code from an external device such as a central processing unit (not shown) is written via an FIFO buffer 350 in the instruction register 250 and is thereafter loaded in the LRAR 220 so as to read the logical microprogram ROM 210. A logical micro instruction is then read according to an address set to the LRAR 220 and is stored in the logical micro instruction register 260. The logical micro instruction is thereafter decoded by the logical micro instruction decoder 270 and the decoded result controls the logical address execution unit 310 to calculate a logical address. On the other hand, the value of the LRAR 220 is updated by the address incrementer INC 230 and then logical microinstructions are sequentially read depending on the updated value. Furthermore, when using a subroutine, a return address from the subroutine is beforehand set to the stack 240.

On the other hand, in order to calculate a physical address corresponding a logical address, the logical micro instruction read the logical microprogram ROM 100. The logical micro instruction controls the physical address execution unit 320 and the color data execution unit 330. A portion of the logical micro instruction is loaded in the PRAR 110 so as to generate an address where a physical micro instruction is read. The physical micro instruction thus read according to the content of the PRAR 110 is loaded in the physical micro instruction register 120. The physical micro instruction is thereafter decoded by the physical micro instruction decoder 130 so as to control the physical address execution unit 320, thereby calculating a physical address and simultaneously reading data from the display memory based on the physical address. The color data execution unit 330 effects thereafter a color data operation and writes the resultant data in the display memory.

FIGS. 55A-55B show a program example of a 2-level structure in which the microprogram is divided into a microprogram to effect a logical address operation and a microprogram to achieve a physical address operation. FIG. 55C shows an example to draw a line (a>b), which is implemented by a logical microprogram example of FIG. 55A and a physical microprogram example of FIG. 55B. As a feature of the present invention, the program flow of the FIG. 55A includes only an algorithm to calculate the logical address, which enables to improve the describability or description capability of a microprogram and allows to delete a wrong description. When activated by a logical microprogram, the physical microprogram can independently proceed with the program sequence. During an execution of the physical microprogram, if an initiation request is further issued from a logical microprogram, the wait control section 140 supplies an operation stop signal (a wait signal) to the logical microprogram so as to keep the logical microprogram in the wait state until the physical microprogram stops the operation thereof.

Furthermore, as another feature of the present invention, the physical microprogram includes many description items not depending on the drawing algorithm, and hence the description, for example, of FIG. 55B is applicable not only to a drawing of a straight line but also to a drawing of a circle and an ellipse. Consequently, as compared with a method proposed by the JP-A-61-130991 (Japanese Patent Application No. 59-251907) in which a logical microprogram and a physical microprogram are described in a microprogram, the method of the present embodiment can substantially reduce the microprogram capacity.

Next, another feature of the present invention, namely, the multijump control will be described.

In the logical microprogram ROM 210 including a description of a drawing algorithm, there exist some cases where a multiple branch or multijump must be accomplished depending on the difference of the parameters. In such a case, as compared with a processing in which a two-destination branch is effected a plurality of times, the processing of this method enabling branches to multiple destinations can develop a higher processing speed. Next, a description will be given of a method of the multijump processing adopted by this embodiment.

Figure 56:
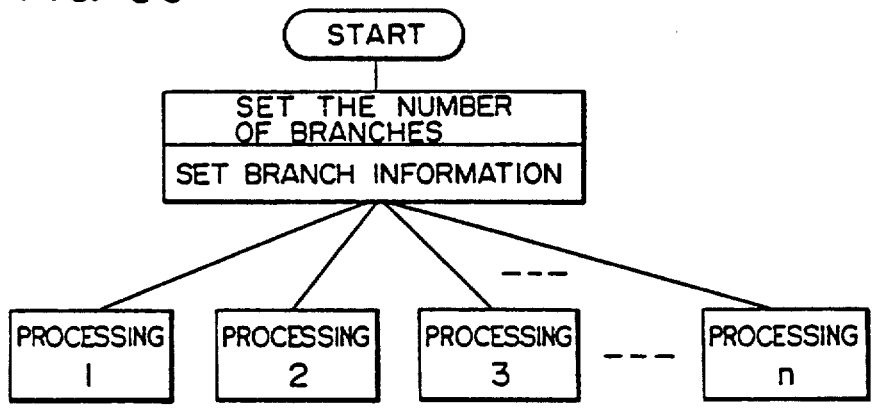
FIGS. 56, 57, and 58A-58B are an explanatory diagram, a logic circuit diagram, and schematic diagram of register operations, respectively, illustrating details of a multi-jump operation.

FIG. 56 shows a processing flow of a multijump operation according to the method in which the number of jump destinations is first determined. A feature of this method resides in that the number of jump destinations can be set in the $2^n$ units and that the interval between the jump destination addresses can be changed. For example, in the case of four jump destinations, the address interval therebetween can be set to a value in a step of $2^n$ ranging from 4 to 512. By changing the address interval between the jump destinations depending on the volume of a program of each jump destination, the address space can be effectively utilized.

Figure 57:
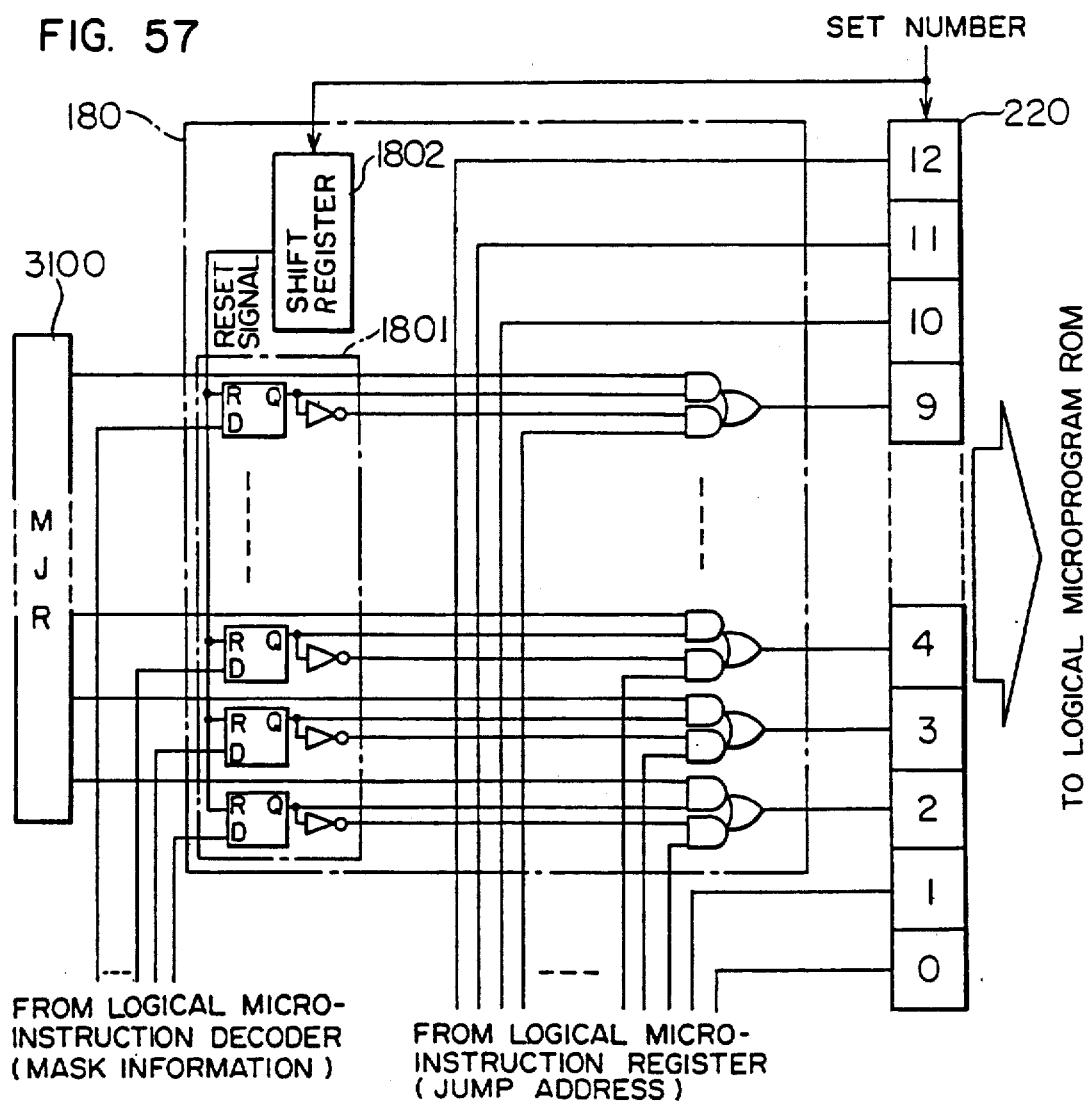
Figure 58A:
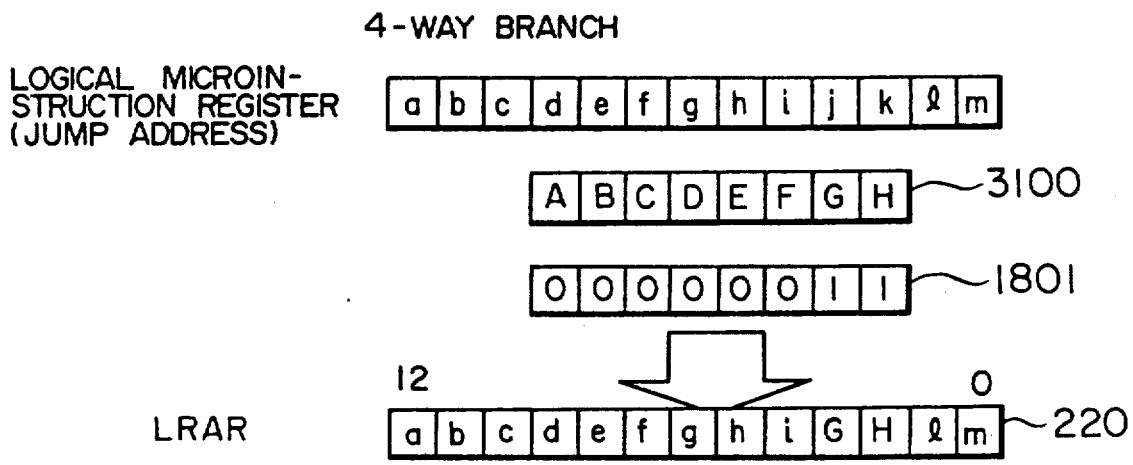
Figure 58B:
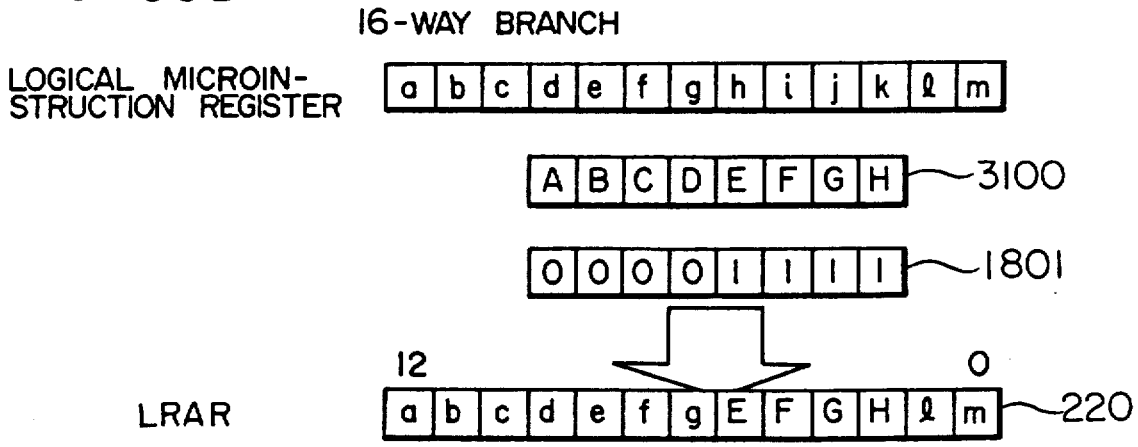

FIGS. 57 and 58A-58B are explanatory diagrams useful to explain the method above. The number of jumps is set to a multijump control register 1801 provided in the multijump control circuit 180. Information of the jump is set to a multijump register MJR 3100. Thereafter, when the logical microprogram sets a jump address to the LRAR 220, only for the bits of the multijump control register 1801 to which "1" is beforehand set, the data of the multijump register MJR 3100 is loaded in the LRAR 220. In FIG. 58A, two bits of the MJR 3100 are set to bit 2 and bit 3 of the LRAR 220 for a jump with four destinations. FIG. 58B shows a jump with 16 jump destinations. After the jump address is set to the LRAR 220, the set signal undergoes a timing adjustment in a shift register 1802 to reset the multijump control register 1801. This enables, when setting the next jump address to the LRAR 220, the jump address from the micro instruction to be set for all bits, thereby achieving an unconditional jump in an ordinary fashion.

Next, description will be given of a method to stop a microprogram by setting a break point which is efficient means to achieve a debug on the microprogram.

A logical microprogram including a description of a drawing algorithm requires a great effort to debug the microprogram due to the complex description thereof. For the program debug in this situation, an efficient debug means is implemented by stopping a program during an execution at an arbitrary point and by reading out an internal state.

Figure 59:
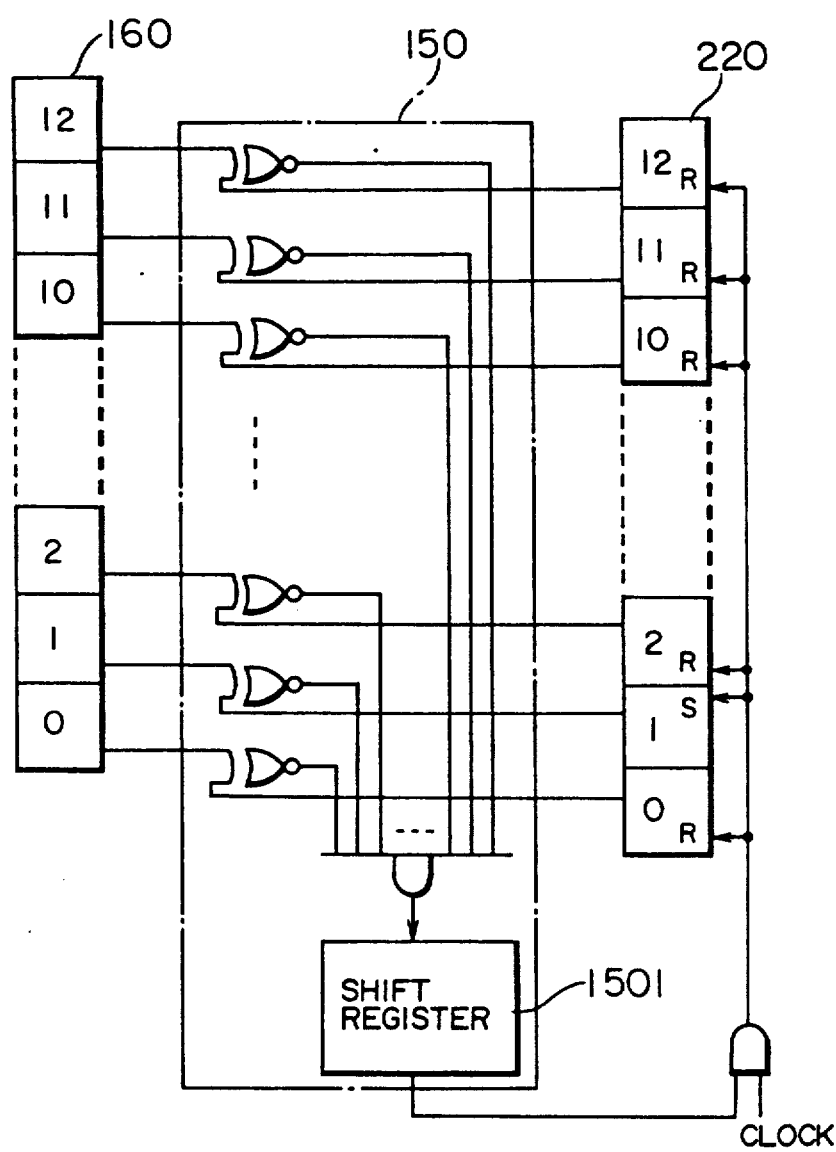
FIGS. 59-60 are a circuit diagram and a timing chart schematically illustrating a method to stop a microprogram by setting a break point, respectively.
Figure 60:
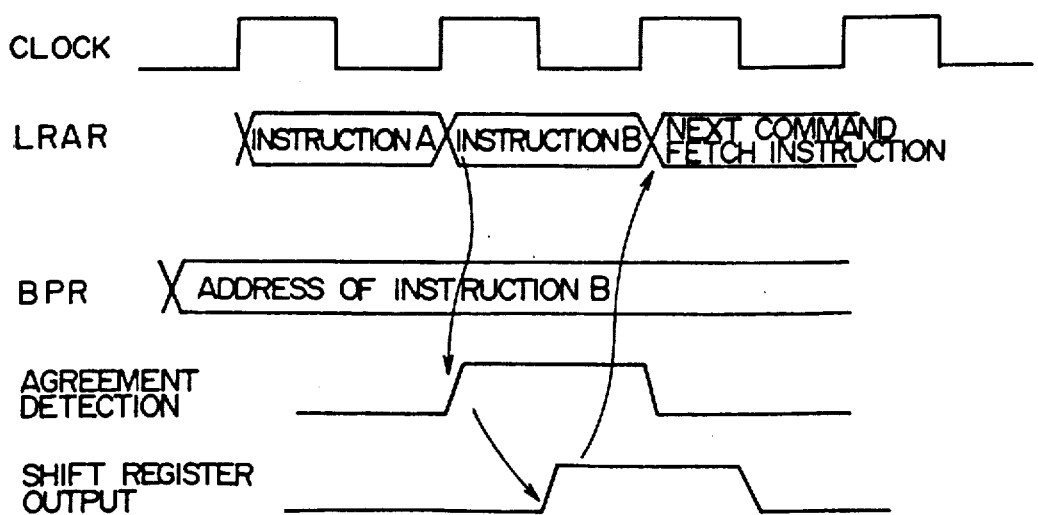

FIG. 59 is a schematic diagram for explaining a method to stop the microprogram as described above. Prior to execution of a program to be checked, an address at which the program execution is stopped is set to the break point register BPR 160. When the program to be debugged is executed and the content of the LRAR 220 becomes to be equal to that of the BPR 160, the agreement detect circuit 34 outputs an agreement signal. The agreement signal is subjected to a timing adjustment by the shift register 1501 and the obtained signal is sent to the LRAR 220. In the LRAR 220, an arbitrary address can be substituted by setting the agteement signal or by connecting the agreement signal to a reset terminal. FIG. 60 is a timing chart showing the operation above. The replacement address is assumed to be the first address of a fetch program associated with the subsequent command. Namely, after the execution of the program thus stopped, a command is transferred to read an internal register, thereby attaining internal information. If a command which can be executed at an arbitrary address is further transmitted thereafter, it is possible to reexecuted the program beginning from an address next to the address when the program is stopped.

The graphic display processor 10 of this embodiment is applicable to the graphic processing system of FIG. 1. In this configuration, the central processing unit (CPU) 12 transfers commands and parameters from the system memory 12 to the graphic display processor 10, which in turn interprets the command to achieve execution of a drawing operation in the frame buffer 14. The graphic form thus drawn is converted into serial data in the display data converter 15 and is then displayed on the display equipment 16.

Figure 61:
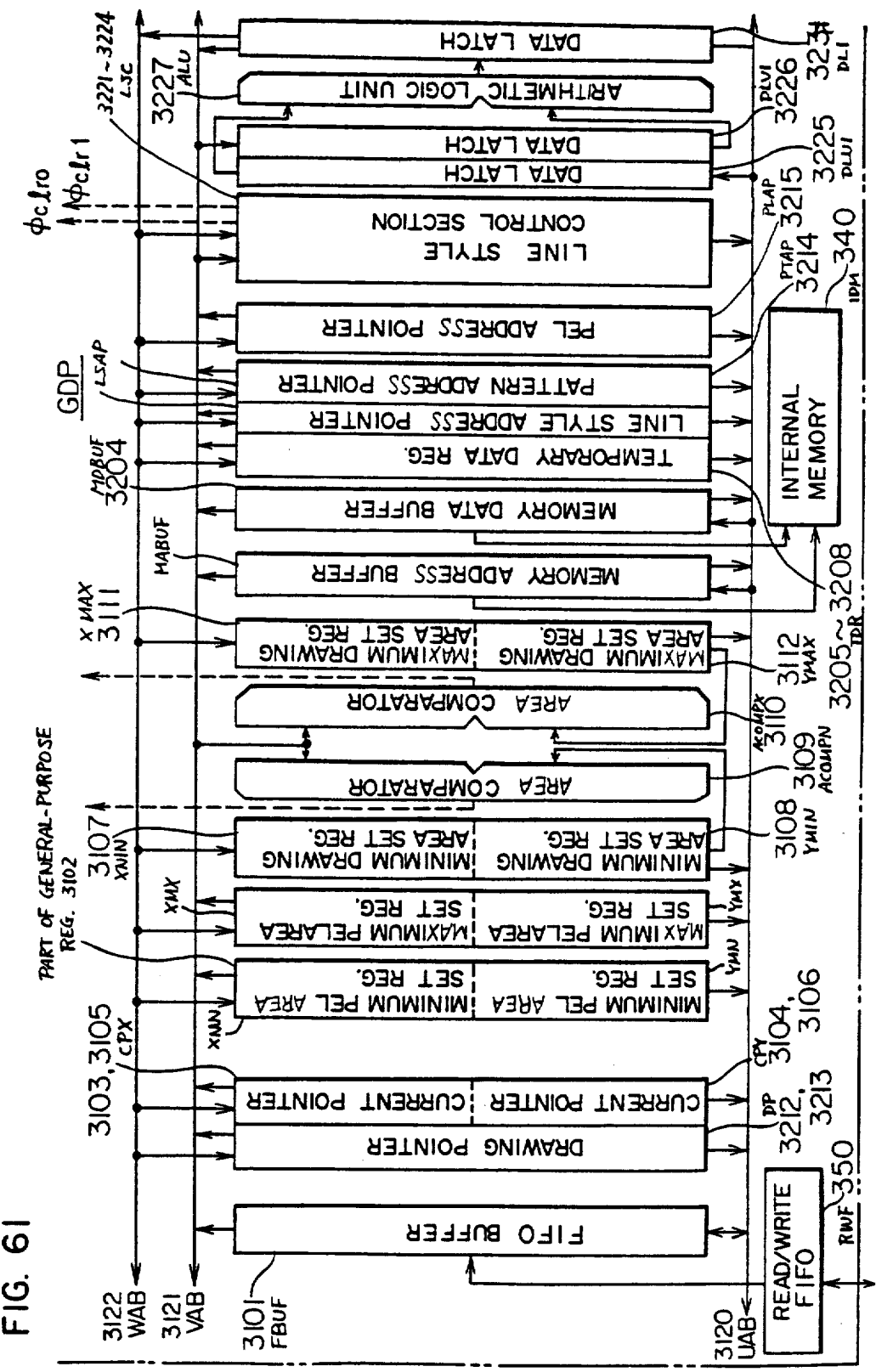
FIG. 61 is a schematic block diagram illustrating the primary constitution of a half portion of a graphic display processor as another embodiment of the image processing apparatus according to the present invention.
Figure 62:
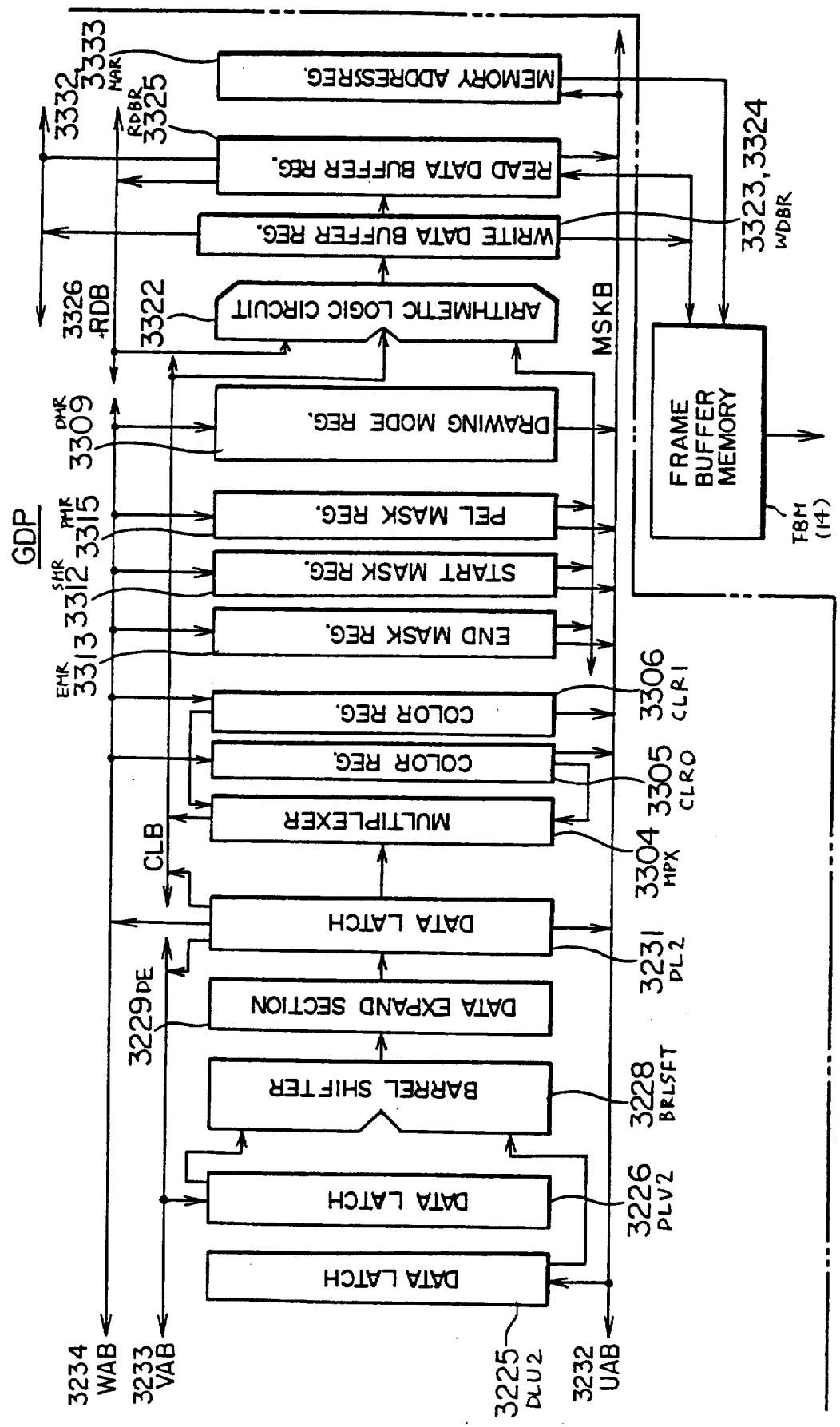
FIG. 62 is a schematic block diagram illustrating a remaining half portion of the graphic display processor.

FIGS 61-62 are block diagram showing a graphic display processor as an embodiment of a graphic processing apparatus according to the present invention. The graphic display processor GDP of this configuration functions, not limited to, as a display controller accomplishing a display control and a drawing operation in a display system including a CCRT display equipment.

The graphic display processor GDP operates under a control system in which a command supplied from a microprocessor MPU is executed according to a microprogram control method and includes various execute means (not shown) required for the ordinary microprogram control such as a command register, a parameter register, a control storage storing predetermined microinstructions, and execute means to execute an instruction based on a sequence of microinstructions read for the control storage and parameters.

Figure 63:
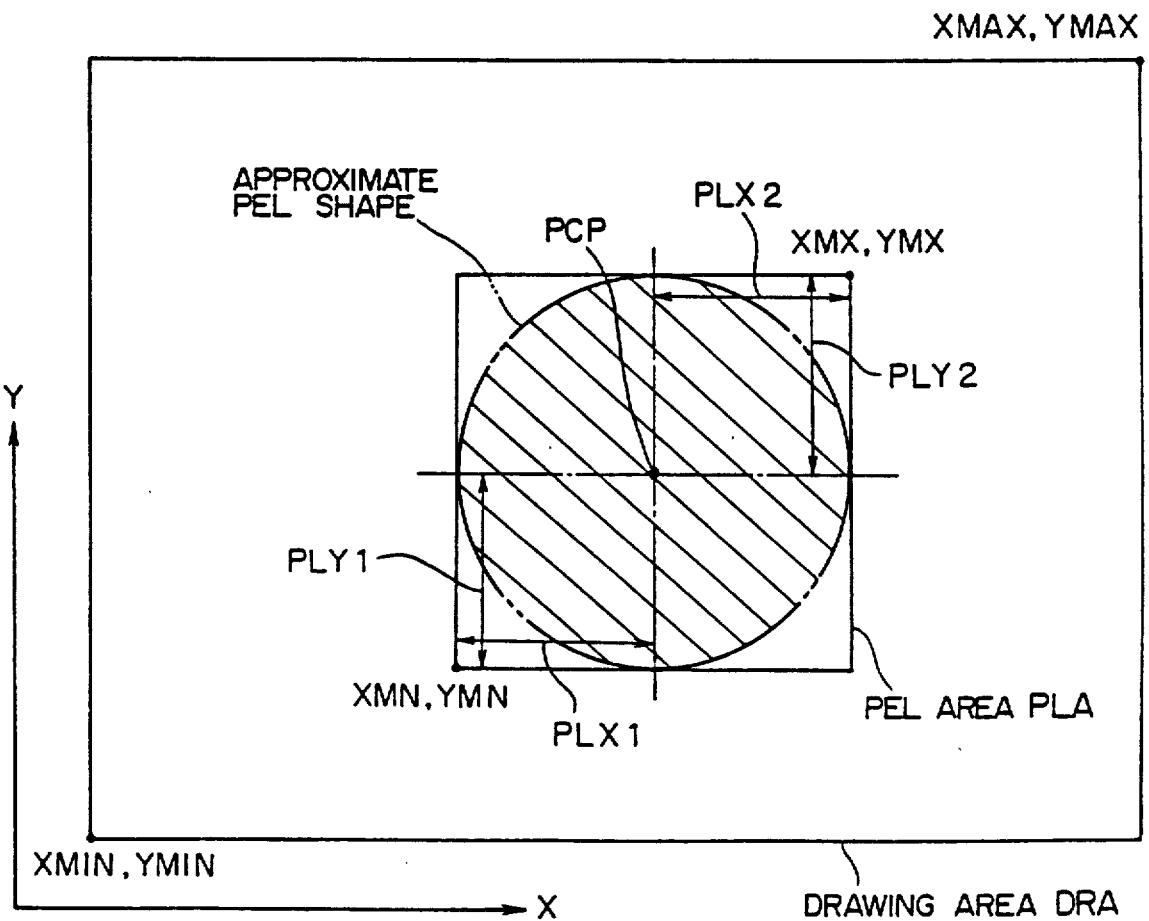
FIG. 63 is an explanatory diagram useful to explain the definition of a logic pel and a drawing region.

The internal bus of the graphic display processor GDP of FIGS. 61-63 primarily comprises a 3-bus structure including a first bus UAB, a second bus VAB, and a third bus WAB. There are further included a color bus CLB dedicated to color data , a read data bus RDB dedicated to graphic data read from the frame buffer memory FBm, and a mask bus MSKB dedicated to various mask data for logic operations. Although not limited to, each internal bus is of a 32 -bit width.

The graphic display processor GDP is provided with as an interface section for the microprocessor MPU a read/write FIFO RWF operating in the first-in first-out fashion. The read/write FIFO RWF is linked to an FIFO buffer FBUF having a data input/output terminal connected to the first bus UAB and the second bus VAB. Furthermore, as an interface section for the frame buffer memory FBM, a read data buffer register RDBR and a write data buffer register WDBR and linked to data input/output terminals of the frame buffer memory FBM. A memory address register MAR is linked to an address input terminal of the frame buffer memory FBM. Incidentally, the data output terminal of the read data buffer register RDBR is connected to the first bus UAB and the read data bus RDB; moreover, the memory address register MAR is supplied with address data from a drawing pointer DP so as to address the frame buffer emory FBM based on the address data.

The drawing mode of the graphic display processor GDP includes here, not particularly limited to, an operation mode to specify a data operation such as a bit block transfer, a conditional operation mode to specify a conditional operation such as a color operation, a color ode to specify an expansion of binary data including monochrome font data into color data, an area mode to specify a drawing area control, and a logical pel mode specifying a pel drawing by a line drawing command. For each drawing mode, a code including a predetermined number of bits is set to the drawing mode register DMR. Particularly, the drawing modes directly related to this embodiment include the logical pel mode (PEL), the color mode j(COL), and the area mode (AREA).

The color mode is an operation mode effective in the case where the source data (to be described later) contains binary data an the destination data includes color data in which the source data undergoes a color expansion based on the color data set to the color registers CLR0 and CLR1. This operation mode is specified, although not limited to, by two bits in the code setting the drawing mode. For COL=00, depending on "0" and "1" of the source data, an operation to expand color is achieved by use of the colors set to the color registers CLR0 and CLR1, respectively. For COL=01, the color of the color register CLR1 is expanded when the source data is "1", whereas the color expansion is inhibited when the source data is "0". For COL=10, the color of the color register CLR0 is expanded when the source data is "0", whereas the color expansion is inhibited when the source data is "1". For COL=11, the cello expansion is indicated not to be executed regardless of the content of the source data, namely, "1" or "0". Selection between color data set to the color registers CLR0 and CLR1, that is, the color expansion is effected by a multiplexer, whereas the source data as an object of the color expansion is developed (expanded) from pixel-unit data into bit-unit data constituting the pixel and the resultant data is supplied to the multiplexer MPX.

The data expansion above can be effected by means of a configuration including a data latch circuit DLU 2 having an input terminal connected to the first bus UAB, a data latch circuit DLV 2 having an input terminal inked to the second bus VAB, a barrel shifter to shift the data stored in the data latch circuits DLU 2 and DLV 2 by a predetermined number of bits and to output the resultant data, a data expand section DE capable of developing the outputs from the barrel shifter BRLSFT, particularly, binary information into multivalue information (for example of the 4 bits/pixel configuration) in the bit units constituting a pixel, and a data latch circuit DL 2 to latch data outputted from the data expansion section DE. This configuration is utilized not only for the data expansion of data to be subjected to a color development by the multiplexer MPX but also functions as a data transfer route to supply color pattern data to the color bus CLB, furthermore, the configuration is also used to form various mask data.

The pel drawing operation according to the present embodiment is achieved to draw a bold line by the line drawing command. Namely, by using as the basic drawing unit a pel (or a logical pel) defined as a pattern or set of drawing dots having an arbitrary shape and an arbitrary size configured corresponding to a plurality of pixels, a drawing operation is accomplished with pel data at a position of an indication point designated by the current pointers CPX and CPY, which represent a pel drawing point in association with pixels in the drawing coordinate system. The logical pel mode indicating the pel drawing operation is specified, although not limited to, by two bits in the code setting of the drawing mode. PEL=00 specifies not to execute the pel drawing operation, whereas PEL=01 designates a color bold-line drawing operation (for example, to draw a dot-dash line with a bold line as shown in FIG. 20B) by use of a predetermined line style corresponding to line style information (data) indicated by the pel origin. PEL=11 denotes a bold line drawing (for example, by use of a stripe pattern as shown in FIG. 20C) with a predetermined pattern of a color corresponding to the pattern data. Incidentally, PEL=10 is reserved and is substantially regarded as identical to the specification of PEL=00.

The shape and size of each pel are defined as various pel data in an internal memory IDM comprising a random access memory (RAM). For a logical pel defined by the pel data, if the shape thereof is approximately is circle indicated by the hatching, for example, as shown in FIG. 63, a pel area PLA of a rectangular shape surrounding the pel shape is defined according to the pel origin PCP and the distances centered thereon PLX1, PLX2, PLY1, and PLY2; furthermore, for the definition of the shape of the pel, the bits (having a one-to-one correspondence with respect to the pixels) included in the shape (hatching area) in the pel area are set to "1", whereas the bits (having the one-to-one correspondence with respect to the pixels) not included in the pel shape of the pel area are set to "0".

The internal memory IDM has a data input/output terminal linked to the memory data buffer MDBUF and an address input terminal linked to the memory address buffer MABUF, so that the addressing of the pel data is effected via a pel address pointer PLAP. Pel data read from the internal memory IDM is temporarily stored in the memory data buffer MDBUF, while the data corresponding to the distances PLX1, PLY1, PLX2, and PLY2 are used to effect an initial setting operation of the pel area PLA based on the data (corresponding to the pel origin PCP) indicated by the current pointers CPX and CPY prior to the start of the pel drawing operation. Namely, the data indicated by the current pointers CPX and CPY corresponding to the pel origin PCP and the data associated with the distances PLX1, PLX2, PLY1, and PLY2 are respectively fed via the data latch circuits DLU 1 and DLV 1 to the arithmetic logic unit ALU to effect an addition and/or a subtraction therebetween, thereby attaining the data determining the pel area PLA in the X-Y coordinate system as the drawing system, namely, the pel area maximum data on the X-coordinate axis XMX, the pel area minimum data on the X-coordinate axis XMN, the pel area maximum data on the Y-coordinate axis YMX, and the pel area minimum data on the Y-coordinate axis YMN. These initial setting data of the pel area PLA are respectively loaded via the data latch circuit DL1 in the corresponding minimum pel area set registers XMN and YMN and the corresponding maximum pel area set registers XMX and YMX. Incidentally, the arithmetic logic unit ALU is also used to effect a data operation other than the data operation for the initial setting of the pel area PLA, and there is provided a temporary register TDR to temporarily store the operation result data from the arithmetic logic unit ALU.

The line style data to be used for PEL=01 and the pattern data to be processed for PEL=11 are, although not limited to, stored in the internal memory IDM. Addressing of the line style data is accomplished depending on the output from the line style address pointer LSAP, whereas addressing of the pattern data is carried out according to the output from the pattern address pointer PTAP.

The line style data is binary data comprising a bit "1" which is an active bit in the line style specification and a bit "0" which is a negative bit in the line style specification. For the specification of PEL=01 of the logical pel mode, the line style address pointer LSAP sequentially addresses the line style data in a bit-by-bit fashion corresponding to the logical pel origin PCP. The line style data thus addressed so as to be read from the internal memory IDM is fed to the line style control section LSC, which generates control signals φclr 0 and φclr 1 for the multiplexer to select outputs of the color registers CLR0 and CLR1, respectively. Although not particularly limited to, when the bit of the line style data is "0", the control signals φclr 0 and φclr 1 are set to the select and nonselect levels, respectively; whereas when the line style data bit is "1", the control signals φclr 0 and φclr 1 are set to the nonselect and select levels, respectively. In the mode of PEL=01 (the bold line drawing mode with the specified line style), although not particularly limited to, the "COL=10" mode or the "COL=01" mode is required to be set, for example, in the case where color data corresponding to the color for the drawing is stored in the color register CLR1, if the "COL=01" mode is beforehand set, a bold line of the predetermined line style can be drawn in a color associated with the color data stored in the color register CLR1. On the other hand, in the case where the color data corresponding to the color for the drawing is stored in the color register CLR0, if the "COL=10" mode is set, the background other than the bold line of the predetermined line style can be drawn in a color associated with the color data stored in the color register CLR0, and the portion of the bold line of the line style is set to the negative state, in other words, in the reverse state.

The pattern data comprises binary data as monochrome font data or multivalue data as color font data and is stored in the internal memory IDM such that predetermined pattern data is addressed by use of an output from the pattern address pointer PTAP. The "PEL=11" mode in this embodiment is, not particularly limited to, a mode in which the line style cannot be specified and a successive bold-line drawing operation is accomplished with a predetermined pattern. If the pattern data includes binary data, a data expansion is accomplished on the data through the data expansion section DE and the like to attain a necessary number of bits for a color expansion. The expanded data is processed by the multiplexer MPX so as to select color data for the color registers CLR0 and CLR1 in accordance with "1" and "0" of each bit thereof, thereby effecting the color expansion. Pattern data including multivalue data is directly supplied from the data latch circuit DL2 via a bit position alignment by the barrel shifter BRLSFT and the like to the color bus CLB.

Here, although not particularly limited to, the bold-line drawing in the logical pel mode can be processed at a higher speed, as compared with the processing achieved in the pixel unit, by assuming 32-bit color data to correspond to a 1-word boundary; consequently, there is provided the data expansion section DF to expand, for example, pel data in the form of binary data corresponding to a pixel into data having a number of bits corresponding to the color data bits such as 4 bits/pixel. In this case, various mask data are necessary for the 1-word boundary data to be processed. Namely, referring to FIG. 63, when the 1-word boundary data exceeds the left end of the pel area PLA along the X-coordinate axis, there is required a start mask data to mask the bits corresponding to the portion beyond the left end. When the 1-word boundary data exceeds the right end of the pel area PLA along the X-coordinate axis, there is required an end mask data to mask the bits associated with the portion beyond the right end. Furthermore, a pel mask data is necessary to mask the bits outside the pel shape in the pel area PLA. For example, in the start and end mask data, although not particularly limited to, the bits corresponding to the outside of the pel area PLA are set to "0" and the bits associated with the inside of the pel area PLA are set to "1". In addition, in the pel mask data, although not particularly limited to, the bits corresponding to the inside of the pel shape are set to "1" and the bits associated with the outside of the pel shape are set to "0". The pel mask data, the start mask data, and the end mask data are generated through the data expansion effected according to various pel data read from the internal memory IDM so as to be stored in the pel mask register PMR, the start mask register SMR, and the end mask register EMR.

Figure 64:
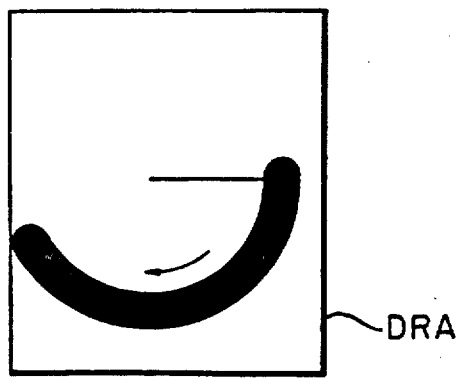
FIG. 64 is an explanatory diagram useful to explain a drawing state in a mode in which when a pel region exceeds a drawing region under a drawing region control in the pel mode, the pel drawing operation is finished.
Figure 65:
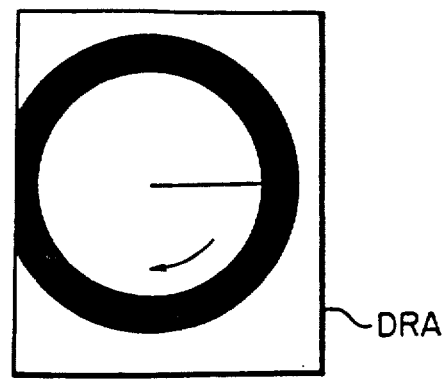
FIG. 65 is an explanatory diagram useful to explain a drawing state in a mode in which when a pel region exceeds a drawing region under a drawing region control in a pel mode, the pel drawing operation is continued without effecting the drawing of the portion where the drawing region is exceeded.
Figure 66:
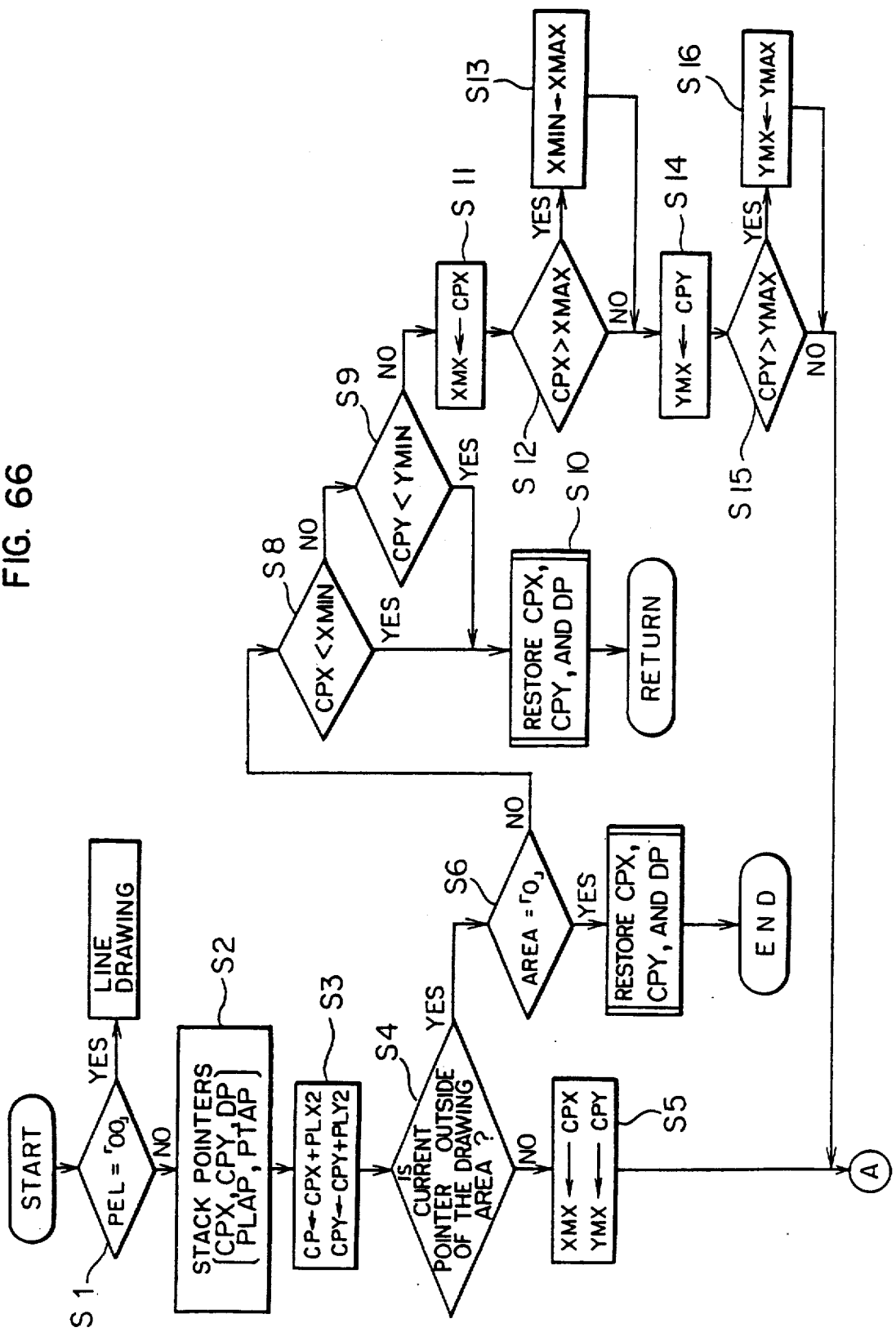
FIG. 66 is a first flow chart illustrating the pel drawing operation.
Figure 67:
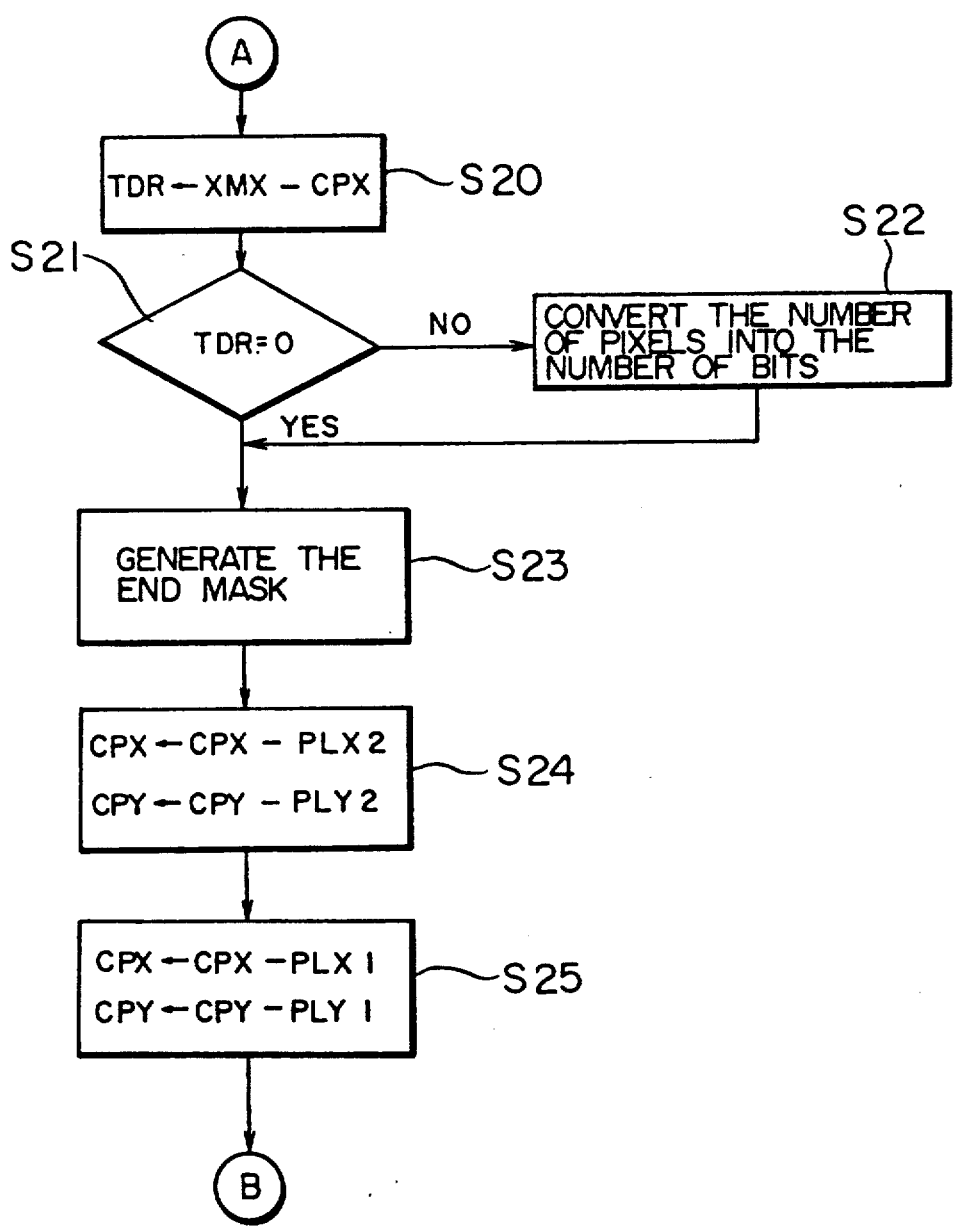
FIG. 67 is a second flow chart illustrating the pel drawing operation.
Figure 68:
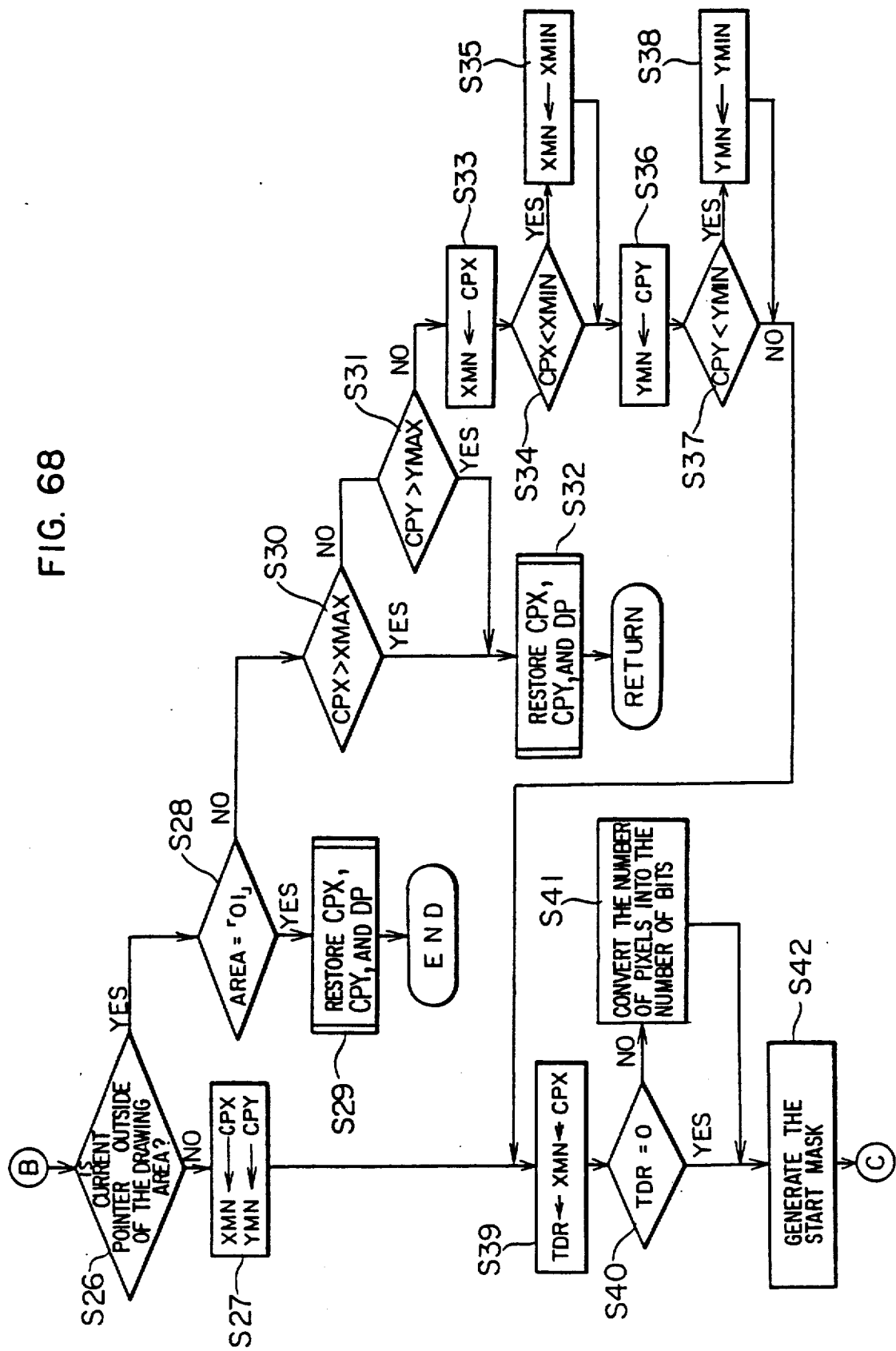
FIG. 68 is a third flow chart illustrating the pel drawing operation.
Figure 69:
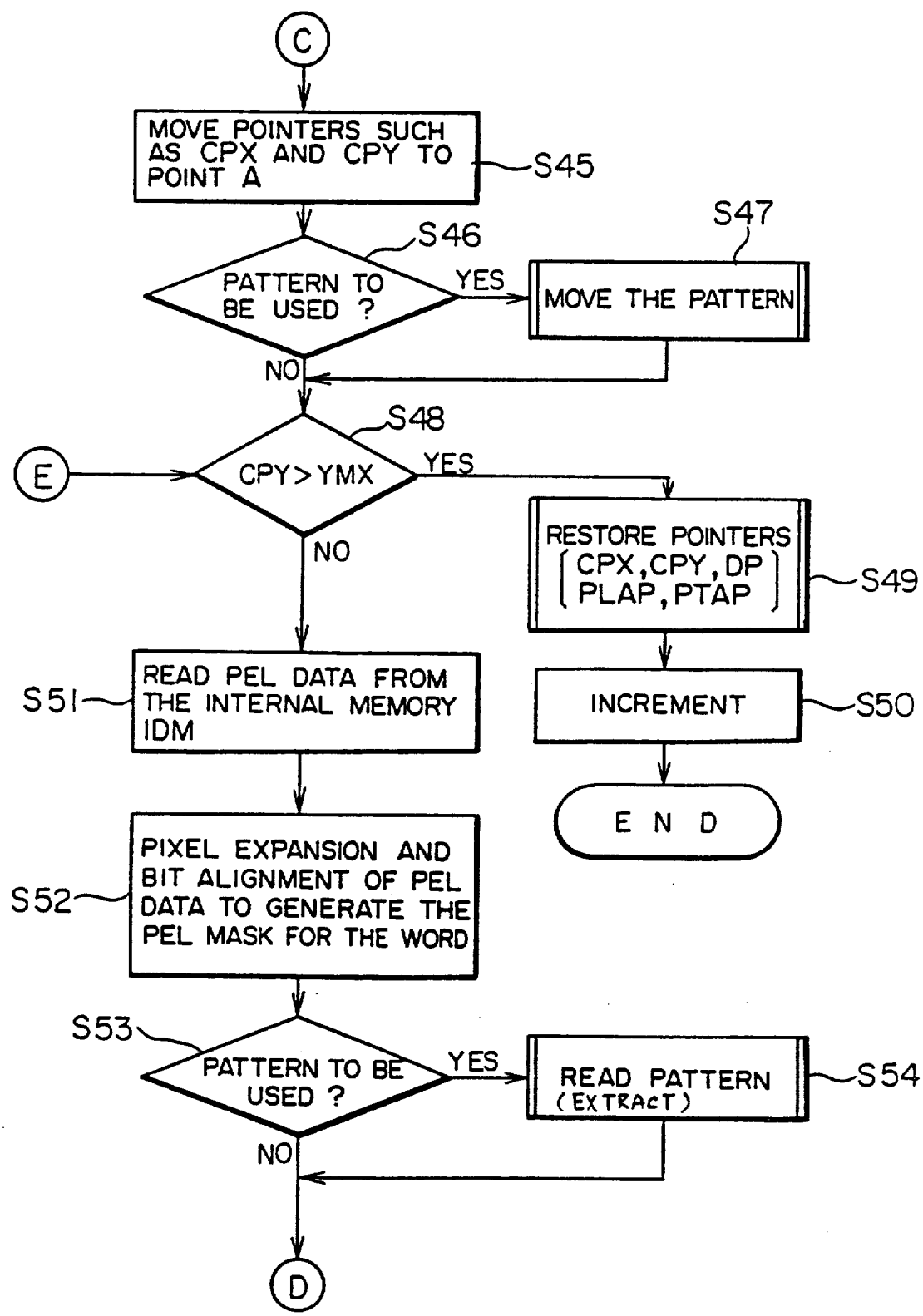
FIG. 69 is a fourth flow chart illustrating the pel drawing operation.
Figure 70:
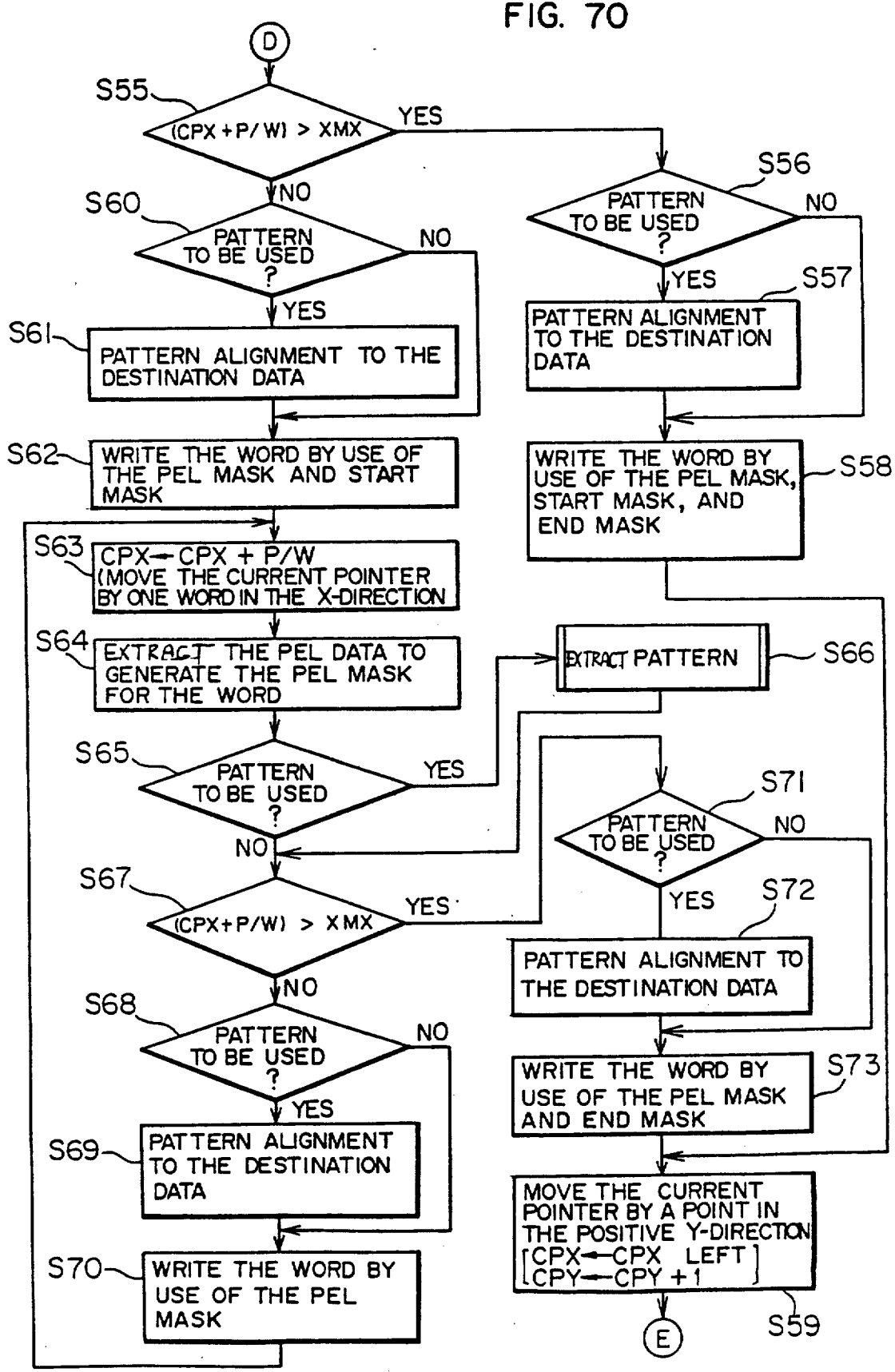
FIG. 70 is a fifth flow chart illustrating the pel drawing operation.

The area mode (AREA) is an operation mode to effect a drawing area control in the X-Y coordinate system (the drawing coordinated system) and is also applicable to the window clipping. The operation mode can be specified by two bits predetermined in the code setting of the drawing mode. For AREA=01, when a graphic form to be drawn exceeds the drawing area DRA, for example, as shown in FIG. 64, the drawing operation is finished, whereas for AREA=10, when the graphic form to be drawn exceeds the drawing area, for example, as shown in FIG. 65, the exceeded portion is not drawn and the drawing of the graphic form is continued to the end of the drawing operation. AREA=00 indicates that the drawing area control is not achieved, whereas AREA=11is reserved and is substantially regarded as identical to the "AREA=00" mode.

The drawing area DRA in the X-Y coordinate system is defined by the drawing area maximum data on the X-coordinate axis XMAX, the drawing area minimum data on the X-coordinate axis XMIN, the drawing area maximum data on the Y-coordinate axis YMAX, and the drawing area minimum data on the Y-coordinate axis YMIN. These drawing area define data are respectively stored in the corresponding maximum drawing area set registers XMAX and YMAX and the corresponding minimum drawing area set registers XMIN and YMIN.

In the pixel-unit drawing operation, the drawing area control in the area mode is effected depending on the result of a comparison made by the area comparator ACOMPX 3110 between the values of the current pointers CPX and CPY and the drawing area maximum data XMAX 3111 and YMAX 3112 and the result of a comparison made by the area comparator ACOMPN 3109 between the values of the current pointers CPX and CPY and the drawing area minimum data XMIN and YMIN (FIG. 61). Furthermore, in the case where the drawing is accomplished through a word-unit processing like in the logical pel mode, the drawing area control is achieved by resetting the pel area PLA. Namely, when the pel area PLA exceeds the drawing area DRA, the pel area initially set is reset so as to be contained in the drawing area DRA. Consequently, based on the pel area thus reset, the pel mask data, the start mask data, and the end mask data are formed as described above, which prevents, also in the drawing operation in the word-unit processing, the drawing from being effected in the area outside of the drawing area DRA. Judgment to determine whether or not the pel area PLA initially set exceeds the drawing area DRA is accomplished by the area comparators ACOMPX and ACOMPN.

The operations associated with the color mode and the logical pel mode are executed by the arithmetic logic unit LU. The mask data stored in the pel mask register PMR, the start mask register SMR, and the end mask register EMR are supplied via the mask bus MSKB to the logic unit LU, furthermore, the color pel data and pattern data undergone the color expansion by the multiplexer and the color pattern data fed from the data latch circuit DL 2 can also be supplied via the color bus CLB to the logic unit LU. In addition, the destination data read from the frame buffer memory FBM can also be delivered thereto via the read data bus RDB. The logic unit LU accomplishes an operation control as follows, namely, a drawing mode set code stored in the drawing mode register DMR is decoded by a decoder and in response to the decoded result, control signals are sequentially delivered from a control storage and the like, thereby effecting the operation control. In the configuration, the operation result from the logic unit LU can be fed via the write data buffer register WDBR to the frame buffer memory FBM based on the address control from the drawing pointer DP; furthermore, the operation result can also be supplied to the system side via the read data buffer register RDBR and the first bus UAB.

Next, the pel drawing operation of the graphic display processor GDP will be described by primarily referring to the flow charts of FIGS. 66–70.

First, when a drawing operation is specified by a line drawing command, it is judged (in step S1) to determine whether or not the pel drawing is to be executed If the "PEL=00" mode has been specified in this situation, the pel drawing is not achieved and a line drawing is effected in the ordinary pixel units.

In order to draw a dot pattern based on a predetermined logical pel data when the pel drawing is selected, the value of each pointer (the current pointers CPX and CPY, the drawing pointer DP, the pel address pointer PLAP, and the pattern address pointer PTAP) is saved in the stack area of the internal memory IDM (step S2).

To set the pel area PLA, the distance values PLX 2 and PLY 2 between the pel origin PCP and the upper-right corner of the pel area PLA are respectively added to the current pointers CPX and CPY indicating the pel origin PCP, and then the results of the additions are stored in the current pointers CPX and CPY (step S3). If the values of the current pointers CPX and CPY after the current point is moved to the coordinate point of the upper-right corner of the drawing area PLA are judged in step S4 not to exceed the drawing area DRA, the values of the current pointers CPX and CPY are assumed to be the pel area maximum data XMX and YMX so as to set the maximum point of the pel area PLA (step S5).

If the current pointers CPX and CPY are judged to exceed the drawing area DRA in the step S4, a step S6 is effected. If the step S6 judges that the "AREA=01" mode has been set, a subroutine (step S7) is achieved to restore the pointers stacked in the step S2 according to the rule of the operation mode, thereby finishing the drawing operation.

When AREA=10 is specified for the area mode, the pel drawing must be executed unless the pel area PLA completely exceeds the drawing area DRA, consequently, steps S8 and S9 are effected to achieve an area check on the upper-right corner (maximum point) of the pel area PLA. Namely, it is judged whether or not the maximum point in the upper-right corner of the pel area PLA exceeds the minimum point (SMIN, YMIN) in the lower-left corner. When the minimum point is judged to be exceeded, the further operation of the pel drawing is not necessary, and hence the subroutine (step S10) is executed to restore the pointers stacked in the step S2 so as to return the control to the start of the control routine, which then effects a drawing processing for the next dot pattern.

Figure 71:
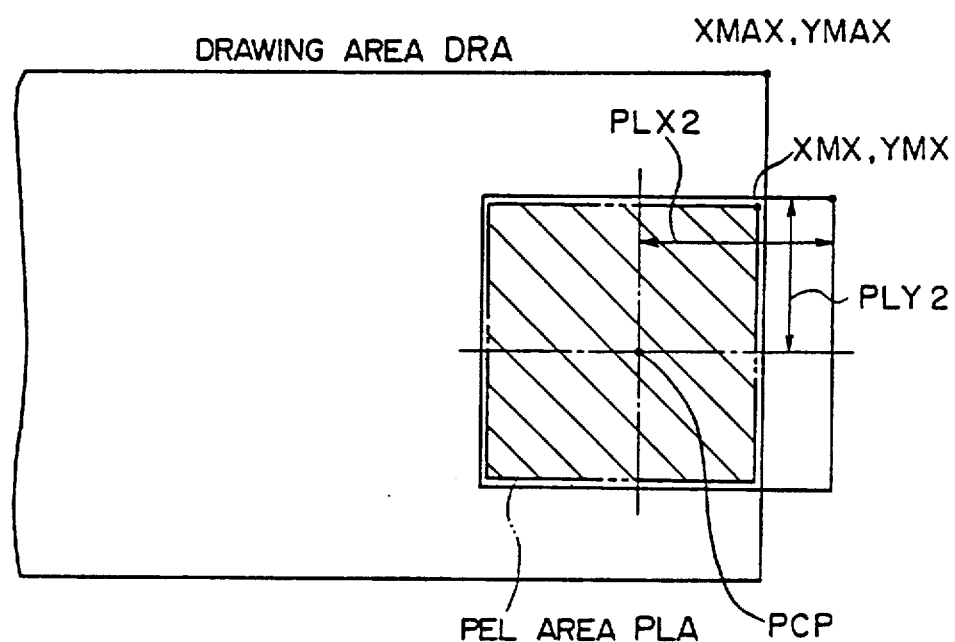
FIG. 71 is an explanatory diagram useful to explain an operation to set a maximum point (XMX, YMX) in the upper right corner of the pel region.

As a result of the judgment in the steps S8 and S9, if the maximum point in the upper-right corner of the pel area PLA is found not to exceed the minimum point (XMIN, YMIN) in the lower-left corner of the drawing area DRA, the distance $PLX_2$ is initialized (in step S11) to a value identical to the data of the current pointer CPX to which the distance $PLX_2$ has been added. If the pel area maximum data XMX is judged to exceed the maximum data XMAX of the drawing area (step S12), the pel area maximum data XMX is reset to a value equal to the value of the drawing area maximum data XMAX according to the rule of the "AREA=10" mode (step S13). Subsequently, the pel area maximum data YMX is similarly initialized to the data of the current pointer CPY to which the distance $PLY_2$ has been added (step S14). If the pel area maximum data YMX is judged in this situation to exceed the drawing area maximum data YMAX (step S15), the pel area maximum data YMX is reset according to the rule of the "AREA =10" mode to a value identical to the value of the pertinent maximum data YMAX of the drawing area (step S16). For example, as shown in FIG. 63, when the pel area PLA is entirely contained in the drawing area DRA, the pel area maximum data XMX and YMX initially set in the steps S11 and S14 determine the pel area maximum point; however, as shown in FIG. 71, if the pel area (indicated by a solid line) PLA to be initialized exceeds the drawing area DRA, the pel area maximum data XMX and YMX reset in the steps S13 and S16 determine the pel area maximum point so as to generate a pel area PLA indicated by a double-dot-and-dash line in FIG. 71.

When the area check of the upper-right corner of the pel area PLA completes the setting of the maximum point of the pel area, an operation is then accomplished depending on the result of the maximum point setting to obtain a difference between the pel area maximum data XMX and the data of the current pointer CPX to which the distance PLX 2 has been added (step S20). If the difference is judged to be other data has been reset in the step S13, a number of pixels corresponding to the difference are converted into a number of bits for color data (step S22). In step S23 thereafter, an end mask is generated in consideration of the reset value of the pel area maximum data XMX.

Next, in order to set the minimum point at the lower-left corner of the pel area PLA, the current pointers CPX and CPY set to correspond to the initial maximum point of the pel area in the step S3 are restored to the values of the pel origin PCP in step S24; furthermore, the distances PLX 1 and PLY 1 between the pel origin PCP and the lower-left corner of the pel area PLA are subtracted from the current pointer values CPX and CPY indicating the pel origin PCP so as to store the results of the subtractions in the current pointers CPX and CPY, respectively (step S25). If the values CPX and CPY of the current pointer moved to the coordinate point of the lower-left corner of the drawing area DRA are judged not to exceed the drawing area DRA in step S26, the values of the current pointers CPX and CPY are assumed to be the pel area minimum data XMN and YMN, thereby setting the minimum point of the pel area PLA (step S27).

If the current pointers CPX and CPY are judged to exceed the drawing area DRA in the step S26, a step S28 is executed. In the step S28, if the "AREA =01" mode is judged to have been set, a subroutine (step S29) is effected to restore the pointers stacked in the step S2 according to the rule of the pertinent operation mode, thereby completing the drawing operation.

If AREA=10 is specified for the area mode, the pel drawing is required to be executed unless the pel area PLA completely exceeds the drawing area DRA; consequently, steps S30 and S31 are achieved to execute an area check for the lower-left corner (minimum point) of the pel area PLA, namely, it is judged whether or not the minimum point at the lower-left corner of the pel area PLA exceeds the maximum point (XMAX, YMAX) at the upper-right corner of the drawing area DRA. When the maximum point is judged to have been exceeded, the further operation of the pel drawing is not necessary, and hence the subroutine (step S32) is effected to restore the pointers stacked in the step S2 and the control is returned to the start of the control routine so as to proceed to the drawing processing of the next dot pattern.

Figure 72:
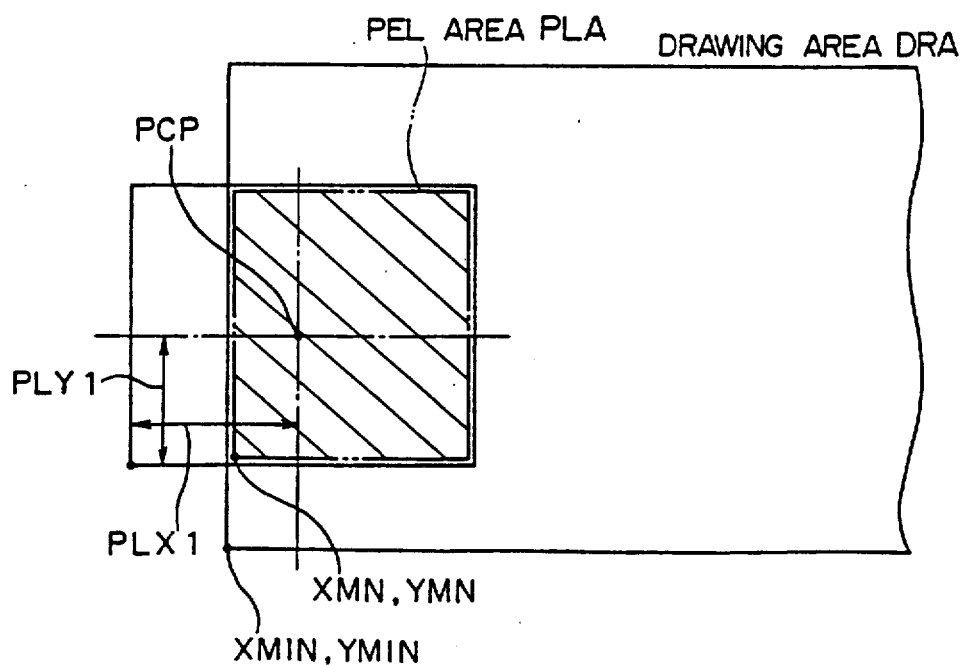
FIG. 72 is an explanatory diagram useful to explain an operation to set a minimum point (XMN, YMN) in the lower left corner of the pel region.

As a result of the judgment in the steps S30 and S31, if the minimum point at the lower-left corner of the pel area PLA does not exceed the maximum point (XMAX, YMAX) at the upper-right corner of the drawing area DRA, the pel area minimum data MN is initialized to a value equal to the data of the current pointer CPX from which the distance PLX1 has been subtracted (step S33). If the pel area minimum data XMN is judged in this situation to exceed the drawing area minimum data XMIN (step S34), the pel area minimum data XMN is reset according to the rule of the "AREA=10" mode to a value equal to the value of the drawing area minimum data XMIN (step S35). Subsequently, the pel area minimum data YMN is also initialized to the data of the current pointer CPY from which the distance PLY1 has been subtracted (step S36). If the pel area minimum data YMN is judged in this situation to exceed the drawing area minimum data YMN is rest according to the rule of the "AREA=10" mode the value of the drawing area minimum data YMIN (step S38). for example, as shown in FIG. 63, when the pole area PLA is completely contained in the drawing area DRA, the pel area minimum data XMN and YMN initially set in the steps S33 and S36 determine the pel area minimum point; whereas when the pel area (indicated by the solid line) PLA to be initialized exceeds the drawing area DRA as shown in FIG. 72, the pel area minimum data XMN and YMN reset in the steps S35 and S38 determine the minimum point of the pel area PLA so as to form a pel area PLA indicated by a double-dot-line in FIG. 72.

When the setting of the minimum point of the pel area is finished with the area check of the lower-left corner of the pel area, there is then effected an operation to obtain a difference, according to the result, between the pel area minimum data XMN and the data of the current pointer CPX from which the distance PLX1 has been subtracted (step S39). In step S40, when the result is judged to be other than "0", namely, fi the pel area minimum data XMN has been reset in the step S35, a number of pixels corresponding to the difference is converted into a number of bits for color data (step S41), and then in steep S42, a start mask is generated in consideration of the set value of the pel area minimum data XMN.

Figure 73:
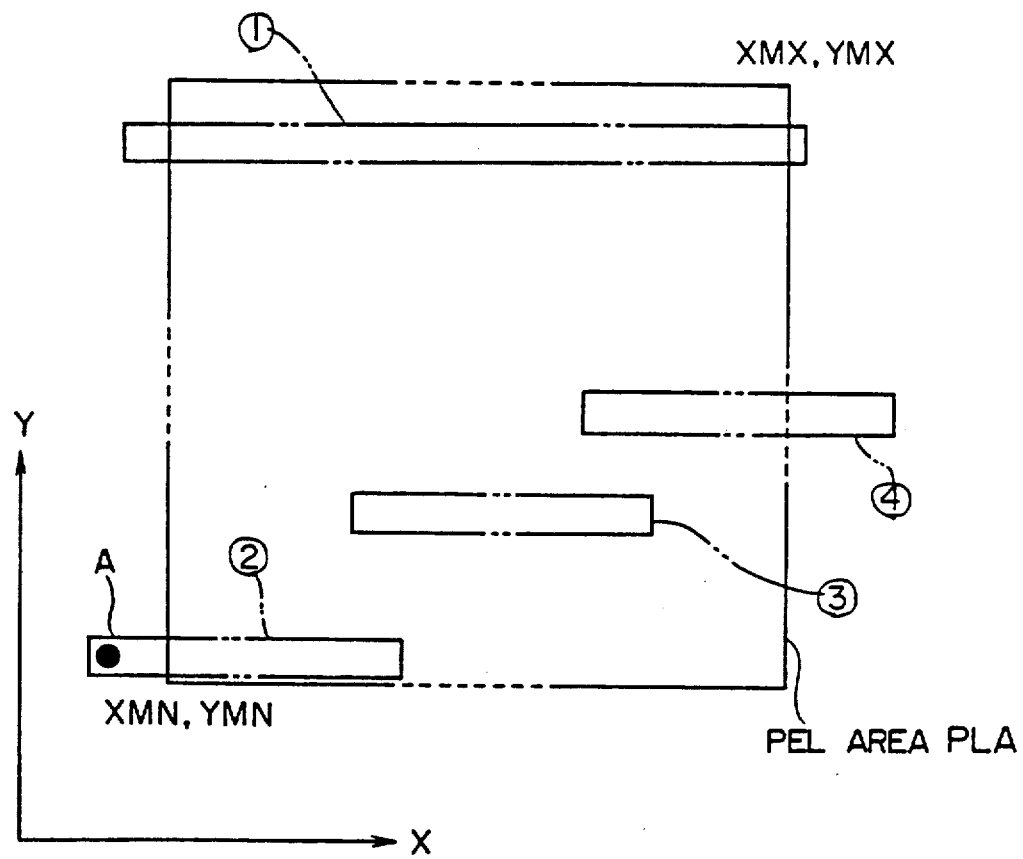
FIG. 73 is an explanatory diagram useful to explain a word processing associated with a pel drawing operation.

After the pel area PlA is set through the initial setting or resetting operation as described above, the respective pointers such as the current pointers CPX and CPY are moved to a point A located at the left end of the word boundary including the point (XMN, YMN) of the lower-left corner of the pel area PLA, as shown in FIG. 73 (step S45). In the case of using pattern data (the "PEL=11" mode is beforehand specified; step S46), a subroutine is executed to move the pattern data from the internal memory IDM (step S47). When the"-PEL=01" mode is specified, a line style data is moved for the internal memory IDM.

Thereafter, it is judged in step S48 to determine whether or not the value of the current pointer CPY is greater than that of the pel area maximum data YMX, in other words, whether or not the drawing processing has been completed for a word boundary including the upper-right corner (XMX, YMX) of the pel area PlA (whether or not the drawing of the pel pattern has been finished). If the final drawing processing of a dot pattern (a pel pattern) has bene ended, the subroutine restoring the pointers stacked in the step S2 is executed (step S49), and then an incrimination is effected, thereby terminating the pel drawing of the dot pattern.

In the step S48, if it is judged that the final drawing processing of a dot pattern has not yet been finished, pel data in the form of binary data defining a pel shape is read from the internal memory IDM (step S51). The pel data undergoes a bit position alignment in he barrel shifter BRLSFT and a data expansion (for example 4 bits/pixel) in the data expand section DE so as to form pel mask data for the boundary of the pertinent word. After the pel mask data is generated, it si judged (step S53) to determined whether or not pattern data is used, in others words, whether the "PEL=01" mode or the "PEL=11" mode is selected. If the "PEL=11" mode has been specified, reading (extracting) of pattern data is executed (step S54).

Next, the program judges to determine whether or not the value attained by adding the number of pixels of the 1-word boundary to the value of the current pointer CPX is greater than the pel area maximum data XMX (step S55). In step S55, if the pel area maximum data XMX is exceeded, it is indicated that an operation with data of the 1-word boundary can complete the 1-line drawing in the X-direction in the pel area as indicated by the ① of FIG. 73. In this case, a judgement is made to determine whether or not the pattern data is to be sued (step S56). When the pattern data is necessary, the pattern data is aligned to the destination data via the barrel shifter j(step S57) and the pel mask data, the start mask data, and the end mask data are generated according to the predetermined operation mode, and then the results of the operation are written in the frame buffer memory FBM according to the address control of the drawing pointer (step S58). As described above, when the 1-line drawing in the X direction in the pel area is completely finished thought operation by use of the 1-word boundary data, the value of the current pointer CPX is then moved to a point at the left end of the 1-word boundary corresponding to the point A along the Y-coordinate direction and the value of the current pointer CPY is moved by one point in the positive Y-coordinate direction (step S59). Thereafter, the control is returned o the step S48 so as to continue the drawing processing in the similar manner for the next X-directional line with respect to the Y direction in the pel area.

On the other hand, if the value obtained by adding the number of pixels of the 1-word boundary to that of the current pointer CPX indicating the point A is less than the pel area maximum data XMX in the judgment of the step S55, the operation with the 1-word boundary data cannot finish the drawing processing of a line in the X direction in the pel area as indicated by the areas ②, ③, and ④ of FIG. 73.

In this case, therefore, in order to accomplish the drawing processing on the 1-word boundary designated by the area ② of FIG. 73, the usage of the pattern data is judged (step S60). If the pattern data is required, the pattern data is aligned to the destination data via the barrel shifter BRLSFT (step 61) and the pel mask data an the start mask data re generated in accordance with a predetermined operation mode, and then the results of the operation are written in the frame buffer memory FBM according to the address control of the drawing pointer DP (step S62). Next, the value of the current pointer CPX is moved by a 1-word boundary in the positive X direction (step S63) also as to generate a pel mask data of the 1-word boundary associated with the value of the current pointer CPX thus moved (step S64). After the pel mask data is generated, a judgment is made to determine whether or not the pattern data is necessary, in other words, whether the "PEL=01" mode or the "PEL=11" mode is selected (step S65). When the "PEL=11" mode is specified, rading or extraction of the pattern data is achieved (step S66). When the pel mask data for the next 1-word boundary and the necessary pattern data re prepared as a result, the program judges to determine whether or not the value attained by adding the number of pixels of the 1-word boundary to the value of the current pointer CPX is greater than the pel area maximum data XMX (step S67). When the result of the judgment in the step S67 indicated that the pel area maximum data XMX is exceeded, as conceptually shown by the area ④ of FIG.73, the data of the 1-word boundary exceeds the pel area PLA (i.e. the pertinent operation is the final operation in the drawing processing). If the pel area maximum data is not exceeded, as conceptual shown by the area ③ of FIG. 73, the data of the 1-word boundary is entirely contained in the pel area PLA (the pertinent operation is not the final operation in the drawing of the line).

When the pel area maximum data is not exceeded as ar result of the judgment in the step S67, it is judged to determine whether he pattern data is to be used or not (step S68)(. If this is the case the a pattern data is aligned to the destination data via the barrel shifter BRLSFT (step S69), the pel mask data is generated according o thepredeermiend operation mode, and the result of the operation is rewritten the frame buffer memory FBM based on the address control of the drawing pointer DP (step S790). Thereafter, control is returned to the step S63 to repeatedly perform the processing until the stp S67 determines that the pel area maximum data XMX is exceeded.

When the judgment of the step S67 indicates that the pel area maximum at a XMX is exceeded, a judgment is made to determine whether or not the pattern data is used (step S71). If the pattern data is required, the pattern data is aligned to the destination data via the barrel shifter BRLSFT (step S72), the pel mask data and the end mask data are generated according to the predetermine operation mode, and the results of the operations are written in the frame buffer memory FBM based ion the address control of the drawing pointer DP (step S73). When the drawing processing of a line in the X direction in the pel area is completed as described above, the value of the current pointer CPX is then moved along the Y direction to a point at the left end of the 1-word boundary corresponding to the point A and the value of the current pointer CPY is moved by one point i the positive X direction(step S59), and then control is returned to the step S48 to continue the drawing processing in the similar fashion for the next X-directional line with respect to the positive Y direction.

Incidentally the pattern reading or extraction subroutine (steps S54 and S66) comprises the drawing position alignment and the color expansion processing in the case where the pattern data includes binary data.

As can be seen from the description above, the following effects can be attained according to the embodiment.

(1) Since a logical pel is defined with an arbitrary shape and an arbitrary size configured corresponding to a plurality of pixels so as to effect as dot drawing operation based on pel data depending on the position of the indiction point of the current pointer, a bold line defined by the size of the pel can be easily drawn at a high speed.

(2) In the pel drawing operation, the setting of the "PEL32 01" mode of the "PEL=11"p0 mode enables a bold-line drawing by use of an arbitrary line style or pattern.

(3) If the "COL=10" mode or the "COL=01" mode is specified when the "PEL=01" mode is set in the pel drawing operation, a bold-line drawing in a color and a bold-line drawing in the reverse mode (i.e. the relationship between the bold line and the background is reversed on the screen) can be achieved.

(4) Provisions of the data expansion section DE for expanding binary data in the drawing coordinate system into a number of bits necessary of the multivalue data nd the logical u it for effecting a logical operation of the source data nd the destination data in the word units enable to increase he processing speed of the drawing processing.

(5) When the pel drawing operation is accomplished by the word-unit processing, the control of the drawing range for the drawing area is carried out by resetting the pel area, which enables substantially control the pertinent area by generating the start mask data ned the end mask data. this simplifies the drawing area control in the pel mode, in other words, in the boldline drawing operation.

(6) for the drawing area control in the pel mode, the user can select either the "AREA=01" mode in which the pel drawing is terminated when the pel area exceeds the drawing area or the "AREA=10" mode in which when the pel area exceeds the drawing the pel drawing is continued without effecting the drawing of the portion outside the drawing area, which enables to multifunctionally effect the area control function.

The invention of the present inventors has been concretely described with reference to an embodiment thereof; however, the present invention is not restricted by the embodiment. The embodiment can be changed or modified in various fashions without departing from the scope and spirit of the invention.

For example, according to the embodiment above, the "PEL=01" mode effecting a bold-line drawing with a predetermined line style or the "PEL=11" mode achieving a bold-line drawing with a predetermined pattern can be selected in the pel mode; however, the operation mode to accomplish a bold-line drawing with a pel is not limited to these modes, for example, it is possible to set an operation mode in which a bold-line drawing operation is effected with a combination of a pattern and a line style. Furthermore, although the embodiment has been described in conjunction with the case where the pel data to define a logical pel is set in the internal memory, the pel data may be so configured to be supplied from the system side. Moreover, in the embodiment above, although various registers are provided in addition to the internal memory IDM, such registers e.g. a temporary register may be implemented by use of an area of the internal memory IDM. In addition, the constitution of the internal bus is not restricted by the configuration mainly including three buses in the embodiment and can be appropriately changed according to purposes. Accordingly, the linkage relationships between the respective functional blocks of the embodiment can also be changed.

The invention of the present inventors has been described on the case where the invention is applied to one of the utilization fields as the background thereof, namely, to a graphic display processor; however, the present invention is not restricted by this case and is applicable, for example, to various semiconductor integrated circuits for the graphic control and the display control and to the graphic terminal equipment. The present invention can be applicable to any systems using a logical pel as a dot having an arbitrary shape and an arbitrary size configured corresponding to at least a plurality of pixels.

Figure 74:
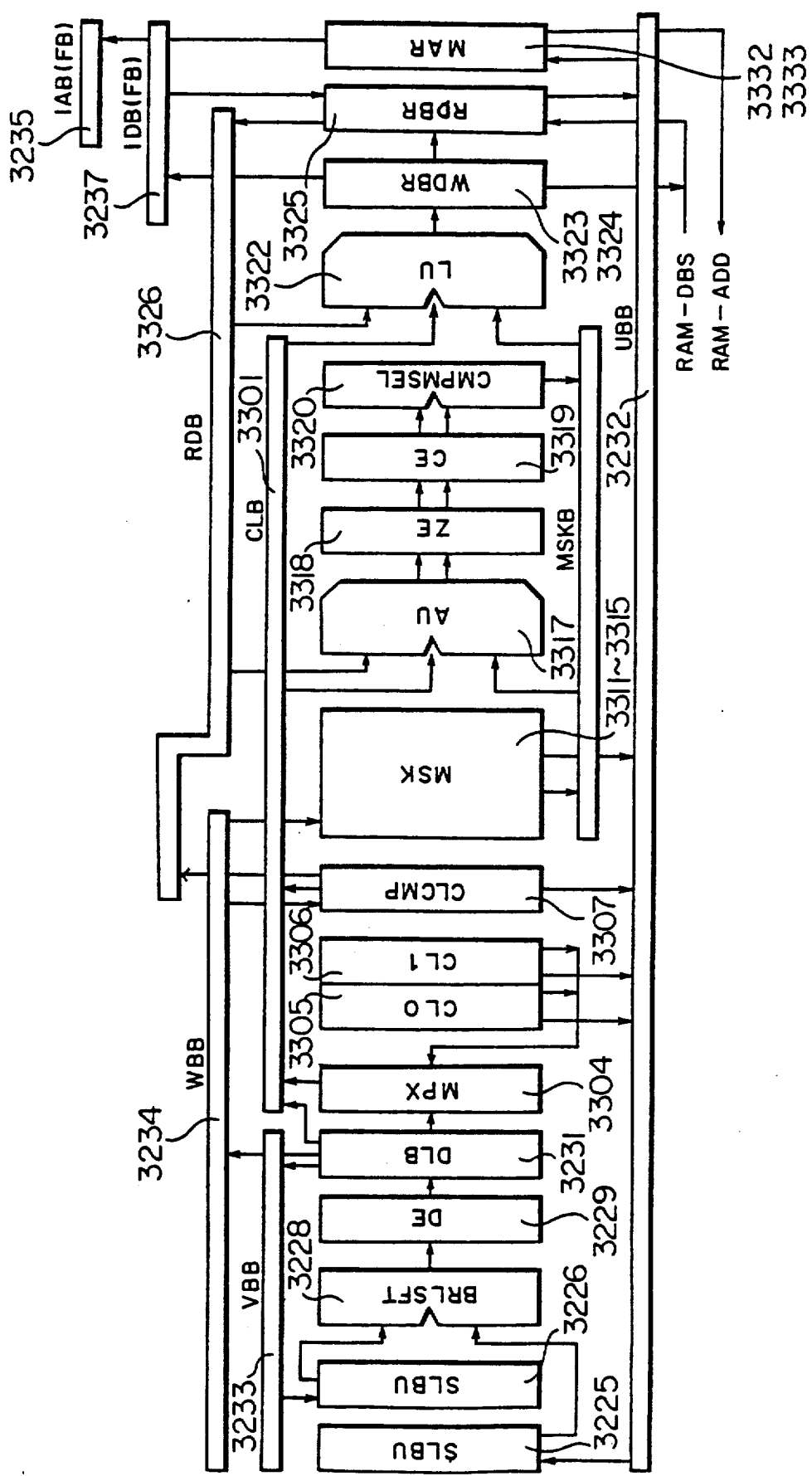
FIG. 74 is a schematic block diagram illustrating the primary portion of another emboiment according to the present invention.

FIG. 74 is a schematic block diagram showing another embodiment having a circuit function effecting the color expansion of characters and the like and the color pixel processing in a drawing processor to which the present invention is applied. The drawing processor according to the present invention is formed, although not particularly limited to, on a semiconductor substrate such as a monocrystalline silicon produced by use of the known manufacturing technology of the semiconductor integrated circuit.

The configuration includes source registers SLBU 3225 and SLBV 3226 each to be loaded with two-word data. For example, data buses UBB 3232 and VBB 3233 each comprise a 16-bit bus, which effects a data transfer in the 16-bit units. In each of the source data registers SLBU 3225 and SLBV 3226, when constituted from a 16-bit register, the two-word source data is stored in two cycles.

Figure 75:
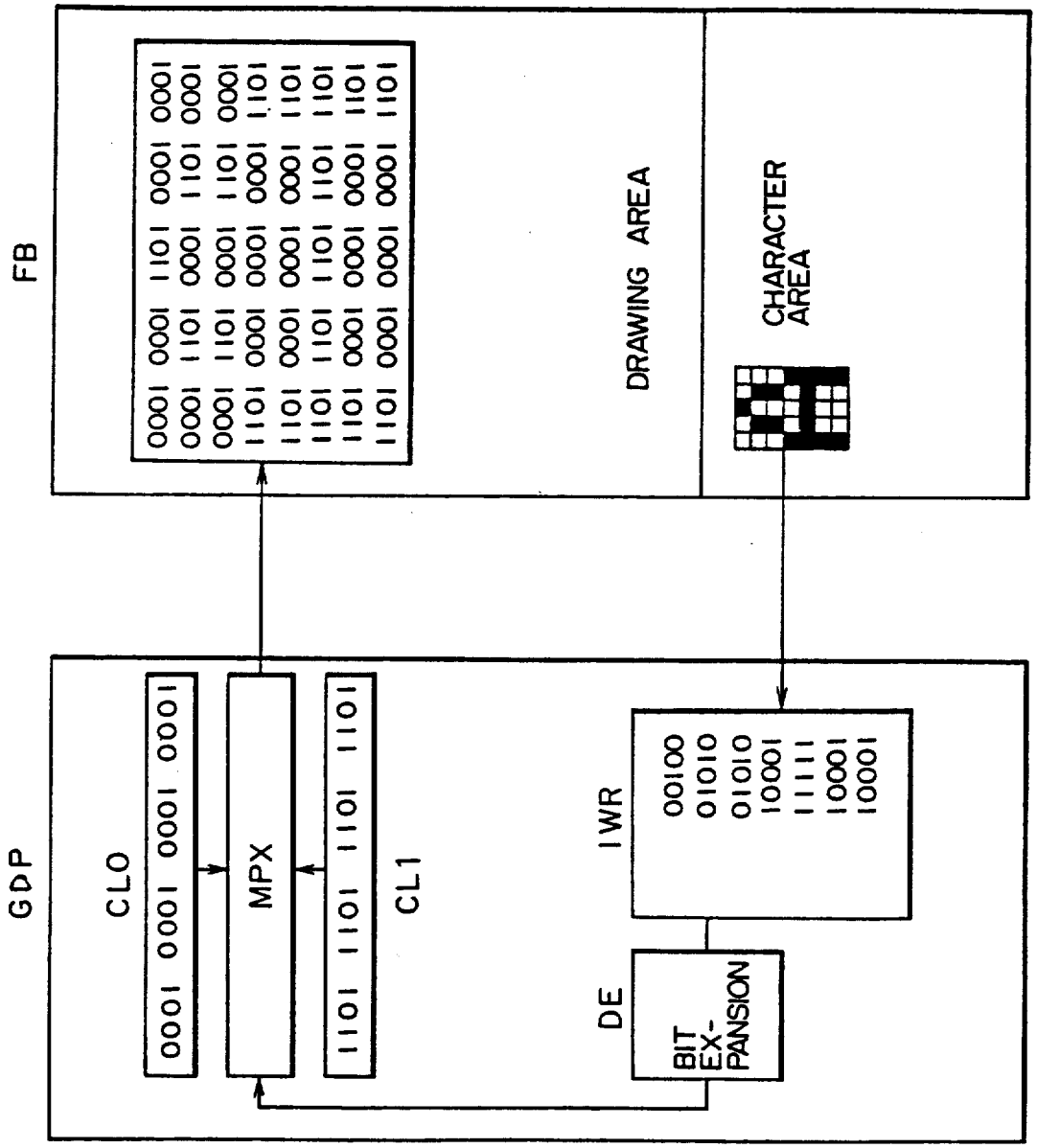
FIG. 75 is a schematic diagram for explaining the principle of the color development of a character font associated with the embodiment of FIG. 74.

For example, as shown in FIG. 75, the graphic display processor GDP decodes a character code sent from a microprocessor to access via an address bus IAB 3235 a character area of the frame buffer memory FB so as to fetch via a data bus IDB 3237 a bit pattern in the unit of 16 bits associated with a monochrome display in which a pixel comprises a bit. Namely, in FIG. 75, information read out onto the data bus IDB 3237 linked to the frame buffer memory FB as a result of an access made by use of the memory addresses MAR's 3332 and 3333 via the address bus IAB 3225 is fetched into a read data register RDBR 3325. The signal of the read data register RDBR 3325 is temporarily stored via a bus UBB 3232 to a temporary register (not shown). The subsequent 1-word data is also loaded in the read data register RDBR 3325 and is then fetched into the source data register SLBU 3225 via the bus 3232. At the same time, the previous 1-word data stored in the temporary register is transferred via a bus VBB 3233 to the source data register SLBV 3226. As a result, 2-word character pattern information is read into the source data registers SLBU 3225 and SLBV 3226.

In the case, for example, where four bits constitute a unit color pixel, information of four first bits as the fundamental of 1-word pixel information is obtained from character information comprising 32 bits in total so as to be fetched into a barrel shifter BRSFT 3228. For the barrel shifter BRLSFT 3228, control signals are generated by the microprogram ROM. For a character A represented in the form of 5 bits × 7 bits, the microprogram ROM generates a control signal to obtain the first 4 bits (0010), a control signal to attain the next 4 bits (0010), and so on. Namely, bit pattern information is fetched in the unit of foru bits (i.e. a boundary processing is accomplished). The circuits above correspond to the inter-working register of FIG. 75.

Four-bit character pattern information thus obtained is fed to a data expand circuit DE 3229, which executes a data expansion to form each pixel with four bits. Namely, each of four bits (0010) above is expanded to be 0000, 0000, 1111, and 0000 corresponding to the content thereof.

The color registers CL0 3305 and CL1 3306 each are loaded with color pixel information of four pixels. For example, color pixel information of four pixels specified by 0001 is stored in the color register CL0 3305, whereas color information of four pixels specified by 1101 is stored in the color register CL1 3306. Each pixel information is processed such that character patterns 1 and 0 (black and white) correspond to, for example, red and blue, respectively. Respective color information of the color registers CL0 3305 and CL1 3306 is supplied to a multiplexer MPX 3304 in the unit of a bit. The multiplexer MPX 3304 operates depending on an output bit from the bit expansion circuit DE 3329, namely, if the output bit is 0, the bits on the side of the color register CL0 3305 are delivered; whereas if the output bit is 1, the bits on the side of the color register CL1 3306 are outputted. As a result, a character pattern of 0 is converted into color pixel information of 0001, whereas a character pattern of 1 is transformed into color pixel information of 1101. In an image processing of the most basic type, image information above is directly written in the frame buffer memory FB so that a character is drawn in two colors for which a pixel is specified by 0001 or 1101. Namely, a character A is drawn in a color designated by 1101 with a background thereof drawn in a color specified by 0001.

In this embodiment, a character pattern in which a pixel comprises a bit is written in the character area of the frame buffer memory FB, and hence a great number of characters and symbols (also including registered graphic forms) can be stored in the area having a small storage capacity. Since the data processing is here achieved in the unit of a word (in the unit of four pixels when a word includes 16 bits and a pixel comprises 4 bits), the monochrome character font can be expanded at a high speed.

Figure 76:
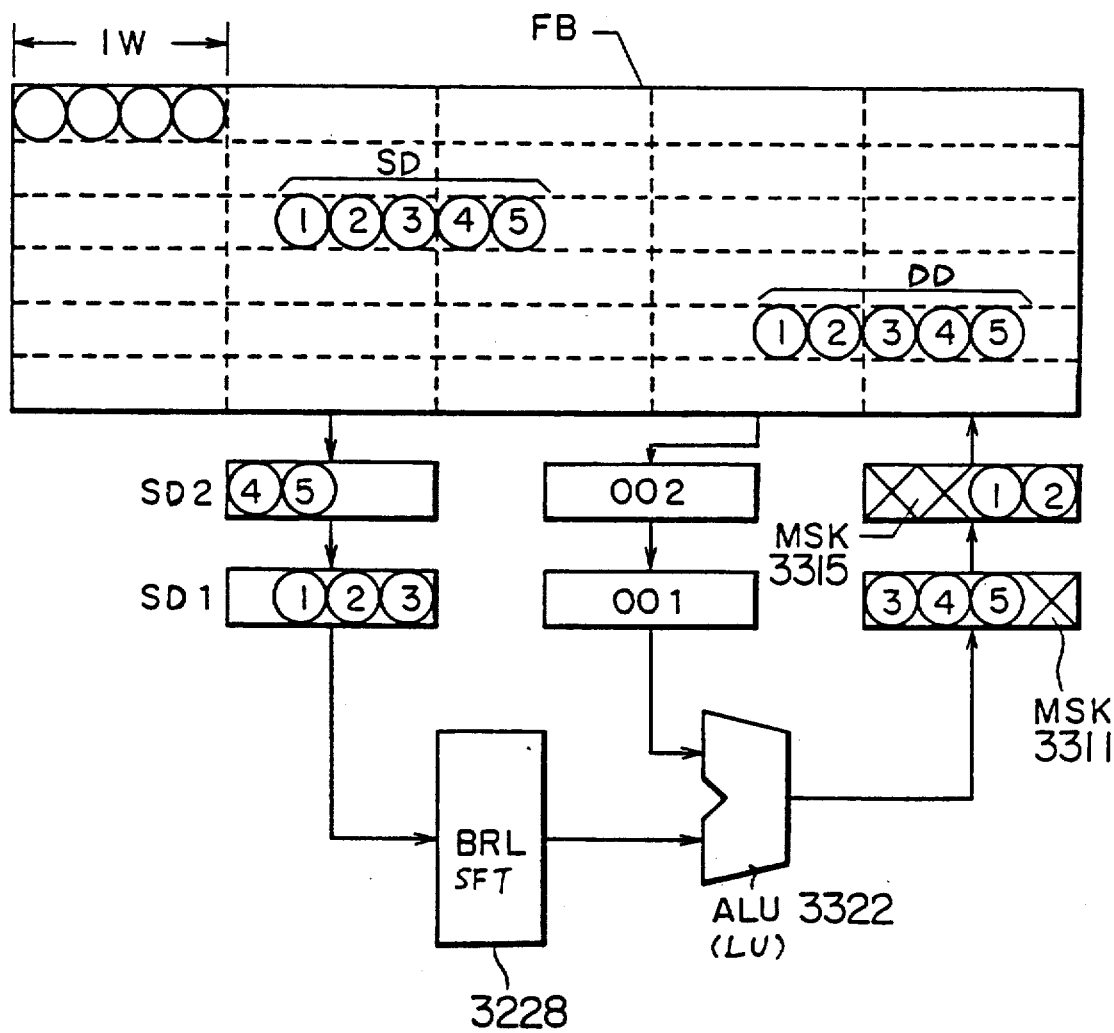
FIG. 76 is an explanatory diagram useful to explain the principle of the operation to process a plurality of color pixel information in the embodiment of FIG. 74.

The color operation processing of the color character information and the source data beforehand drawn in the frame buffer memory FB is also accomplished in the unit of a word. For example, the source data stored in the frame buffer memory FB is, when an address specification is made by use of the memory address registers MAR's 3332 and 3333, read in the word unit into the read data register RDBR 3325 in the similar manner as described above and is stored in source data registers (not shown) similar to the source data registers SLBU 3225 and SLBV 3226. At the same time, for the boundary processing with the destination data, the 2-word data is read out like in the color expansion of the character pattern. Namely, as shown in FIG. 76, when the source data SD is astride two words as indicated by ①-⑤, 1-word source data SD1 including pixels 1-3 and another-1-word source data SD2 containing pixels ④-⑤ are obtained. On the other hand, if the destination data DD comprises a word including pixels ①--/e,crc/2/ and a word including pixels e,crc/3/ -e,crc/5/, the pixels ①-② of the source data SD1 is shifted by the barrel shifter BRLSFT 3228 so as to be aligned to the destination data DD1. When processing color pixel information, the bit expand circuit DE 3229 outputs the output signal from the barrel shifter BRLSFT 3228. The output signal is selectively fed to the buses VBB 3233, WBB 3234, and CLB 3301 via a register DLB 3231. For example, in a color operation, the output signal is delivered to the color bus CLB 3301 and is supplied therefrom to an arithmetic unit AU 3317 and a logic unit 3322. If a predetermined operation is necessary for color character information generated through the color expansion of the character font, character information undergone the color expansions fed from the multiplexer MPX 3304 to the color bus CLB 3301.

The arithmetic unit AU 3317 effects various color operations in the word unit. For example, detection of an agreement, judgment of the relationship in the magnitude, and the like are accomplished with respect to color information specified by a color compare register CLCMP 3307. Alternatively, the arithmetic unit AU 3317 performs a compare operation between the destination data and the source data. Furthermore, a comparison is made between the destination data and color information specified by the color compare register CLCMP 3307. A zero expansion circuit ZE 3318 expands the agreement result in the pixel unit into four bits as described above. For example, no operation is carried out for pixels having the same color as the background color and a data reading or extraction is accomplished for the color specified by the color compare register CLCM 3307. A carry expansion circuit CE 3319 executes a processing of a carry signal associated with the compare operation. An output signal from the arithmetic unit 3317 is delivered via a selector CMPMSEL 3320 according to the color compare mode to a mask bus MSKB.

The logic unit LU 3322 carries out various logical operations in the bit unit, for example, a logical operation processing with the background so as to generate write information in the word unit for the frame buffer memory FB. Write information thus generated is written in the write registers WDBR's 3323 and 3324. Incidentally, the configuration includes a write bus RDB 3326. In this case, a write inhibition may be set for the pixel specified by the mask registers MSK's 3311-3315. This enables in a word-unit write operation in the configuration of FIG. 76 to achieve a mask processing on the positions marked by X where a significant pixel does not exist. While a write operation is being accomplished in the frame buffer memory FB in the word unit, the arithmetic unit AU 3317 effects the next color operation and the logic unit LU 3322 generates write information for the frame buffer memory FB. While the arithmetic unit AU 3317 and the logic unit LU 3322 are executing the color operation and the logic operation processing, respectively, the barrel shifter BRLSFT 3228 fetches the next pixel to be processed. In other words, the operation to fetch data of a plurality of pixels for the color processing including the boundary processing by the barrel shifter BRLSFT 3228, the color operation processing of the data, and the logical operation processing of the data are effected in a pipeline method; consequently, the color drawing operation can be achieved at a high speed together with the parallel processing of the plurality of pixels (four pixels).

The effects of operations attained from the embodiment described in conjunction with FIGS. 74-76 are as follows.

(1) When information of a plurality of bits representing a character or a graphic form in which a pixel comprises a bit, a plurality of bits to be subjected to a color expansion are attained by use of a barrel shifter so as to expand the bits into bit information associated with a plurality of color pixels in which a pixel comprises N bits; furthermore, based on bit information thus attained, the system causes a first color register and a second color register respectively holding color pixel information of the plurality of pixels in which a pixel comprises N bits to selectively output the contents thereof, thereby generating at a high speed data of a plurality of pixels constituting a color character or the like. In other words, there is obtained an effect that the color expansion of the character font can be achieved at a high speed.

(2) Since a pixel comprises a bit in the character pattern written in the character area of the frame buffer, a great number of characters or symbols (including registered graphic forms) can be stored in the area having a small storage capacity.

(3) Two-word color pixel information in which a word includes color pixel information of a plurality of color pixels is stored in a source data register, the pixel data is fetched therefrom in the word unit by aligning the data to the destination data, a color compare operation is accomplished according to the color compare mode between the pixel data thus obtained and the destination data or color information specified by the color compare register CLCMP or between the destination data and color information specified by the color compare register CLCMP, and then write color pixel information in the word unit is generated from the output signal from the barrel shifter and the destination data in response to the output signal as a result of the compare operation and a predetermined color processing signal. This results in an advantageous effect that the speed of the color drawing operation is increased.

(4) The operation to fetch pixel data to be processed by the barrel shifter, the color operation processing of the pixel data, and the logic operation to generate write signals to be written in the frame buffer memory are effected in the pipeline method, which leads to an effect that the color drawing operation can be accomplished at a high speed together with the processing of the color image signals in the word unit.

As for variations of the present embodiment, the configurations of the registers and operation circuits as well as the bus system can be modified in various fashions if the similar operations are implemented.

The present invention is widely applicable to various information processing apparatuses such as the graphic display processor which achieves processing of graphic data.

While the present invention has been described with reference to the particular illustrative embodiments, it is not restricted by those embodiments but only by the appended claims. It is to be appreciated that those skilled in the art can change and modify the embodiment without departing from the scope and spirit of the invention.

We claim:

1. A graphic processing system comprising:
   first store means for storing a program having a plurality of program steps and information corresponding to a plurality of pixels;
   first processor means for executing at least one of the program steps transferred from said first store means by said first processor means and a program step supplied to said first processor means by an external device so as to control said graphic processing system;
   output means for outputting image information generated by controlling pixels arranged in a plurality of dimensions;
   second store means connected to said output means for storing information corresponding to pixels to be outputted by said output means; and
   second processor means responsive to a command and parameter information transferred from at least one of said first store means and said first processor means for generating character and graphic data in accordance with a predetermined processing procedure, and controlling a transfer of the data selectively to one of said first store means and said second store means.

2. A graphic processing system comprising:
   a first address bus and a first data bus;
   a second address bus and a second data bus;
   first store means connected to said first address bus and said first data bus for storing a program having a plurality of program steps and information corresponding to pixels;
   first processor means connected to said first address bus and said first data bus for processing an execution of at least one of said program steps transferred from said first store means by said first processor means and a program step supplied to said first processor means by an external device so as to control said graphic processing system;

output means for outputting image information generated by controlling pixels arranged in a plurality of dimensions;

second store means connected to aid second address bus, said output means and said second data bus for storing information corresponding to pixels to be outputted by said output means;

bus connection control means for performing a connection control to effect connection or disconnection between said first address bus and said second address bus and between said first data bus and said second data bus; and second processor means connected to said second data bus, and responsive to command and parameter information transferred through said first data bus from at least one of said first store means and said first processor means for processing image information using said second address bus and said second data bus in accordance with a predetermined processing procedure; and said second processor means controlling said buds connection control means;

whereby said second processor means provides said bus connection control means with control signals establishing a connection between said first address buds and said second address bus and between said first data bus and said second data bus so as to access said first store means, and alternatively effecting a disconnection between said first address bus and said second address bus and between said first data bus and said second data bus so as to access said second store means.

3. A graphic processing system according to claim 2, whereinsaid second processor means receives and processes a command and parameter information transferred through said first data bus from at least one of said first store means and said first processor means to generate character and graphic data and to control said bus connection control means, in accordance with a predetermined processing procedure;

said second processor means establishes a connection path between said first address bus and said second address bus and between said first data bus and said second data bus so as to transfer said character and graphic data to said first store means under control of said bus connection control means; and said second processor means alternatively effects a disconnection between said first address bus and said second address bus and between said first data bus and said second data bus so as to transfer a said character and graphic data to said second store means under control of said bus connection control means.

4. A graphic processing system according to claim 2, further comprising:

a plurality of sets, each stet individually having the same configuration of said second processor means, said second address bus, said second data bus, said second store means, and said bus connection control means, said second processor means being connected to said first data bus, said second address bus and said second data bus, said second store means being connected to said second address bus and said second data us, wherein a read access from said first store means is executed by sue of address information supplied form one of said plurality of second processor means, and said plurality of bus connection control means are controlled such as the said read data can be concurrently read in said plurality of second processor means.

5. A graphic processing system comprising:

store means for storing information in a pixel unit; and processor means for accessing said store means to effect a graphic processing;

wherein said store means includes at least a first X-Y coordinate space and a second X-Y coordinate space;

said store means includes an area for storing parameters of first and second types, said first type of parameter defining one-to-one corresponding relationships between an origin of the first X-Y coordinate space and a pixel address of aid store means, said second type of parameter defining one-to-one corresponding relationship between an origin of the second X-Y coordinate space and a pixel address of said store means;

said processor means further includes transfer address generating means for generating an address to transfer area data defined in said first X-Y coordinate space to an area defined in said second X-Y coordinate space by referring to said first and second type of parameters.

6. A graphic processing system according to claim 5, comprising:

pixel number means for independently defining a number of horizontal pixels for each of said first X-Y coordinate space and said second X-Y coordinate space, wherein said transfer address generating means refers to said area for storing the first and second types of parameters and said first pixel number means to generate the address of area data to be transferred.

7. A graphic processing system according to claim 6 further comprising:

pixel number means for independently defining a number of bits per pixel for each of said first X-Y coordinate space and said second X-Y coordinate space, wherein said transfer address generating means refers to said area for storing the first and second types of parameters and said second pixel number means to generate the address of area data to be transferred.

8. A graphic processing system comprising:

store means for storing graphic information in a pixel unit; and processing means or sequentially generating addresses corresponding to pixels to access said store means to generate graphic information decomposed in the pixel unit and for storing two X-Y coordinate parameters;

wherein said processor means includes means for storing said two X-Y coordinate parameters including a start point and an end point defining a straight line, and means for controlling a drawing operation to be performed only in a drawing range defined only by two X-Y coordinate parameters including a drawing start pixel number and a drawing end pixel number of the straight line.

9. A graphic processing system a comprising:

store means or storing information in a pixel unit; and processor means for accessing said store means to generate graphic information;

wherein aid processor means includes means for storing four X-Y coordinate parameters defining two arbitrary straight lines and two Y coordinate parameters defining two straight lines parallel to an X axis; and means for controlling a drawing execution to effect a drawing operation in a trapezoidal area surrounded with said four straight lines outputted.

10. A graphic processing system comprising:

store means for storing information in a pixel unit; and processor means for accessing said store means to generate graphic information;

wherein said processor means includes first means for storing parameters defining an arc of a right-half or a left-half of a circle based on a center coordinate and a radius, a straight line based on two X-Y coordinate parameters, and two straight lines parallel to an X axis based on two Y-coordinate parameters, and second means or generating a control signal to effect a drawing operation by said processor means based on said parameters within san area of said store means surrounded by the arc and the three straighten lines defined by said first means.

11. A graphic processing system comprising:

store means for storing graphic information in a pixel unit and numerical data; and processor means for accessing said store means to read out graphic information;

wherein said store means stores character font patterns and information including a horizontal reference start position and a horizontal reference end position for each of said character font patterns; and said processor means includes means for generating a control signal so that said processor means effects a drawing of a specified character font pattern read from said store means only in a range in said store means surrounded by a horizontal reference start position and a horizontal reference end position of said specified character font pattern.

12. A graphic processing system comprising:

first means for storing information in a pixel unit including a predetermined plurality of bits arranged in two dimensions such that a plurality of pixels adjacent to each other define a word;

second means for sequentially calculating at least write addresses and outputting write data to effect a write control; and third means responsive to an output from said second means for controlling a write operation on said first means;

wherein said second means includes means for generating a word write address and address information identifying a pixel to be written, thereby identifying a pixel in a word and for generating a control signal indicating at least one of a word-unit write operation nd a pixel-unit write operation in accordance with the type of graphic operation; and said third means includes means for controlling, in a word-unit write operation, a writing of 1-word write data of a plurality of pixels in said first means and for decoding, in a pixel-unit write operation, said information identifying a pixel so as to write pixel data only in predetermine positions in said first means, thereby enabling both write operations in the word unit and in the pixel unit.

13. A graphic processing system according to claim 12, wherein:

said third means includes means for generating a control signal which enables a pixel-unit write operation in generating a line and for causing a word-unit write operation tin carrying out a drawing to paint a plane.

14. A graphic processing system according to claim 12, wherein:

said second means includes means for specifying a number of bits constituting a pixel depending upon a required number of at least colors and dots and positions in the word corresponding to the number of bits coinstituting said pixel.

15. A graphic processing system according to claim 12 wherein:

said second means includes in a memory element thereof, operation means for effecting an operation between a new pixel and an old pixel by specifying a pixel-unit write operation.

16. A graphic processing system comprising:

first means for storing information in a pixel unit including a plurality of bits arranged in two dimensions such that a plurality of pixels adjacent to each other define a word;

second means for sequentially calculating at least one of a read address and a write address, outputting write data, and for specifying an operation mode so as to sequentially effect a read operation, a computation, and a write operation on pixel data; and third means responsive to an output from said second means for controlling at least one of a read operation and a write operation on said first means;

wherein said second means includes means for generating a word-unit write address and information identifying at least one of a pixel to be read and to be written so as to identify a pixel in a word and for generating a control signal indicating at least one of a word-unit read operation and word-unit write operation or at least a pixel-unit read operation and a pixel-unit write operation, and mode means for specifying an operation mode; and said third means includes means for controlling, in a word-unit write operation, a writing of 1-word write data of a plurality of pixels in said first means and for decoding, in a pixel-unit write operation, said information identifying a pixel so as to write 1-pixel data only in predetermined positions in said first means;

said third means controlling a pixel-unit write operation when said mode means specifying a replacement of a new pixel, and controlling a word-unit operation when said mode means specifies a computation between new pixels and old pixels, wherein a word including said old pixels is read from said first means and wherein said computation is effected only on predetermined pixel positions in said second means and a word obtain by the computation is written in said first means.

17. A graphic processing system comprising:

first means for storing information in a word unit arranged in two dimensions such that a plurality of pixels adjacent o each other define a word;

second means for sequentially calculating a drawing address an outputting drawing data to effect a drawing control; and third means a responsive to an output from said second means for controlling a rad operation and a write operation on said first means;

wherein said second means outputs a word unit address and address information to specify at least one pixel in a word; and said third means writing drawing data only for said at least one pixel specified by an output from said second means.

18. A graphic processing device for controlling graphic data to be generated or transferred by addressing a display memory which stores graphic data comprising:

first means for sequentially calculating drawing coordinate in accordance with a predetermine algorithm;

second means responsive to said first means for calculating display memory addresses corresponding to the drawing coordinates and for supplying the calculated addresses to said display memory for access so as to execute a drawing operation;

a first microprogram control device having a first microprogram controlling said first means;

a second microprogram control device having a second microprogram controlling said second means, said first microprogram control device and said second microprogram control device being individually provided; and means for initiating said second microprogram by sue of said first microprogram controlling said second microprogram in addition to said fist means.

19. A graphic processing device according to claim 18, wherein said second microprogram controlling said second means can operate a program in response to initiation of said second microprogram by said first microprogram controlling said first means.

20. A graphic processing device according to claim 18, further comprising :

means for stopping said first microprogram controlling said first means in response to a detection, by a wait control means, of whether said second microprogram controlling said second means is already in an execution upon initiation of said second microprogram controlling said second means by said first microprogram controlling said first means.

21. A graphic processing device for controlling graphic data to be generated or transferred by addressing a display memory which stores graphic data comprising:

first means for sequentially calculating drawing coordinates in accordance with a predetermined algorithm;

a first microprogram control device having a first microprogram controlling said first means;

second means for storing an address of the first microprogram controlling said first means;

third means for storing information for effecting a multiway branch of said first microprogram;

fourth means for specifying valid bit positions of said third means; and wherein said first microprogram controls a multiway jump in response to the information in said third means by substituting information of said fourth means in place of a jump address of said second means for the valid bit positions specified by said fourth means.

22. A graphic processing device for controlling graphic data to be generated or transferred by addressing a display memory which stores graphic data comprising:

first means for sequentially calculating drawing coordinates in accordance with a predetermined algorithm;

a first microprogram control device having a first microprogram controlling said first means;

second means for storing an address of the first microprogram controlling said first means;

third means for storing an address at which the first microprogram controlling said first means is stopped;

fourth means coupled to said second means and said third means for comparing the address stored in said second means to said address stored in said third means and outputting a signal in response to an agreement as a result of the comparison, said signal being supplied to control said second means; and wherein said second mean are set to predetermined data in response to the agreement signal outputted by said fourth means.

23. A graphic processing device comprising:

graphic data store means for storing graphic data information in a pile unit;

pel data store means for storing data of a pel representing a drawing unit having a required shape configured as a combination of a plurality of pixels;

a current pointer for indicating a drawing position of pel data to said graphic data store means; and operation means coupled to said pel data store means for effecting a logic operation for a drawing operation onto the drawing position corresponding to an indication point of said current pointer based on said pel data stored in said pel data store means.

24. A graphic processing device according to claim 23, wherein aid pel data store means includes means for storing at least one of pattern information and line style information, and said operation means includes means for combining said at least one information with pel information read from said store means to generate and store a bold line into said graphic data store means.

25. A graphic processing device comprising:

graphic data store means for storing information in pixel units;

pel data store means for storing binary information of pel data including a set of drawing dots having an arbitrary shape and an arbitrary size configured as a combination of a plurality of pixels;

a current pointer indicating a pel drawing position in a predetermined bit unit to said graphic data store means;

color expansion means for expanding each bit of pel information to a plurality of bits to represent a color pixel at a position on said graphic store means indicated by said current pointer; and operation means responsive to an output of said expansion means for effecting a logic operation for a drawing operation of the pel data from said color expansion means to generate a color bold line.

26. A graphic processing device comprising:

pel data store means for storing pel data representing as a drawing unit, a set of drawing dots having an arbitrary shape and an arbitrary size configured as a combination of a plurality of pixels;

a current pointer indicating a pel drawing position;

pel area means for designating a pel area in which a pel shape is to be defined;

area compare means for judging whether or not an area to be drawn contains an area to be drawn as a pel pattern which is determined by said pel area means and an indication point of said current pointer;

data mask means for generating mask data to inhibit a pel drawing operation outside the drawing area based on a result of comparison in said area compare means; and operation coupled to said store means and said data mask means for effecting a logic operation for a drawing operation based on the pel data nd the mask data according to a position of the indication point of the current pointer.

27. A graphic processing device according to claim 26, further comprising:

means responsive to detection by said area compare means of a pel area which is completely outside a predetermined drawing area, for selecting one of a mode of terminating a pel drawing operation and a mode of continuing the pel drawing operation without effecting a drawing operation of pixels corresponding to a portion outside the drawing area.

28. A graphic processing device comprising:

store means for storing information in a pixel unit including a predetermined plurality of bits arranged in two dimensions such that a plurality of pixels adjacent to each other define a word;

source registers for storing color pixel information of two words read from said store means, each of said words including a plurality of color pixels information;

a barrel shifter for receiving said color pixel information of two words and selectively extracting parts of the received words to generate pixel data in a unit of a word, said pixel data being aligned to a destination point indicating a position of data to be written; and a logic circuit for generating write color pixel information in a word unit from an output signal from said barrel shifter and destination data read from said store means and a predetermined color processing signal and means for writing said write color pixel information and said destination data into said store means.

29. A graphic processing device according to claim 28 wherein said word comprises M bits and said pixel includes N bits (where M and N are positive integers greater than 1).

* * * * *

UNITED STATES PATENT AND TRADEMARK OFFICE
CERTIFICATE OF CORRECTION

PATENT NO. : 5,046,023
DATED : September 3, 1991
INVENTOR(S) : KATSURA, et al.

It is certified that error appears in the above-indentified patent and that said Letters Patent is hereby corrected as shown below:

On the title page, insert the following after item [22]:

[30]  Foreign Application Priority Data

Oct.  6, 1986  [JP]  Japan .....61-236148
Feb. 16, 1987  [JP]  Japan .....62-31470
Mar. 11, 1987  [JP]  Japan .....62-54036
Jan. 21, 1987  [JP]  Japan .....62-09802
Feb. 25, 1987  [JP]  Japan .....62-40310

Signed and Sealed this

Thirtieth Day of September, 1997

Attest:

BRUCE LEHMAN

Attesting Officer

Commissioner of Patents and Trademarks